(12) United States Patent
Xi et al.

(10) Patent No.: US 11,005,597 B2
(45) Date of Patent: May 11, 2021

(54) TWO-STAGE SCRAMBLING FOR POLAR CODED PDCCH TRANSMISSION

(71) Applicant: IDAC Holdings, Inc., Wilmington, DE (US)

(72) Inventors: Fengjun Xi, San Diego, CA (US); Chunxuan Ye, San Diego, CA (US); Kyle Jung-Lin Pan, Saint James, NY (US); Sungkwon Hong, Dongjak-gu (KR)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/620,354

(22) PCT Filed: Jun. 13, 2018

(86) PCT No.: PCT/US2018/037243
§ 371 (c)(1),
(2) Date: Dec. 6, 2019

(87) PCT Pub. No.: WO2018/231924
PCT Pub. Date: Dec. 20, 2018

(65) Prior Publication Data
US 2020/0228236 A1    Jul. 16, 2020

Related U.S. Application Data

(60) Provisional application No. 62/586,429, filed on Nov. 15, 2017, provisional application No. 62/566,256, (Continued)

(51) Int. Cl.
*H04L 1/00* (2006.01)
(52) U.S. Cl.
CPC .......... *H04L 1/0045* (2013.01); *H04L 1/0057* (2013.01); *H04L 1/0071* (2013.01)

(58) Field of Classification Search
CPC ........ H03M 13/09; H04L 1/00; H04L 1/0045; H04L 1/0047; H04L 1/0063; H04L 1/0072
See application file for complete search history.

(56) References Cited

U.S. PATENT DOCUMENTS

| 10,638,337 B2* | 4/2020 | Bendlin | H04W 28/065 |
| 2018/0026663 A1* | 1/2018 | Wu | H03M 13/6362 |
| | | | 714/776 |

(Continued)

OTHER PUBLICATIONS

"3GPP Chairman's Notes RAN1 Meeting #89", May 2017.
(Continued)

*Primary Examiner* — Kevin Kim
(74) *Attorney, Agent, or Firm* — Condo Roccia Koptiw LLP

(57) ABSTRACT

A wireless transmit receive unit (WTRU) may receive a Physical Downlink Control Channel (PDCCH) transmission and perform early termination on the PDCCH transmission. Transmissions that are not intended for the WTRU may be terminated. The WTRU may perform a first decode of the PDCCH transmission based on a first scrambling sequence. The first scrambling sequence may be generated using a Gold sequence, which may be initialized based on a WTRU identifier. If the first decode is not successful, the WTRU may determine that the PDCCH transmission is not intended for the WTRU. The WTRU may perform an assistance bit added (ABA) polar decode of the PDCCH transmission based on a second scrambling sequence (e.g., a cell radio network temporary ID (C-RNTI)). The WTRU may perform a CRC on the output of the ABA polar decode to obtain downlink control information (DCI).

16 Claims, 40 Drawing Sheets

Related U.S. Application Data filed on Sep. 29, 2017, provisional application No. 62/559,394, filed on Sep. 15, 2017, provisional application No. 62/556,292, filed on Sep. 8, 2017, provisional application No. 62/551,722, filed on Aug. 29, 2017, provisional application No. 62/543,117, filed on Aug. 9, 2017, provisional application No. 62/519,396, filed on Jun. 14, 2017.

(56) References Cited

U.S. PATENT DOCUMENTS

| | | | | |
|---|---|---|---|---|
| 2018/0199317 | A1* | 7/2018 | Hwang | H04L 1/0061 |
| 2018/0317198 | A1* | 11/2018 | Lee | H04L 5/0007 |
| 2019/0372711 | A1* | 12/2019 | Luo | H04L 1/00 |

OTHER PUBLICATIONS

"3GPP Chairman's notes, RAN1 NR Ad-hoc meeting", Jan. 2017.
3rd Generation Partnership Project (3GPP), R1-1608862, "Polar Code Construction for NR", Huawei, HiSilicon, 3GPP TSG RAANn WG1 Meeting #86bis, Lisbon, Portugal, Oct. 10-14, 2016, 8 pages.
3rd Generation Partnership Project (3GPP), R1-1608863, "Evaluation of Channel Coding Schemes for Control Channel", Huawei, HiSilicon, 3GPP TSG RAN WG1 Meeting #86b, Lisbon, Portugal, Oct. 10-14, 2016, 9 pages.
3rd Generation Partnership Project (3GPP), R1-1611254, "Details of the Polar Code Design", Huawei, HiSilicon, 3GPP TSG RAN WG1 Meeting #87, Reno, USA, Nov. 10-14, 2016, 15 pages.
3rd Generation Partnership Project (3GPP), R1-1701702, "Construction Schemes for Polar Codes", Huawei, HiSilicon, 3GPP TSG RAN WG1 Meeting #88, Athens, Greece, Feb. 13-17, 2017, 7 pages.
3rd Generation Partnership Project (3GPP), R1-1702646, "Polar Code Information Bit Allocation and Nested Extension Construction", Qualcomm Incorporated, 3GPP TSG-RAN WG1 Meeting #88, Athens, Greece, Feb. 13-17, 2017, pp. 1-13.
3rd Generation Partnership Project (3GPP), R1-1707686, "Early Block Discrimination with Polar Codes for DCI Blind Detection", Coherent Logix Inc., 3GPP TSG RAN WG1 Meeting #89, Hangzhou, CN, May 15-19, 2017, pp. 1-8.
3rd Generation Partnership Project (3GPP), R1-1707741, "Attaching UE-ID for PDCCH Transmission using Polar Codes", AT&T, 3GPP TSG RAN WG1 Meeting #89, Hangzhou, P.R. China, May 15-19, 2017, pp. 1-2.
3rd Generation Partnership Project (3GPP), R1-1708316, "Study of Early Termination Techniques for Polar code", Intel Corporation, 3GPP TSG RAN WG1 Meeting #89, Hangzhou, P.R. China, May 15-19, 2017, pp. 1-9.
3rd Generation Partnership Project (3GPP), R1-1711570, "UE_ID Insertion for Early Block Discrimination on DCI Blind Detection", Coherent Logix Inc., 3GPP TSG RAN1-NR#2, Qingdao, CN, Jun. 27-30, 2017, pp. 1-5.
3rd Generation Partnership Project (3GPP), R1-1718500, "On UE Specific Scrambling", InterDigital Inc., 3GPP TSG RAN WG1 Meeting 90bis, Prague, Czech Republic, Oct. 9-13, 2017, 2 pages.
Arikan, Erdal, "Channel Polarization: A Method for Constructing Capacity-Achieving Codes for Symmetric Binary-Input Memoryless Channels", IEEE Transactions on Information Theory, vol. 55, No. 7, Jul. 2009, pp. 3051-3073.
Niu et al., "CRC-Aided Decoding of Polar Codes", IEEE Communications Letters, vol. 16, No. 10, Oct. 2012, pp. 1668-1671.
Tal et al., "How to Construct Polar Codes", IEEE Transactions on Information Theory, vol. 59, No. 10, Oct. 2013, pp. 6562-6582.
Tal et al., "List Decoding of Polar Codes", IEEE Transactions on Information Theory, vol. 61, No. 5, May 2015, pp. 2213-2226.
Trifonov, Peter, "Efficient Design and Decoding of Polar Codes", IEEE Transactions on Communications, vol. 60, No. 11, Nov. 2012, pp. 3221-3227.
Wang et al., "A Novel Puncturing Scheme for Polar Codes", IEEE Communications Letters, vol. 18, No. 12, Dec. 2014, pp. 2081-2084.
3rd Generation Partnership Project (3GPP), R1-1708833, "Design details of distributed CRC",Nokia, Alcatel-Lucent Shanghai Bell, 3GPP TSG RAN WG1 Meeting #89, Hangzhou, P.R. China, May 15-19, 2017, pp. 1-7.
3rd Generation Partnership Project (3GPP), R1-1712617, "Investigation on UAC Fast Fading Models", Nokia, Nokia Shanghai Bell, 3GPP TSG RAN WG1 Meeting #90, Prague, Czech Republic, Aug. 21-25, 2017, pp. 1-4.
3rd Generation Partnership Project (3GPP), 3GPP TSG RAN WG1 Meeting #90, RAN1 Chairman's Notes, Prague, Czech Republic, Aug. 21-25, 2017, pp. 1-143.

\* cited by examiner

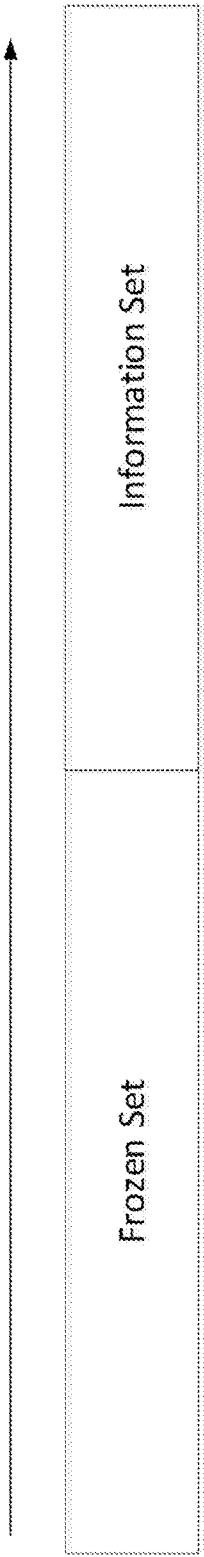
FIG. 3
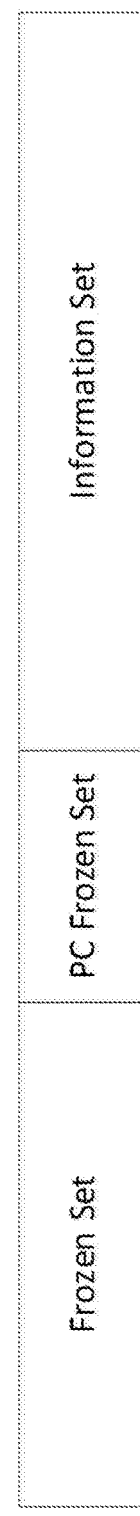 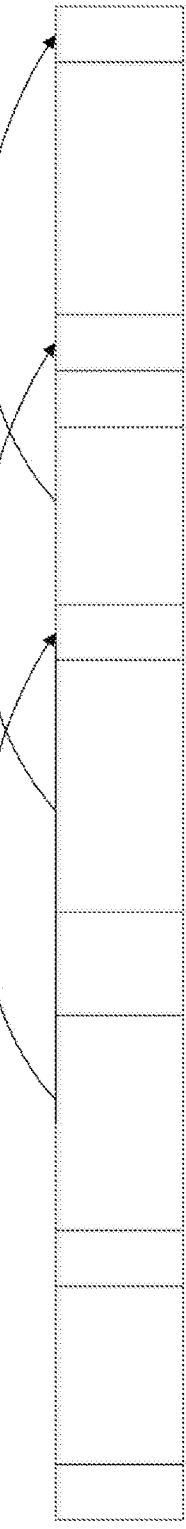
FIG. 4

| 3rd LSB of SFN (bit s2) | 2nd LSB of SFN (bit s1) | Seq index used for each PBCH payload |
|---|---|---|
| 0 | 0 | 0 ~ M-1 |
| 0 | 1 | M ~ 2M-1 |
| 1 | 0 | 2M ~ 3M-1 |
| 1 | 1 | 3M ~ 4M-1 |

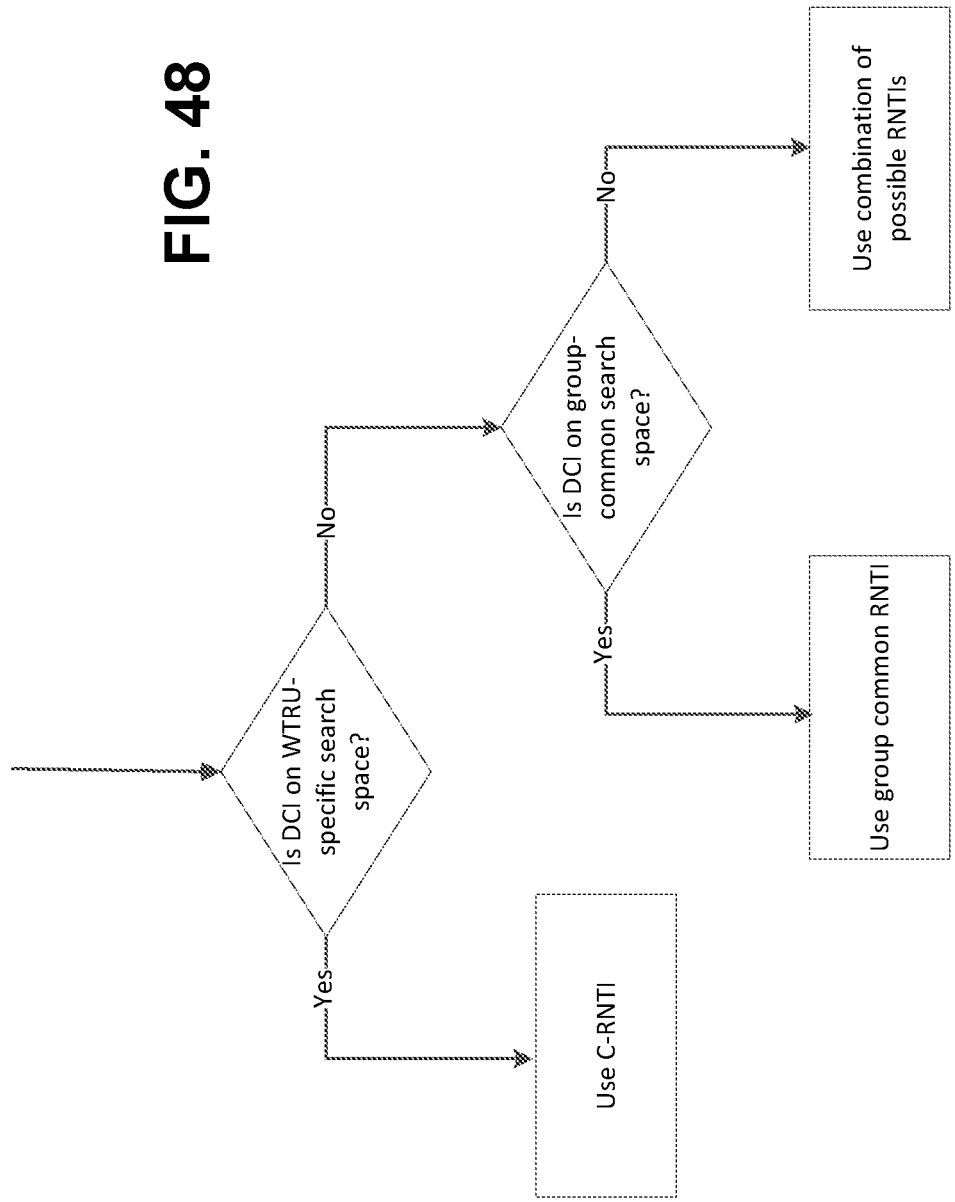

TWO-STAGE SCRAMBLING FOR POLAR CODED PDCCH TRANSMISSION

CROSS REFERENCE

This application is the National Stage entry under 35 U.S.C. § 371 of Patent Cooperation Treaty Application PCT/US2018/037243, filed Jun. 13, 2018, which claims priority from: U.S. Provisional Patent Application No. 62/519,396, filed Jun. 14, 2017; U.S. Provisional Patent Application No. 62/543,117, filed Aug. 9, 2017; U.S. Provisional Patent Application No. 62/551,722, filed Aug. 29, 2017; U.S. Provisional Patent Application No. 62/556,292, filed Sep. 8, 2017; U.S. Provisional Patent Application No. 62/559,394, filed Sep. 15, 2017; U.S. Provisional Patent Application No. 62/566,256, filed Sep. 29, 2017; and U.S. Provisional Patent Application No. 62/586,429, filed Nov. 15, 2017, which are incorporated by reference herein in their entirety.

BACKGROUND

Mobile communications continue to evolve. A fifth generation may be referred to as 5G. A previous (legacy) generation of mobile communication may be, for example, fourth generation (4G) long term evolution (LTE). Mobile wireless communications implement a variety of radio access technologies (RATs), such as New Radio (NR). Use cases for NR may include, for example, extreme Mobile Broadband (eMBB), Ultra High Reliability and Low Latency Communications (URLLC) and massive Machine Type Communications (mMTC).

SUMMARY

A wireless transmit receive unit (WTRU) may receive a Physical Downlink Control Channel (PDCCH) transmission from a gNB. The PDCCH transmission may be coded (e.g., coded by the gNB) such that the WTRU may perform early termination on PDCCH transmissions. If the PDCCH transmission is coded such that the WTRU may perform early termination, transmissions that are not intended for the WTRU may be discarded (e.g., discarded prior to completion of decoding). For example, after receiving the PDCCH transmission, the WTRU may perform a first decode of the PDCCH transmission based on a first scrambling sequence. The first scrambling sequence may be generated using a Gold sequence, which may be initialized with a WTRU identifier (ID). If the first decode is not successful, the WTRU may determine that the PDCCH transmission is not intended for the WTRU (e.g., and discarded by the WTRU). If the first decode is successful, the WTRU may perform (e.g., may then perform) an assistance bit added (ABA) polar decode of the received PDCCH transmission based on a second scrambling sequence. The second scrambling sequence may be a WTRU ID (e.g., a cell radio network temporary ID (C-RNTI)). If the ABA polar decode is not successful, the WTRU may determine that the PDCCH transmission is not intended for the WTRU. If the polar decode is successful, the WTRU may perform a CRC to obtain downlink control information (DCI).

BRIEF DESCRIPTION OF THE DRAWINGS

FIG. 3 is an example of a normal polar code.

FIG. 4 is an example of a PC polar code.

FIG. 48 is an example of WTRU-ID determination implementation for scrambling.

DETAILED DESCRIPTION

Figure 1A:
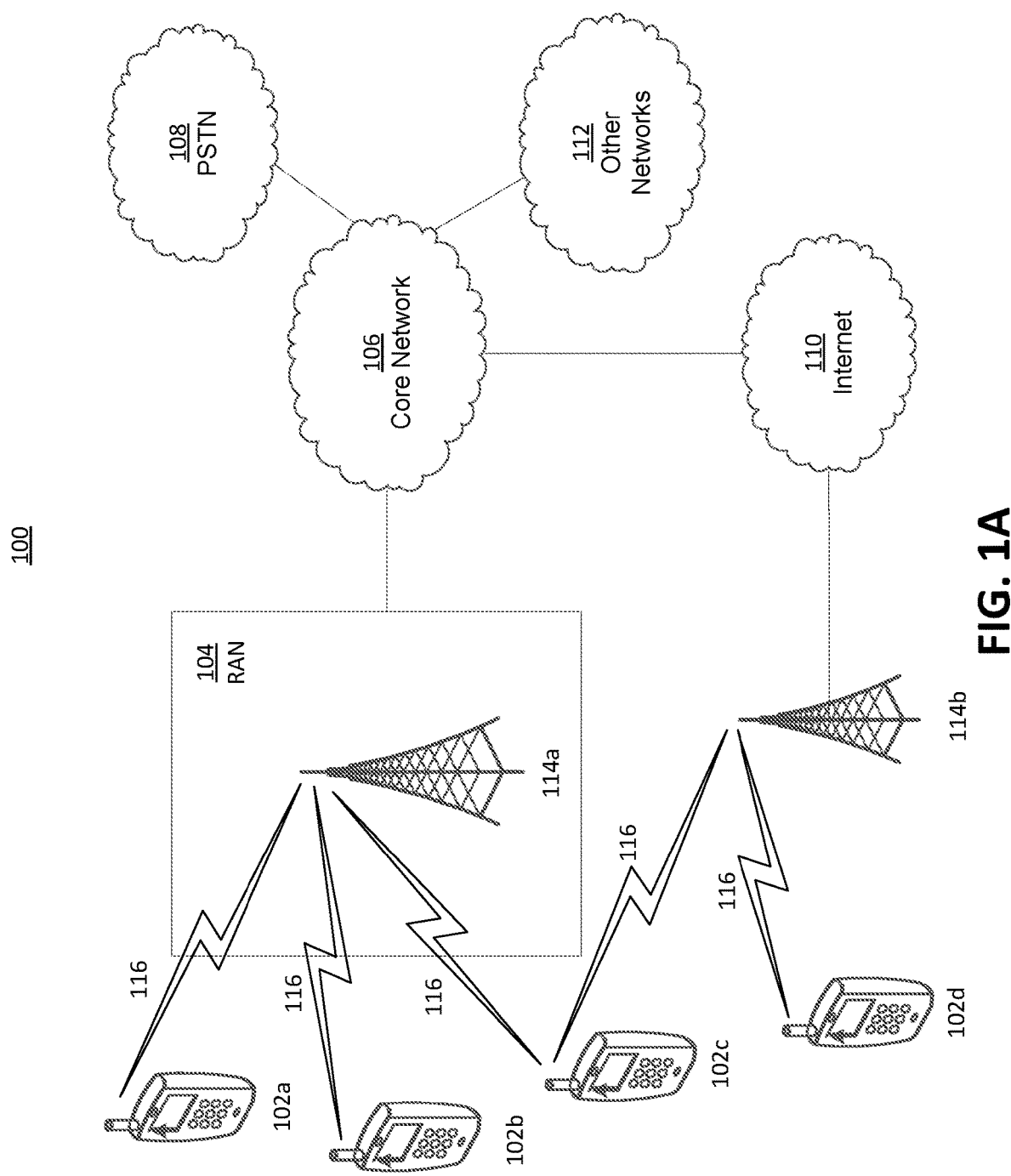
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
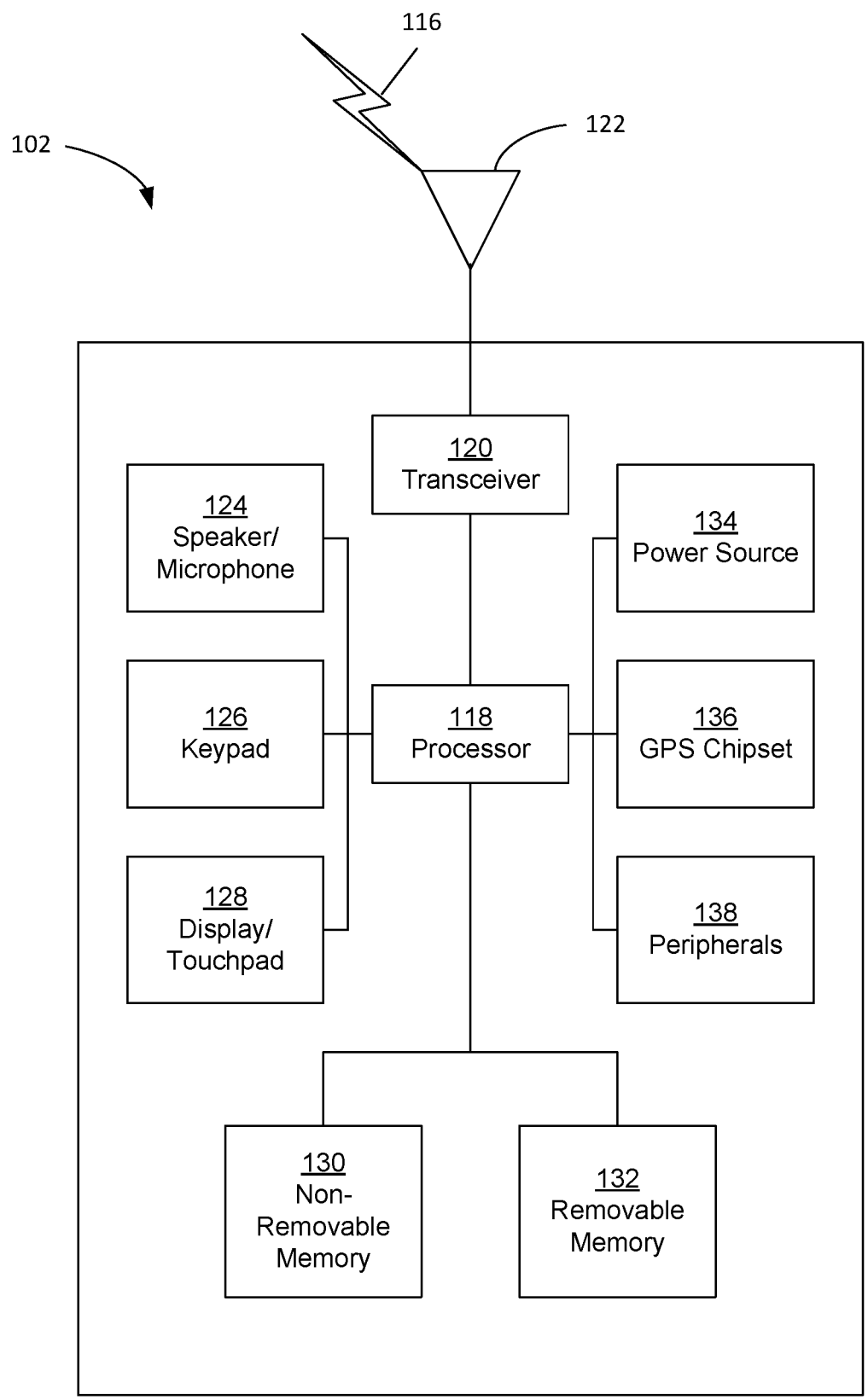
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ M IMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
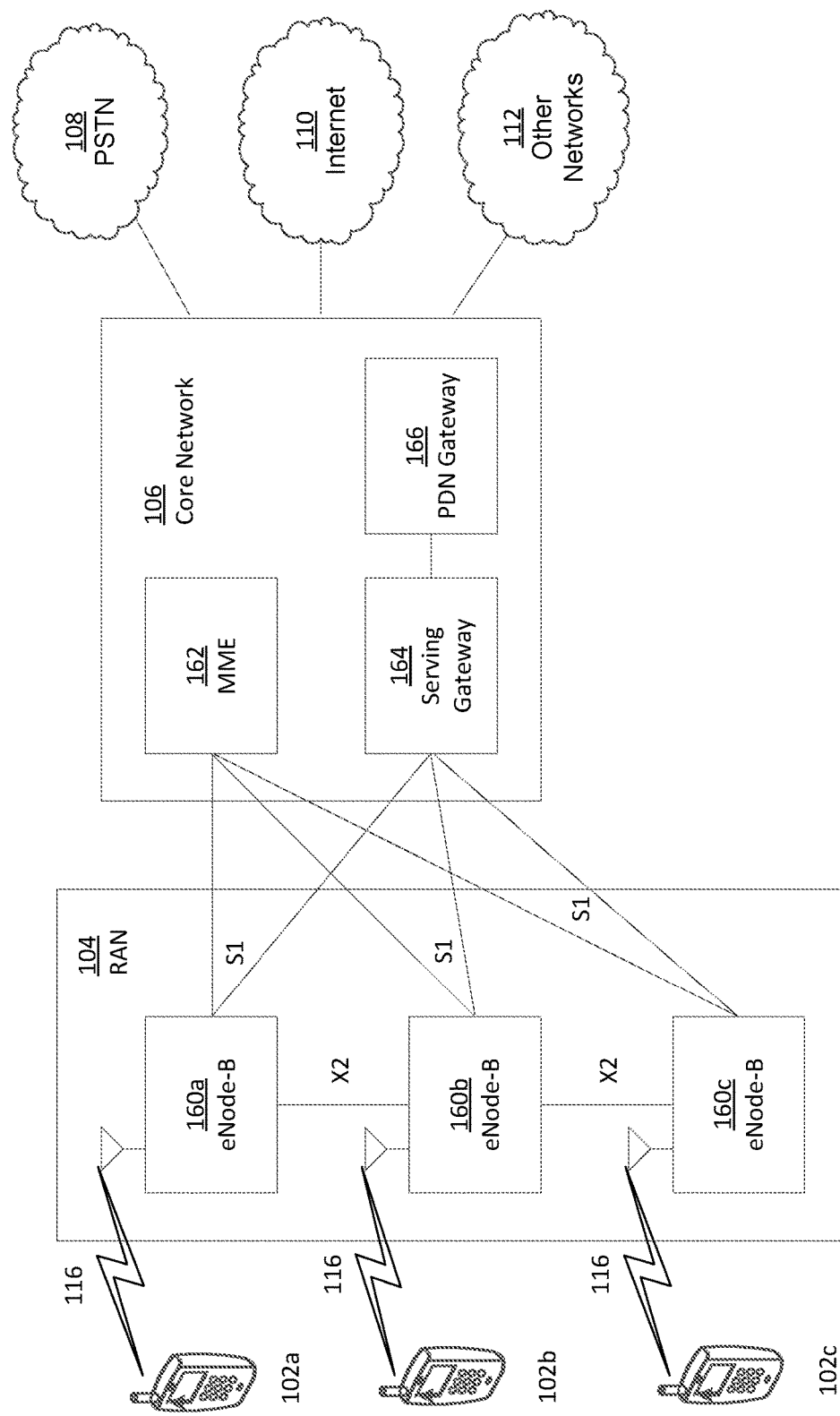
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement M IMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
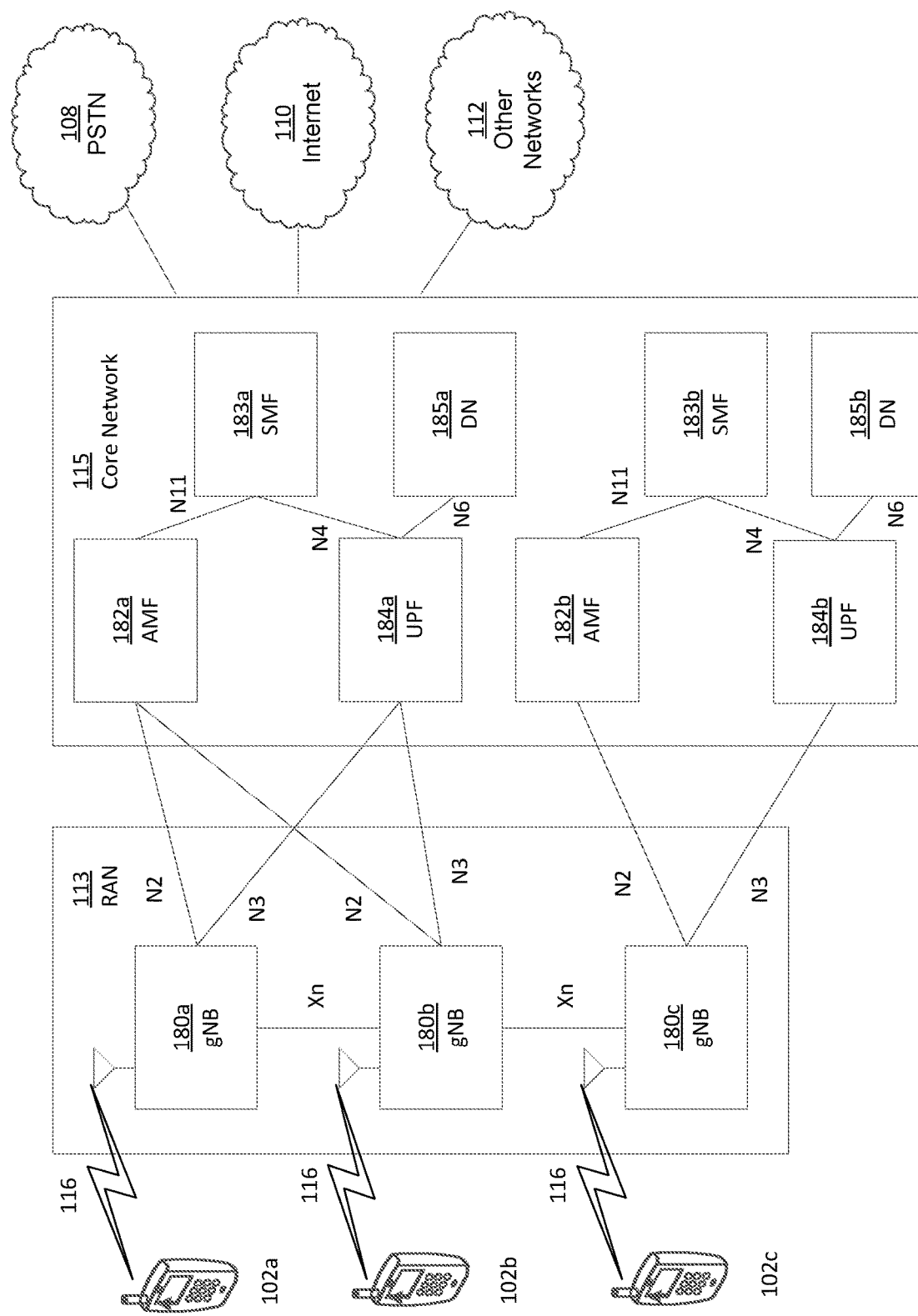
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A detailed description of illustrative embodiments will now be described with reference to the various Figures. Although this description provides a detailed example of possible implementations, it should be noted that the details are intended to be exemplary and in no way limit the scope of the application.

A polar code may be used for control channel coding (e.g., for NR). Polar codes may be capacity achieving codes, for example, like Turbo codes and LDPC codes. Polar codes may be linear block codes. Polar codes may have low encoding and decoding complexity. Polar codes may have a very low error floor and explicit construction schemes.

In examples of an (N,K) polar code, K may be an information block length and N may be a coded block length. The value N may be set, for example, as a power of 2, e.g., $N=2^n$, for some integer n. Polar codes may be linear block codes. A generator matrix of a polar code may be expressed by $G_N = B_N F^{(\otimes n)}$, where $B_N$ may be a bit-reversal permutation matrix, where $(.)^{(\otimes n)}$ may denote the n-th Kronecker power and where $$F = \begin{bmatrix} 1 & 0 \\ 1 & 1 \end{bmatrix}.$$

In examples, in an implementation of a polar code, $B_N$ may be ignored at the encoder side (e.g., for simplicity) and a bit-reversal operation may be performed on the decoder side.

Figure 2:
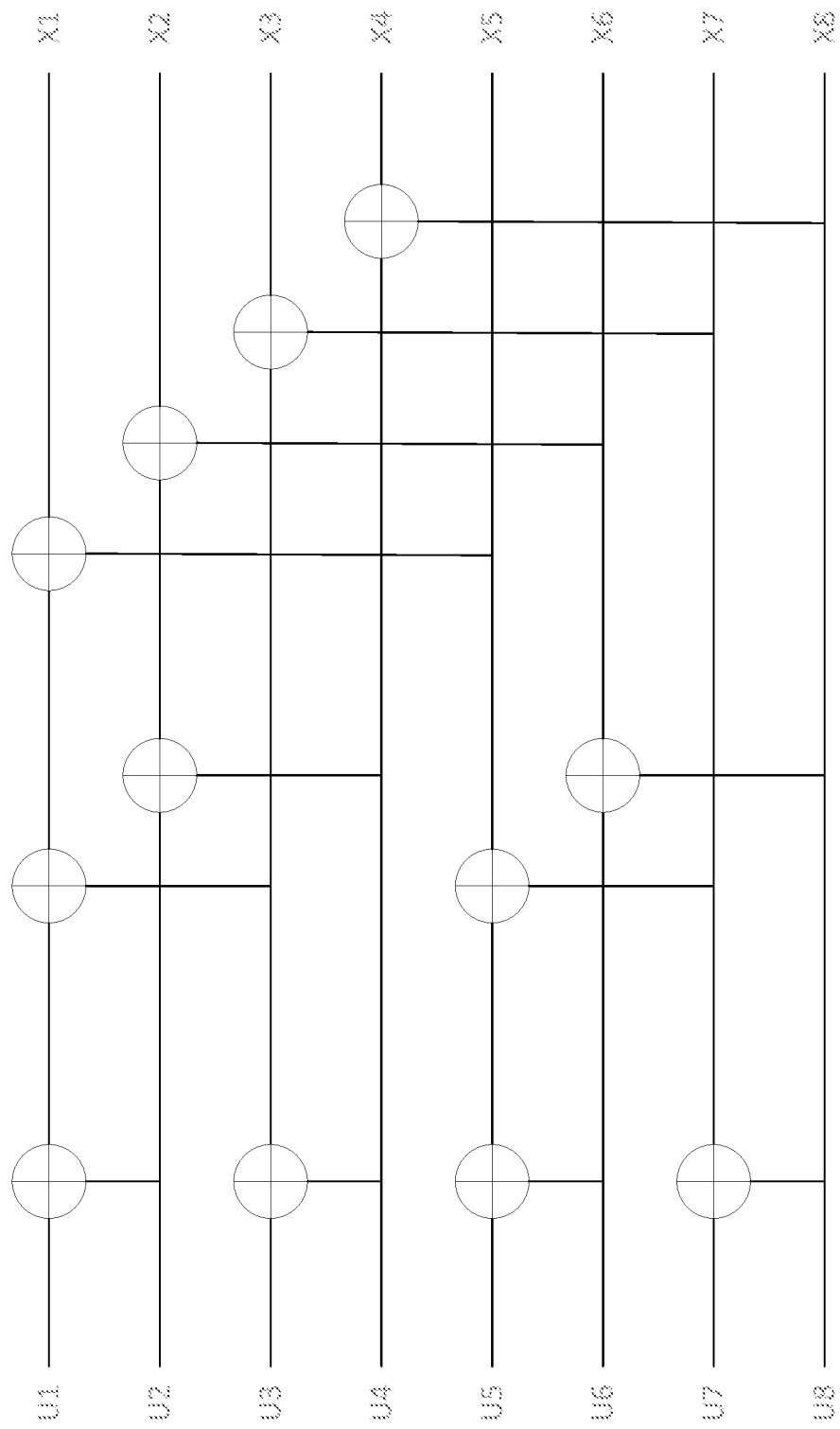
FIG. 2 is an example of a Polar encoder with N=8.

FIG. 2 is an example of a Polar encoder where N=8. FIG. 2 shows an example implementation of $F^{(\otimes 3)}$. A codeword of a polar code may be given, for example, by $x_1^N = u_1^N G_N$. Decoding schemes may include, for example, Successive Cancellation (SC) decoding and/or advanced decoding schemes (e.g., based on SC decoding, such as Successive Cancellation List (SCL) decoding and CRC-Aided SCL decoding).

A CRC-Aided (CA) polar code may comprise, for example, a polar code with a CA Successive Cancellation List (SCL) decoder. In examples of CA decoding, CRC bits may be used, for example, to select a (e.g., final) codeword from a list of candidate codewords (e.g., at the end of decoding). CRC bits may be designed and used for error correction purposes, for example, rather than error detection, although CRC bits may support (e.g., at least partially support) error detection functionality.

Polar codes may be well structured, e.g., in terms of encoding and decoding. A successful polar code may depend, for example, on a mapping of K information bits to N input bits of a polar encoder $u_1^N$. K information bits may be put on K best bit channels. The remaining N-K input bits, which are not mapped from the information bits, may be referred to as frozen bits (e.g., frozen bits may be set to 0). A set of positions for frozen bits may be referred to as frozen set F.

Best bit channel decisions may vary and may depend on real channel conditions. Bit channels may be ranked (e.g., based on their reliabilities), for example, when determining a set of frozen channels. Reliable bit channels may be ranked as good bit channels. Less reliable bit channels may be ranked as bad bit channels.

There may be multiple ways to calculate the reliability of a bit channel. Reliabilities of bit channels may be determined, for example, using Bhattacharyya bounds, Monte-Carlo estimation, full transition probability matrices estimation and Gaussian approximation. Various schemes may have different computation complexity and may apply to different channel conditions. A scheme may have a parameter called a design SNR that may be selected for use in calculating reliabilities.

Bit channel ranks may be calculated in other ways, which may not depend on SNR design (e.g., a rank sequence may be generated from a formula or expanded from a small sequence).

FIG. 3 is an example of a normal polar code. In examples (e.g., as shown in FIG. 3), information bits may be provided in high reliability bit channels while low reliability bit channels may be used for frozen bits, for example, based on a determined rank of bit channels.

A Parity Check (PC) polar code may be utilized. In examples of a PC-polar code, a subset of a frozen sub-channel set may be selected as PC-frozen sub-channels. A PC function may be established for error correction over the sub-channels. In examples, one or more decoded bites (e.g., all the decoded bits) involved in a PC function over a PC-frozen sub-channel (e.g., at each parity check sub-channel position) may be used to prune a list decoding tree. For example, paths that meet a PC-function (e.g., only paths that meet a PC-function) may survive, while remaining paths may be eliminated (e.g., eliminated on the fly). A PC function may be established (e.g., must be established) as forward-only, for example, to be consistent with a successive cancellation-based decoder.

FIG. 4 is an example of a PC polar code. FIG. 4 shows an example of bit mapping from information bits to inputs of a PC polar code.

A PC polar code may be used to remove CRC bits of CA polar codes, which may be used for error correction purposes in CA SCL decoding. This may reduce the overhead of a polar code, which may result in coding gains.

Polar codes may be used as channel codes for UL/DL control information (e.g., except for very small block sizes). CRC bits may be used for control messages, for example, to reduce a false alarm rate (FAR)

Polar codes for DL control channels may support, for example, one or more of the following: (i) J'=3 or 6; (ii) J"=0; and/or (iii) appending one or more J+J' bits. In examples where J'=3 or 6, one or more J+J' bits may be distributed (e.g., to support early termination in code construction). A bit distribution determination may consider complexity versus benefit.

CA and PC polar codes may provide better performance relative to other polar codes, for example, due to the concatenation of assistance bits such as Cyclic Redundancy Check (CRC) or Parity Check (PC). Assistance bits may be used, for example, for error detection, error correction, early termination, and/or list pruning, etc. Assistance bit aided polar codes may be used for a control channel. A J bit CRC may be provided, for example, for error detection. J' or J'+J" assistance bits may be used to support early termination. J' assistance bits may be chosen from a reliable set of assistance bit. J" assistance bits may be chosen from a less reliable (e.g., unreliable) set and J" may be set to zero for a DL control channel.

The number, length, and positions of different assistance bits (e.g., J, J', and J") for polar code construction may (e.g., must) be carefully determined, for example, to maintain required performance while minimizing a false alarm rate (FAR), latency, complexity, and power consumption. A general procedure may be used to design assistance bit aided (ABA) polar code construction (PCC), for example, to fulfill a variety of different design purposes for different channels in NR.

An eNodeB may (e.g., in LTE), for example determine a Physical Downlink Control Channel (PDCCH) format that may be transmitted to a WTRU, create an appropriate DCI, and/or attach a CRC. A CRC may be masked with a Radio Network Temporary Identifier (RNTI), for example, according to an owner or usage of PDCCH. In examples, a CRC may be masked with a WTRU unique identifier (e.g., a Cell-RNTI (C-RNTI), a Paging RNTI (P-RNTI), a Temporary C-RNTI (TC-RNTI), a Random Access RNTI (RA-RNTI), Semi Persistent Scheduling C-RNTI (SPS C-RNTI), etc.), for example, when a PDCCH may be for a specific WTRU. A WTRU receiver may find its PDCCH, for example, by monitoring a set of PDCCH candidates (e.g., using blind decoding). A WTRU may demask the CRC of a candidate DCI (e.g., the CRC of each blind decoded DCI), for example, using its RNTI. A WRTU may consider it a successful decoding attempt and may read control information within a successful candidate, for example, when a CRC error is not detected. A significant number of attempts may be required to successfully decode a PDCCH, for example, given the possibilities of different RNTIs, PDCCH candidates, DCI, and/or PDCCH formats.

NR may reduce latency, complexity, and power consumption. A WTRU may apply NR-PDCCH blind decoding. Efficient polar coding for NR-PDCCH may be used to design a polar code construction, which may facilitate early termination (e.g., before decoding all information bits) without degrading BLER performance or latency.

A Synchronization Signal (SS)-block index (e.g., time index) may be transmitted (e.g., may be explicitly transmitted) in the contents of NR-Physical Broadcast Channel (NR-PBCH). Combining NR-PBCH signals from multiple SS blocks may improve decoding performance for WTRU and, for example, may provide robustness against imperfect beamforming. Explicitly varying an SS-block index that may be contained in a payload of MIB may result in different NR-PBCH coded bits for different SS blocks. Soft combining of NR-PBCH signals from multiple SS blocks may not be straightforward. Polar coding for NR-PBCH may be carefully designed to achieve this.

Assistance bit aided (ABA) polar code construction (PCC) may be used for NR channels with different design purposes (e.g., error detection (ED), error correction (EC), early termination (ET), and/or list pruning). ABA PCC may be, for example, generic, general, or reusable (e.g., in terms of being applicable to a multitude of implementations).

Figure 5:
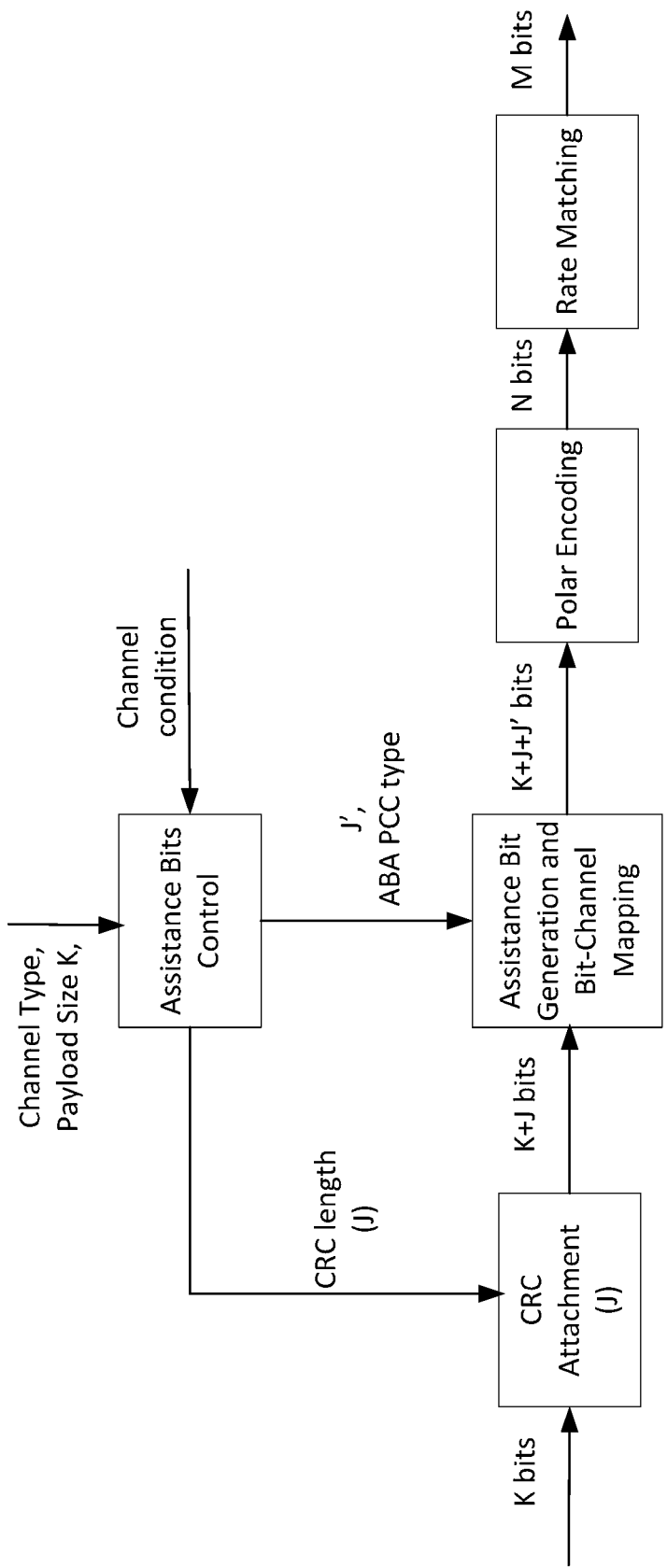
FIG. 5 is an example of Assistance Bit Aided Polar Code Construction.

FIG. 5 is an example of Assistance Bit Aided Polar Code Construction. FIG. 5 shows an example of processing ABA PCC for NR channels.

Assistance Bits Control may determine, for example, a type and length of assistance bits and associated ABA PCC type, e.g., based on channel type, payload size, and channel condition.

ABA PCC may be used, for example, for an eMBB control channel, a URLLC control channel, and/or a URLLC data channel. Channel type in NR may be, for example, a control channel (e.g., NR-PDCCH, NR-enhanced PDCCH (NR-ePDCCH), NR-PBCH, NR-Physical Uplink Control Channel (NR-PUCCH), etc.) or a data channel (e.g., NR-Physical Downlink Shared Channel (NR-PDSCH), NR-Physical Uplink Shared Channel (NR-PUSCH), etc.).

Assistance bit type, length, and position may vary and may be selected to aid polar code construction for different design purposes (e.g., objectives) or conditions (e.g., depending on varying channel type, payload, etc.). ABA PCC type may be selected, for example, from one or more of the following: CA polar, PC polar, distributed CRC polar, PC-CA polar, distributed simple parity check (DSPC) polar, hash polar, and/or other polar codes with distributed assistance bits or CRC based on a rule or criteria (e.g., any combination of them or a function of CRC generation and/or distribution).

ABA PCC may determine positions for assistance bits for bit-channel mapping to Polar Encoding.

Assistance bit type, length and position may be determined. One or more of the following may apply.

An assistance bit may be used for early termination (ET). ET assistance bit type, length, and position may be determined.

ET assistance bits may include, for example, CRC, PC, and/or hash bits, which may be denoted as J'.

A position of ET assistance bits may be, for example, distributed evenly or unevenly, e.g., by one or more of the ABA PCC combinations described herein. In examples (e.g., with a distributed CRC polar code), a given length of assistance bits may be denoted as J'. Two J' bits may be appended to or inserted next to J bits. The remaining, (e.g., J'-2) bits may be evenly or unevenly distributed with K information bits. In examples, three J' bits may be appended or next to J bits while remaining (e.g., J'-3) bits may be evenly or unevenly distributed with K information bits. In examples, (e.g., all) 6 J' bits may be evenly or unevenly distributed with K information bits. A position assignment of J' bits may be, for example, pre-defined, specified, configured (e.g., by RRC message), and/or dynamically requested and/or signaled (e.g., by $L_1$ control signaling such DCI or MAC-CE).

ET may be triggered or used, for example, for one or more of the following conditions.

ET may be triggered, for example, for low SNR. Information bits may be (e.g., very likely) decoded successfully in high SNR. In examples (e.g., based on channel condition such as CQI or SINR), assistance bits J' for ET may be set to 0 for high CQI/SINR and a non-zero value for low CQI/SINR.

An opportunity for ET may decrease (e.g., significantly), for example, when list size L increases. List size may be selected, for example, based on channel type and/or payload size. In examples (e.g., for a data channel), list size L may be a large number (e.g., 8, 16, 32). In examples (e.g., for a control channel), list size L may be a smaller number (e.g., 4, 8). List size may be selected, for example, based on a payload size. In examples, L may increase as payload size increases, e.g., based on a pre-defined or specified rule. Assistance bits J' may be set accordingly.

ET may be used, for example, for control channels and/or data channels (e.g., in Ultra Reliable Low Latency Communication (URLLC)) with large payload or information block sizes. In examples, ET may be triggered for NR control channels with information size K={32, 48, 64, 80, 120, 200}. ET may not be triggered, for example, for small information block sizes {1, 2, 4, 8, 16}.

ET may be triggered, for example, for PDCCH with a large aggregation level (e.g., 4, 8, 16) and/or a low code rate (e.g., less than ⅓).

An assistance bit may be used for error detection (ED). ED assistance bit type, length, and/or position may be determined.

ED assistance bits may include, for example, CRC bits, which may be denoted as J. A length of J may depend, for example, on a payload size. In examples, the larger the payload size, the larger the number J. J may be specified and/or selected for different channels. In examples, J may be different for downlink control information (DCI) (e.g., 16 bits) and UCI (e.g., 8 bits or 16 bits for UL with CRC). J may depend, for example, on a payload size in UL (e.g., 0 may not be precluded).

A position of ED assistance bits may be, for example, appended to a UCI or DCI payload.

An assistance bit may be used for error correction (EC). EC assistance bit type, length, and position may be determined.

EC assistance bits may include, for example, CRC or PC, which may be denoted as J' or J".

A position of EC assistance bits may be, for example, appended and/or distributed.

In examples (e.g., as shown in FIG. 5), an ABA PCC may be implemented, for example, based on one or more of the following.

An ABA PCC may be implemented, for example, based on a determined type and length of assistance bits and associated ABA PCC type (e.g., from Assistance Bits Control), e.g., one or more of the following may apply.

In examples, there may be K bits of source information of an NR channel (e.g., control channel payload DCI or uplink control information (UCI)). These bits may pass (e.g., may first pass) through (e.g., be processed by) CRC Attachment. A length, J, of CRC bits may be determined by Assistance Bits Control, which may support different lengths of CRC that may be appended to K information bits. A length, J, of CRC bits may be appended to K source bits. Source bits (e.g., with an attached CRC) may be passed to (e.g., processed by) Assistance Bit Generation and Bit-Channel Mapping.

In examples, Assistance Bit Generation and Bit-Channel Mapping may, for example, generate assistance bits J' and may map the information and one or more assistance bits (e.g., all assistance bits) (e.g., denoted as K+J+J') to proper bit channels for a polar code. This operation may depend, for example, on an ABA PCC type (e.g., as may be determined by Assistance Bits Control). A length, J', of assistance bits for ET may be (e.g., may also be) determined (e.g., determined by Assistance Bits Control). ABA PCC may determine positions for assistance bits for bit-channel mapping to Polar Encoding, for example, for one or more of the following (e.g., any combination of) ABA PCC types: CA polar, PC polar, distributed CRC polar, PC-CA polar, distributed simple parity check (DSPC) polar, and Hash polar.

Polar Encoding may, for example, perform one or more polar encoding operations, such as generate a matrix of $G_N = B_N F^{(\otimes n)}$ or $G_N = F^{(\otimes n)}$.

Polar encoded bits may be sent to Rate Matching, which may, for example, perform repetition operations and/or puncturing operations (e.g., based on a puncturing vector that may be generated from a Rate Matching (RM) algorithm that may be used).

Polar coding may be provided for a control channel. An eNodeB may (e.g., in LTE) determine a PDCCH format to be transmitted to a WTRU, create an appropriate DCI, and attach a CRC. A CRC may be masked with an RNTI, for example, according to an owner or usage of PDCCH. A CRC may be masked with a WTRU unique identifier (e.g., C-RNTI P-RNTI, TC-RNTI, SPS C-RNTI, etc.), for example, when a PDCCH may be for a specific WTRU. A WTRU receiver may find its PDCCH, for example, by monitoring a set of PDCCH candidates (e.g., using blind decoding). A WTRU may de-mask a control candidate's CRC (e.g., each control candidate's CRC), for example, using its RNTI. A WRTU may consider it a successful decoding attempt and may read control information within a successful candidate, for example, when a CRC error is not detected. A significant number of attempts may be required to successfully decode a PDCCH, for example, given possibilities of different RNTIs, PDCCH candidates, DCI, and/or PDCCH formats.

A WTRU (e.g., in NR) may blind decode a full set of PDCCH. The sooner the decoder finishes testing one or more hypotheses, the sooner the decoder memory may be powered down. Early termination (ET) may reduce latency (e.g., overall latency), complexity, and/or power consumption. ET may be implemented, for example, by multi-stage (e.g., a two-stage) early termination based polar coding for NR-PDCCH (e.g., as shown by example in FIG. 6).

Figure 6:
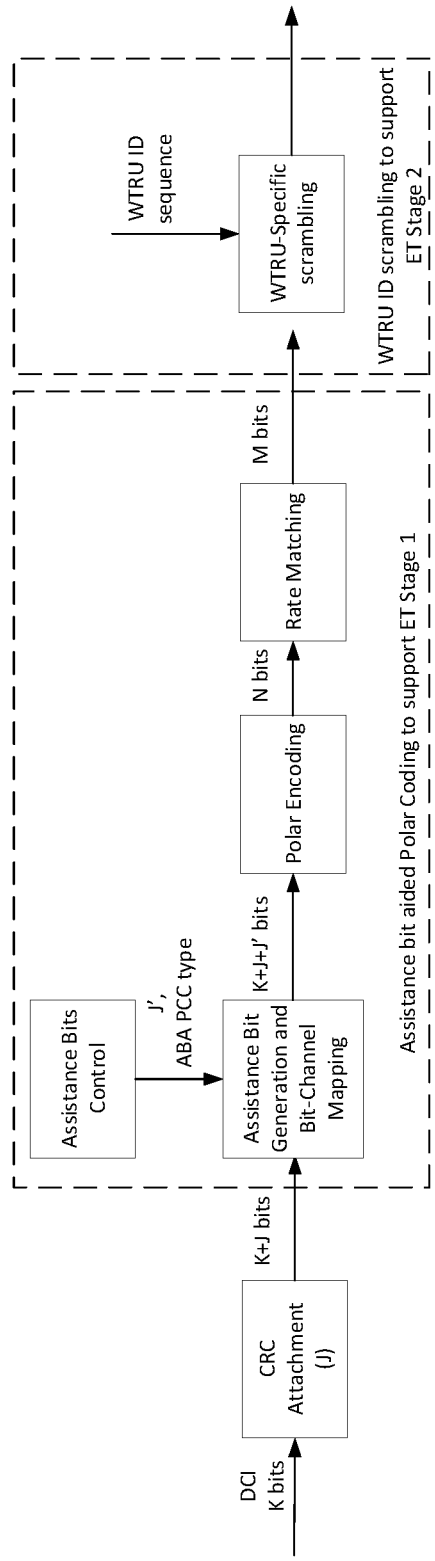
FIG. 6 is an example of polar coding for New Radio Physical Downlink Control Channel (NR-PDCCH) to support two-stage early termination.

FIG. 6 is an example of polar coding for NR-PDCCH to support two-stage early termination. Early termination (e.g., before decoding all information bits) may be facilitated (e.g., without degrading BLER performance or latency), for example, by two-stage ET based polar coding (e.g., for NR-PDCCH). A first stage may comprise, for example, assistance bit aided (ABA) polar code construction (PCC) for ET. A second stage may comprise, for example, UE-ID based UE-specific scrambling, which may support two-stage ET at a receiver/WTRU side. This WTRU-specific scrambling scheme may be applied (e.g., jointly applied) with the CRC bits masked with WTRU-ID, e.g., as described herein.

Two-stage ET decoding for NR-PDCCH may be supported by two-stage ET based polar coding for NR-PDCCH, which may be implemented at a transmitter (e.g., gNB).

In examples of a first stage (e.g., Stage 1), ABA Polar Coding for NR-PDCCH may be used to support ET Stage 2 ABA Polar Code Based ET.

Assistance bits J' for ET may be distributed in a codeword, for example, so that error detection may be performed after partial decoding by one or more indicated procedures (e.g., procedures indicated by or for an ABA PCC type).

A selected ABA PCC procedure may be used for NR-PDCCH, for example, to determine a position and sub-channel mapping of assistance bits J'. An ET-enabled SCL-8 decoder may be, for example, a default or baseline for Stage 1 ABA polar coding.

In examples, at a first stage (e.g., stage 1), an "Assistance Bits Control" block may determine that J' is equal to 0, and the ABA PCC type is distributed CRC polar. An "Assistance Bit Generation and Bit-Channel Mapping" block may map the information and assistance bits (e.g., the information and all assistance bits) denoted as (K+J+J') to the respective bit channels for a polar code (e.g., at the "Polar Encoding" block). A "Polar Encoding" sub-block may perform polar encoding operations (e.g., the regular polar encoding operations), and the polar encoded bits may be sent to a "Rate Matching" block, e.g., as described above.

In examples, at a second stage (e.g., Stage 2), a coded NR-PDCCH (e.g., after ABA polar encoding and rate matching (RM)) may be scrambled with a WTRU-ID sequence, which may support ET at Stage 1 on the receiver/WTRU side (e.g., using WTRU-ID based ET).

WTRU-ID sequences may be generated by a variety of procedures, including one or more of the following example procedures.

In examples, a WTRU-ID sequence may be one or more Pseudo-random sequences. An example of a WTRU-ID sequence may be defined by a Gold sequence (e.g., similar to a cell-specific scramble sequence). A scrambling sequence generator may be initialized with a WTRU-ID (e.g., instead of only a cell-ID). In examples, a WTRU-ID sequence may be one or more Zadoff-Chu sequences with different cycle shifts corresponding to WTRU-ID. In examples, a WTRU-ID sequence may be any sequences (e.g., any sequence with a good auto and cross correlation function).

In examples, a WTRU-ID sequences may be defined as WTRU-ID signatures, which may be mapped and indicated by one or more sets of orthogonal signatures.

In examples, a WTRU-ID may be polar encoded with a mother code length (e.g., the same mother code length as an ABA polar code for DCI) and/or may be (e.g., may then be) scrambled (e.g., by an XOR operation). This procedure may be used, for example, when a PC polar code may be used in Stage 1 ABA polar coding (e.g., PC-CA polar code). A WTRU-ID may be (e.g., may alternatively be) placed in frozen bits and joint coded with DCI via an ABA polar encoder (e.g., PC-CA polar encoder with a restriction that assistance bits such as PC bits may not be put into the same bit channel as WTRU-ID).

Figure 7:
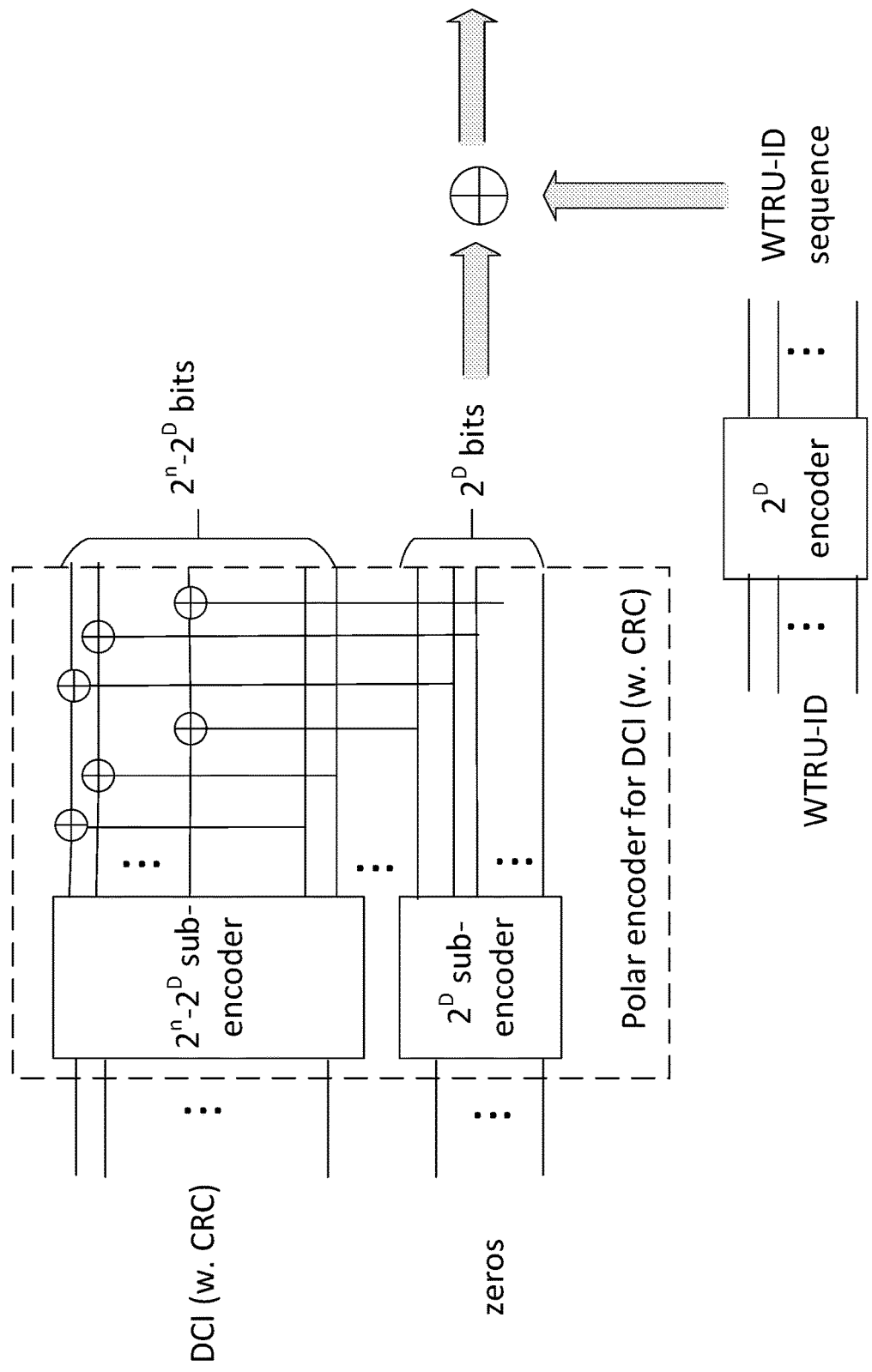
FIG. 7 is an example of an ABA polar encoding for DCI with CRC and its combination with polar encoding for WTRU-ID.

FIG. 7 is an example of an ABA polar encoding for DCI with CRC and its combination with polar encoding for UE-ID (e.g., WTRU-ID). A mother code length of polar code may be, for example, $N=2^n$ bits. Polar encoding of the DCI with CRC may, for example, manually set the last 2D bit channels at the bottom of encoder as zero. Actual information may be isolated to the top part of the bit channels. This may reserve the bottom part of the bit channels for a (e.g., later) combination with the UE-ID codeword or UE-ID sequence. Polar encoding of a WTRU-ID may use a polar code with mother code length 2D bits. Encoded bits of the DCI with CRC may be combined with the encoded bits of UE-ID. Encoded bits for the former part may be $2^n$ bits while encoded bits for the latter part may be 2D bits. The combination may comprise an XOR of the last 2D bits of the former part with the encoded bits for the latter part.

Figure 8:
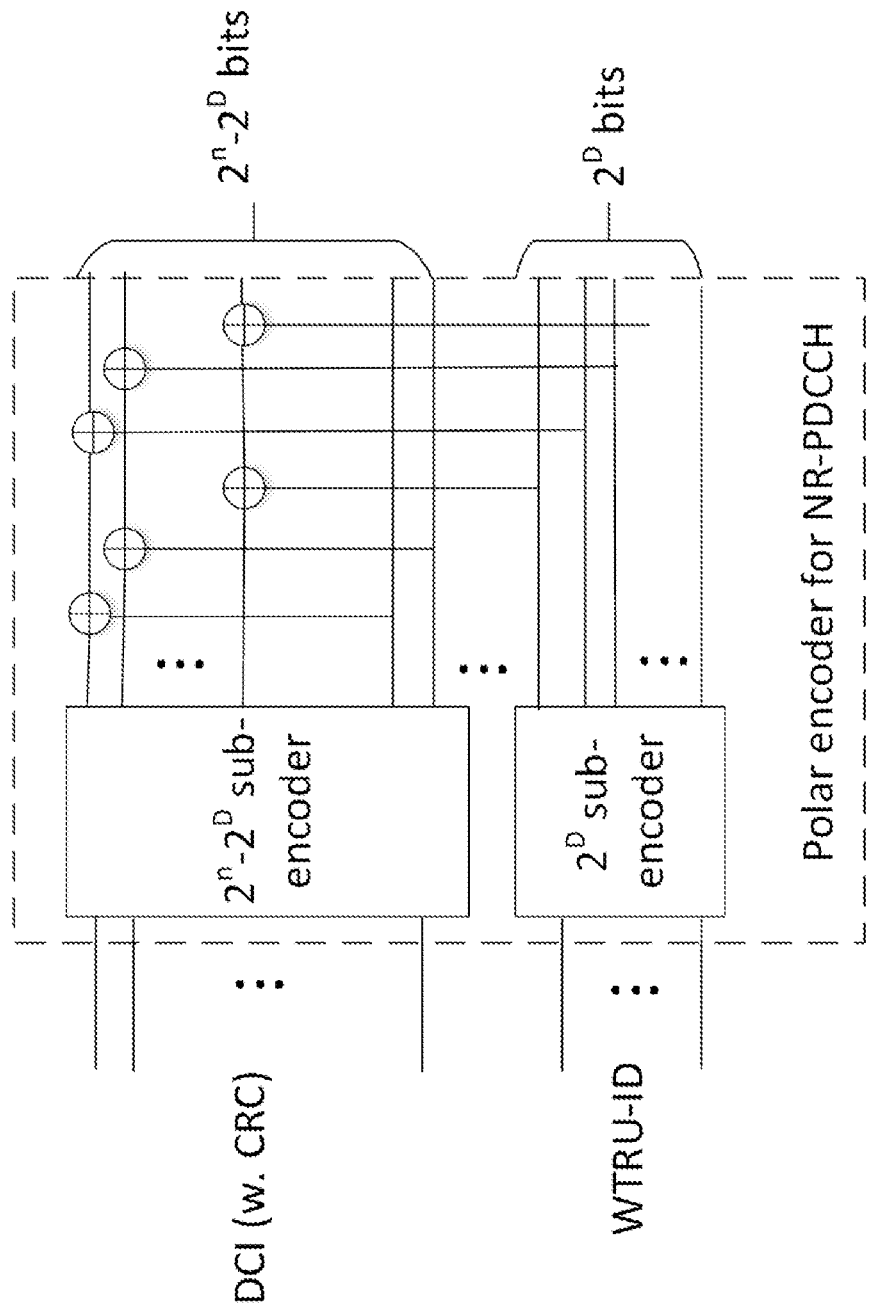
FIG. 8 is an example of two-stage mapping and ABA polar encoding for NR-PDCCH.

FIG. 8 is an example of a two-stage mapping and polar encoding for NR-PDCCH. In examples, a WTRU-ID may be mapped to the bottom 2D sub-encoder while a DCI with CRC may be mapped to the top $2^n$-$2^D$ sub-encoder. The two sub-encoders may be connected, for example, at the last stage of the encoding process. Sub-encoders may illustrate the two-stage mapping for NR-PDCCH polar encoding.

Figure 9:
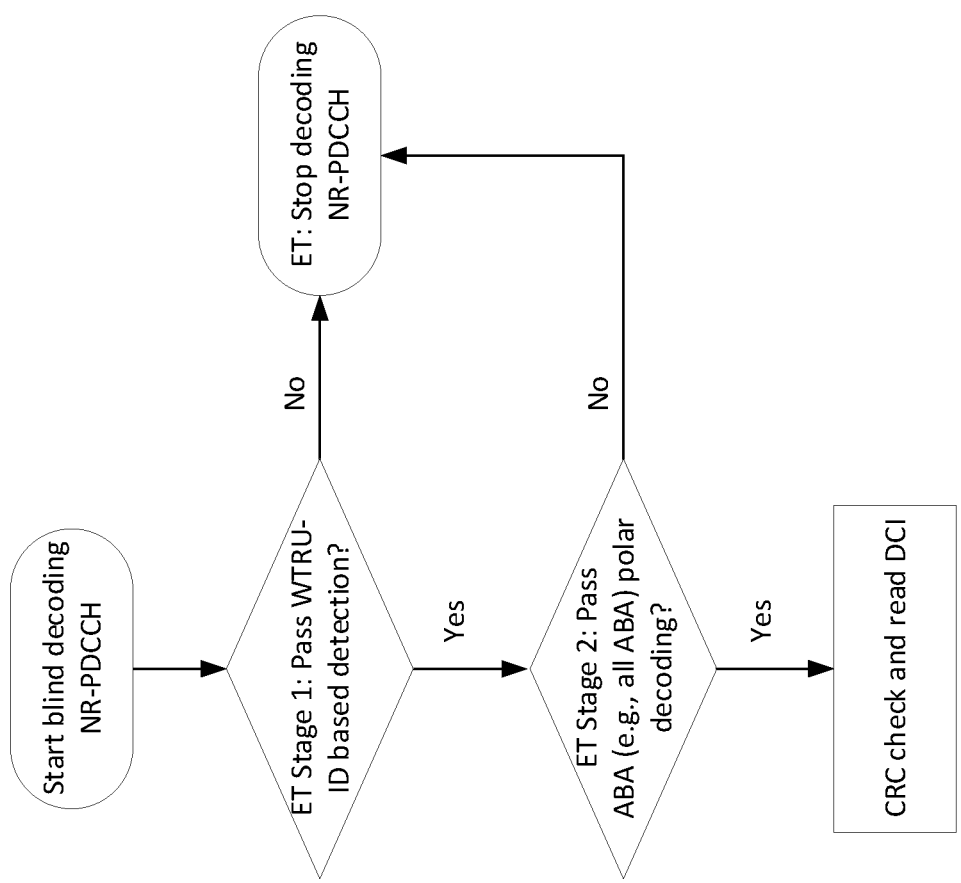
FIG. 9 is an example of Two-Stage Early Termination Decoding for NR-PDCCH.

At a receiver side, a WTRU may execute a multi-stage (e.g., a two-stage) Early Termination Decoding for NR-PDCCH (e.g., as shown by example in FIG. 9).

FIG. 9 is an example of two-stage early termination (ET) Decoding for NR-PDCCH. In examples, there may be two stages of decoding for NR-PDCCH, for example, to facilitate early termination (e.g., to reduce latency, power, and/or complexity at a WTRU).

A WTRU may (e.g., on a condition of receiving an NR-PDCCH) start to perform a blind decoding. The WTRU may (e.g., to facilitate early termination before decoding all the information bits) use ET stage 1 WTRU-ID based detection or descrambling to determine whether an NR-PDCCH transmission is intended for the WTRU. The WTRU may stop decoding the NR-PDCCH and trigger ET in stage 2, for example, when a received NR-PDCCH is not intended for the WTRU (e.g., the WTRU determines that the NR-PDCCH is not intended for the WTRU). As illustrated in FIG. 9, ET Stage-1 WTRU-ID based descrambling may assist the ET feature of ET Stage-2 (e.g., to terminate the PDCCH polar decoding of unintended or undesired WTRUs even earlier). The WTRU may generate a (de)scrambling sequence using the techniques described herein. In examples, early termination in polar decoding may be achieved with the joint operation of a first descrambling of a PDCCH transmission and the assistance bits (e.g., CRC bits). A WTRU may start to decode an NR-PDCCH (e.g., by ABA polar decoding), for example, when a received NR-PDCCH is intended for the WTRU. A WTRU may execute ET stage 2, for example, to determine whether (e.g., all) ABA polar decoding passed (e.g., based on assistance bits, which may include distributed CRC for ET) while decoding a control channel. A WTRU may stop NR-PDCCH decoding and trigger ET, for example, when ABA decoding does not pass. A WTRU may execute a CRC check and obtain DCI from a successfully decoded NR-PDCCH, for example, when the ABA polar decoding passes.

Polar coding may be provided for NR-PBCH. For example, Polar coding for a NR-PBCH may combine SS blocks (e.g., after CRC attachment).

An SS-block index (e.g., time index) may be transmitted (e.g., explicitly transmitted) in the contents of NR-PBCH.

Soft combining NR-PBCH signals from multiple SS blocks may improve decoding performance. An explicit SS-block index in a payload of a MIB may result in different NR-PBCH coded bits for different SS blocks. Accordingly, soft combining NR-PBCH signals from multiple SS blocks may not be straightforward.

Soft combining NR-PBCH signals from multiple SS blocks may be facilitated, for example, by carefully designing a polar code construction. In examples, an SS block time index may be encoded so that it may be isolated from a non-time index payload. A receiver with multiple NR-PBCH signals from different SS blocks may combine NR-PBCH signals, for example, after puncturing a section of coded bits corresponding to SS blocks.

Figure 12:
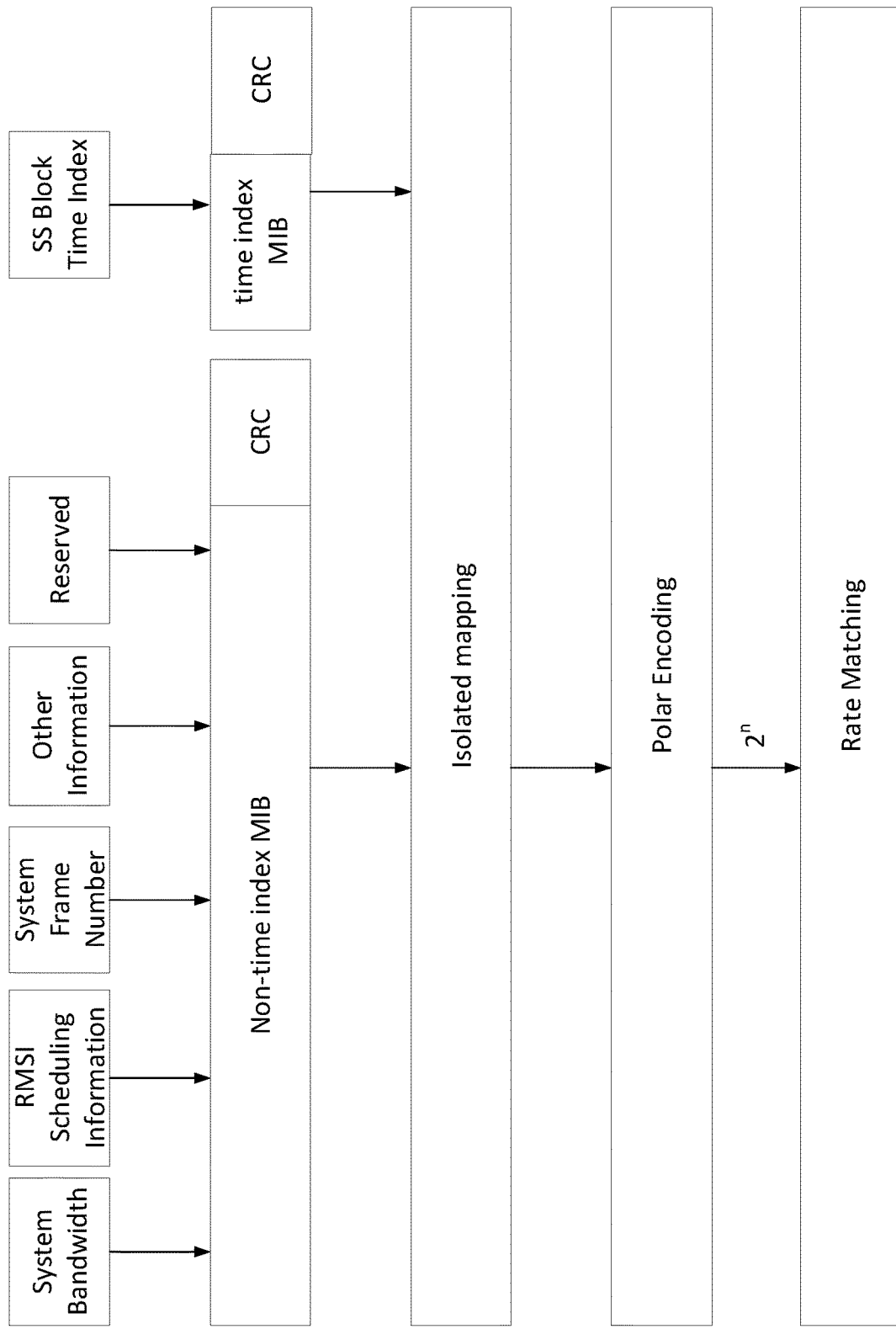
FIG. 12 is an example of an NR-PBCH coding procedure with joint encoding.

FIG. 12 is an example of an NR-PBCH coding procedure with joint encoding. In examples, a payload of an MIB may be separated into parts, for example: (1) a time index payload (e.g., SS block index and/or half radio frame timing) and (2) non-time index payload (e.g., SFN, bandwidth, etc.).

A part (e.g., each part) of MIB payloads may be attached with separate CRCs. A CRC length for a non-time index MIB may be different from a CRC length for a time-index MIB. A larger CRC length may be used for a non-time index MIB than a CRC length for a time-index MIB. It may be assumed that the summation of multiple (e.g., two) CRC lengths is given. For example, if a total of 24 CRC bits are assigned, then CRC for non-time index MIB may be 19 bits, and the CRC for time-index MIB may be 5 bits.

Figure 13:
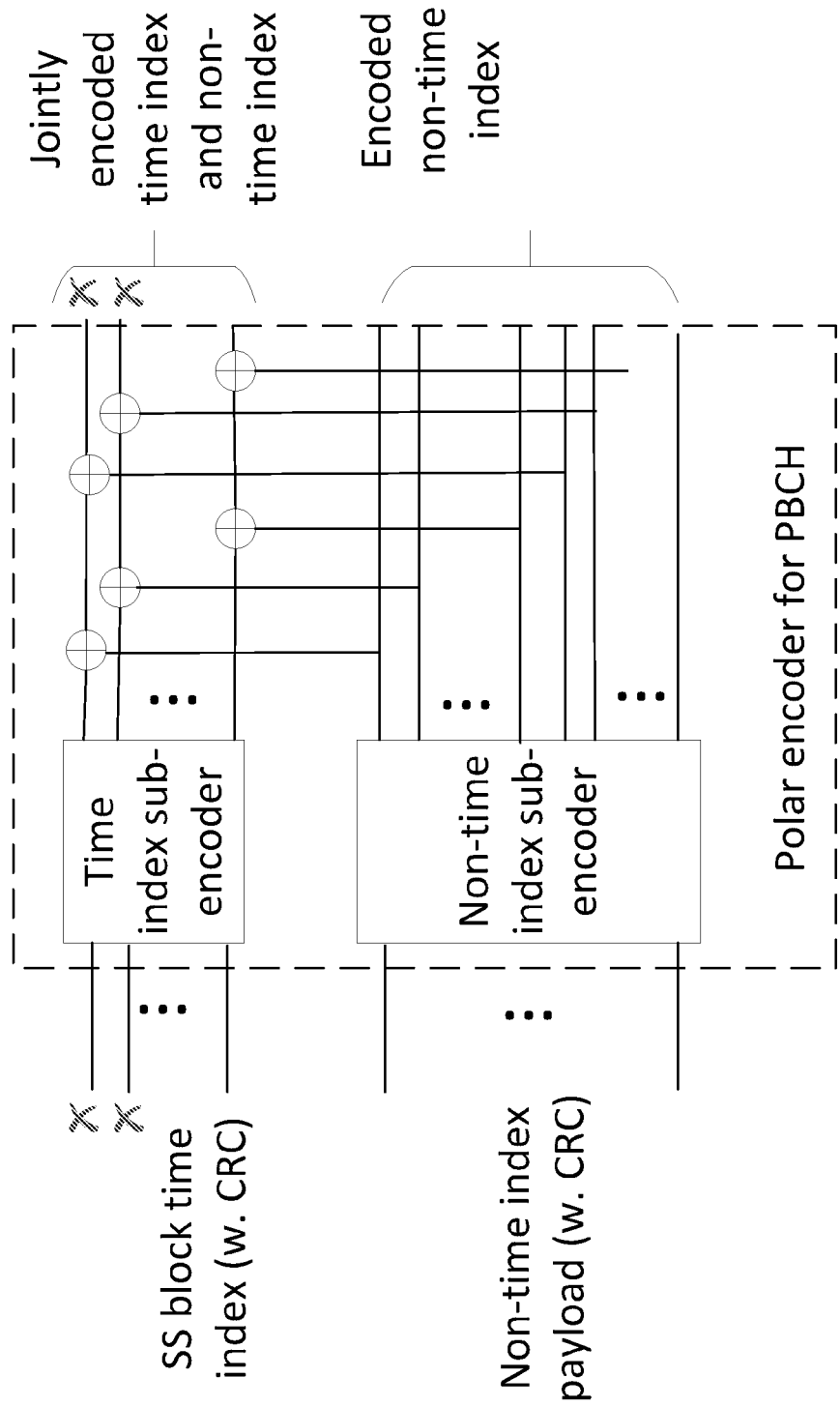
FIG. 13 is an example of isolated mapping and polar encoding operations for NR-PBCH.

In examples, a mother code length of polar code may be $N=2^n$ bits. A time index MIB with CRC may be mapped to the first $2^t$ bit channels at the top of an encoder (e.g., for some integer t). A non-time index MIB with a CRC may be mapped to remaining bit channels at the bottom of an encoder (e.g., as seen in FIG. 13).

A non-time index MIB part may receive prioritized mapping (e.g., further prioritized mapping) to bit channels on the bottom of an encoder, for example, depending on payload contents and their importance level. Mapping of a non-time index MIB part and mapping of a time index MIB part may depend on a rate matching or puncturing scheme to be used. In examples (e.g., with a natural puncturing scheme), a certain amount of bits may be punctured from the top. Corresponding input bit channels may be (e.g., may also be) set to zero. These bits may be at the top of bit channels, e.g., together with a time index MIB part.

Source bits may be (e.g., may then be) passed to a polar encoder with generator matrix $F_2^{(\otimes n)}$, where $(\bullet)^{(\otimes n)}$ may denote an n-th Kronecker power and $$F_2 = \begin{bmatrix} 1 & 0 \\ 1 & 1 \end{bmatrix}.$$

A puncturing type of rate matching operation may be used for a polar codeword, for example, to fit given resource blocks for NR-PBCH.

Figure 14:
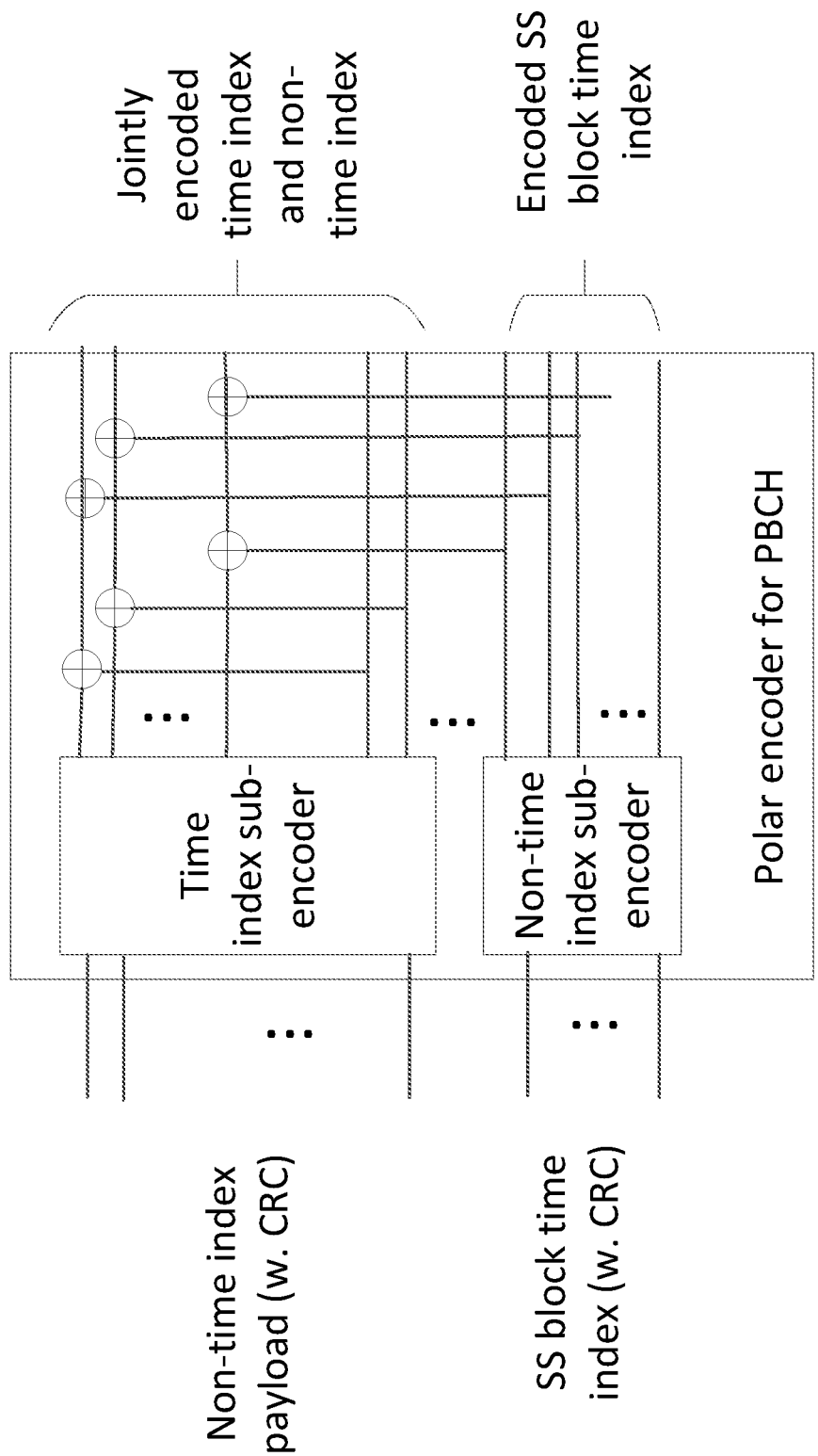
FIG. 14 is an example of isolated mapping and/or polar encoding for NR-PBCH (e.g., with an SS block time index (ice) put to the end of encoder).

In examples, the time index MIB with CRC may be mapped to the last $2^t$ bit channels at the bottom of an encoder (e.g., for some integer t). The non-time index MIB with CRC may be mapped to the remaining bit channels at the top of the encoder (e.g., as seen in FIG. 14).

For the non-time index MIBs part, a scheme may map pieces of information to the bit channels (e.g., depending on an importance level of a piece of information).

Figure 10:
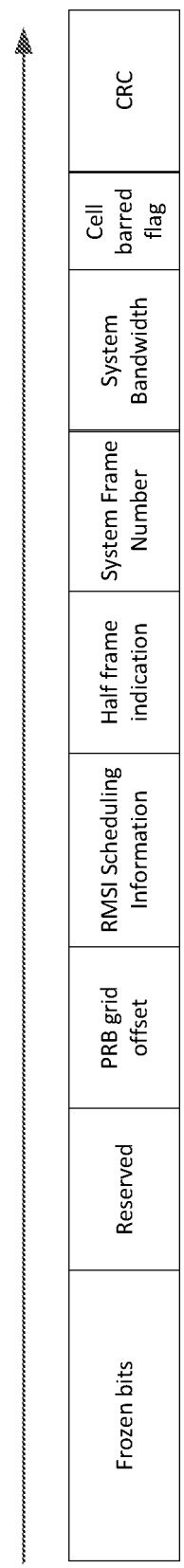
FIG. 10 is an example of bit channel mapping for non-time index MIBs (e.g., based on information importance).

More important information may be assigned to more reliable bit channels. FIG. 10 shows an example of bit channel mapping for non-time index MIBs part. In examples, the CRC bits may be assigned to a more reliable bit channel(s) (e.g., the most reliable bit channels). Less important information may be assigned to less reliable bit channels. The importance of the information may be positively correlated with the level of the reliability of the bit channels. For example, the cell barred flag and/or the system bandwidth information may be less important than the CRC bits and may be assigned to the bit channel(s) of a level(s) of reliability that is next to the level of the reliability associated with the CRC bits.

The system frame number (SFN) and/or half frame indication (HFI) may be less important than the CRC bits, the cell barred flag and the system bandwidth information, and may be assigned to the bit channel(s) of a level of reliability that is lower than the level of reliability. The reserved field may be assigned to a less reliable (e.g., the least reliable) bit channel(s).

In examples, pieces of information may be mapped to a bit channel(s) (e.g., depending on the information stability level).

Figure 11:
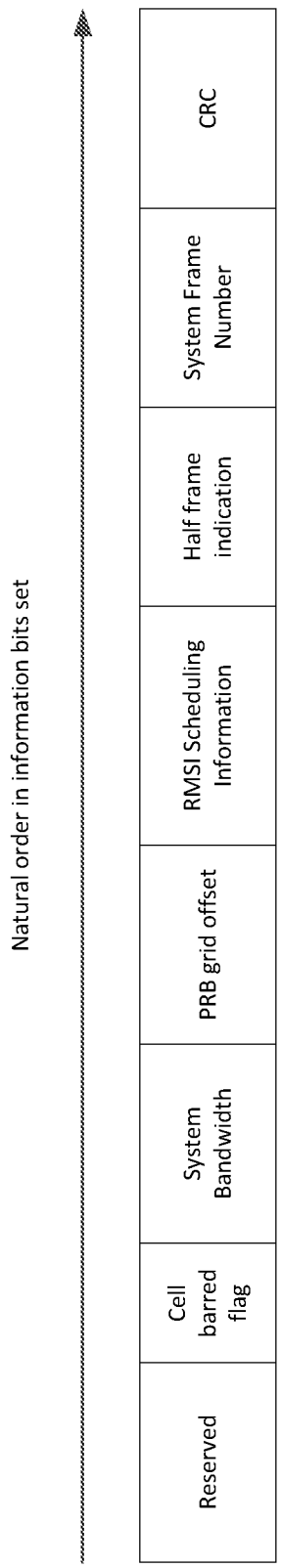
FIG. 11 is an example of bit channel mapping for non-time index MIBs (e.g., based on information stability).

More static system information may be assigned to the front bit channel(s). Less static system information may be assigned to the end bit channel(s). FIG. 11 shows an example of bit channel mapping for the non-time index part of an MIBs. Within an information bit set, the CRC bits may be (e.g., may always be) put to the end bit channel(s), for example, in a natural order. The semi-static information (e.g., system frame number and/or half frame indication) may be put next to CRC bits. Other system information may be put to the front bit channel(s). Features described herein may facilitate the decoding at a WTRU side. The WTRU may know or already knew the static system information, for example, from some previous MIB decoding. The WTRU may obtain (e.g., may need to obtain) a different (e.g., new) system frame number and/or half frame indication, for example, for the WTRU's current PBCH decoding. The WTRU may consider the other static system information as previously obtained bits, and/or directly decode the semi-static system information.

In examples, more static system information may be assigned to the end bit channel(s), and/or less static system information may be assigned to the front bit channel(s). The decoding of less static system information may be facilitated. The less static system information may be decoded first.

The mapping of the non-time index MIB part and/or the mapping of the time index MIB part may depend on a rate matching or puncturing scheme to be used. In examples, with a natural puncturing scheme, an amount (e.g., certain amounts) of bits may be punctured from the top. The corresponding input bit channels may be set to be zero. The corresponding input bit channels may be at the top of bit channels, for example, together with the time index MIB part.

FIG. 13 is an example of isolated mapping and polar encoding operations for NR-PBCH. In examples, an SS block time index with CRC may be mapped to the top $2^t$ inputs of the the time index sub-encoder. A non-time index payload with CRC may be mapped to the bottom $2^n-2^t$ sub-encoder. Multiple (e.g., two) sub-encoders may be connected at the last stage of an encoding process. Sub-encoders may be used to illustrate isolated mapping for NR-PBCH polar encoding.

Rate matching may be considered. A puncturing scheme may be selected as a rate matching scheme, for example, due to a low coding rate for NR-PBCH. In examples, puncturing may be applied from the top of the output bits. Corresponding input channels may be set to 0. An SS block time index may (e.g., then) be put to the remaining bit channels of a sub-encoder.

FIG. 14 shows an example of isolated mapping and/or polar encoding operations where SS block time index is put to the end of encoder. The SS block time index with CRC may be mapped to the bottom $2^t$ sub-encoder. The non-time index payload with CRC may be mapped to the top $2^n-2^t$ sub-encoder. The two sub-encoders may be connected at some (e.g., the last) stages of an encoding process. Sub-encoders may be used to illustrate the isolated mapping, for example, for NR-PBCH polar encoding. In examples, an isolated mapping may be that the SS block time index with CRC is put to the n/t bit channels (e.g., every n/t bit channels).

Figure 15:
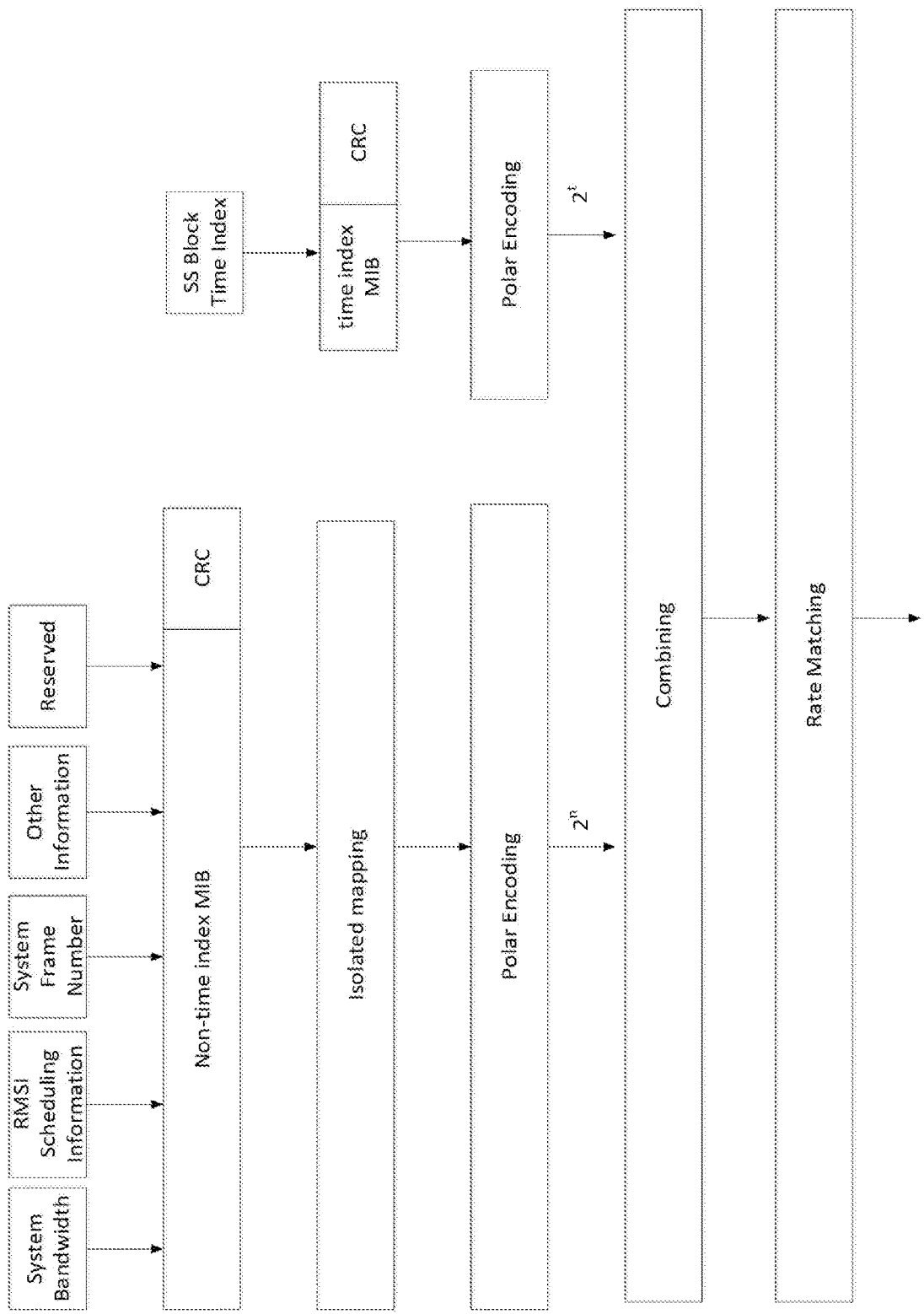
FIG. 15 is an example of an NR-PBCH coding procedure with separate encoding.

FIG. 15 is an example of an NR-PBCH coding procedure with separate encoding. An SS block index and other non-time index MIB information may be jointly encoded (e.g., as shown by example in FIG. 12). This encoding process may be used for each SS block index value, which may be inefficient. In an (e.g., alternative) example, an SS block index may be encoded separately from non-time index MIBs.

In examples, payloads of MIB may be separated into two parts: (1) a time index payload (e.g., SS block index and half radio frame timing) and (2) non-time index payload (e.g., SFN, bandwidth, etc.).

A (e.g., each) part of MIB payloads may be attached with separate CRCs. A CRC length for a non-time index MIB may be different from a CRC length for a time-index MIB. A larger CRC length may be used for a non-time index MIB than a CRC length for a time-index MIB.

In examples, a mother code length of polar code may be $N=2^n$ bits. A non-time index MIB may be polar encoded by (e.g., manually) setting the first $2^t$ bit channels at the top of an encoder to zero (e.g., for some integer t). Actual information may be isolated to the bottom part of bit channels. This may reserve the top part of bit channels for later combination with a time index MIB. This operation may be performed once (e.g., may be performed only once) for one or more (e.g., all) possible SS blocks for a certain value of SFN.

An SS block index MIB may be polar encoded, for example, by using a polar code with a mother code length of $2^t$ bits. This operation may be performed (e.g., once) for a (e.g., each) possible SS block.

Encoded bits of a non-time index MIB may be combined with encoded bits of an SS block index MIB. Encoded bits for the former part may be, for example, $2^n$ bits while encoded bits for the latter part may be, for example, $2^t$ bits. A combination may comprise an XOR of the first $2^t$ bits of the former part with encoded bits for the latter part.

Figure 16:
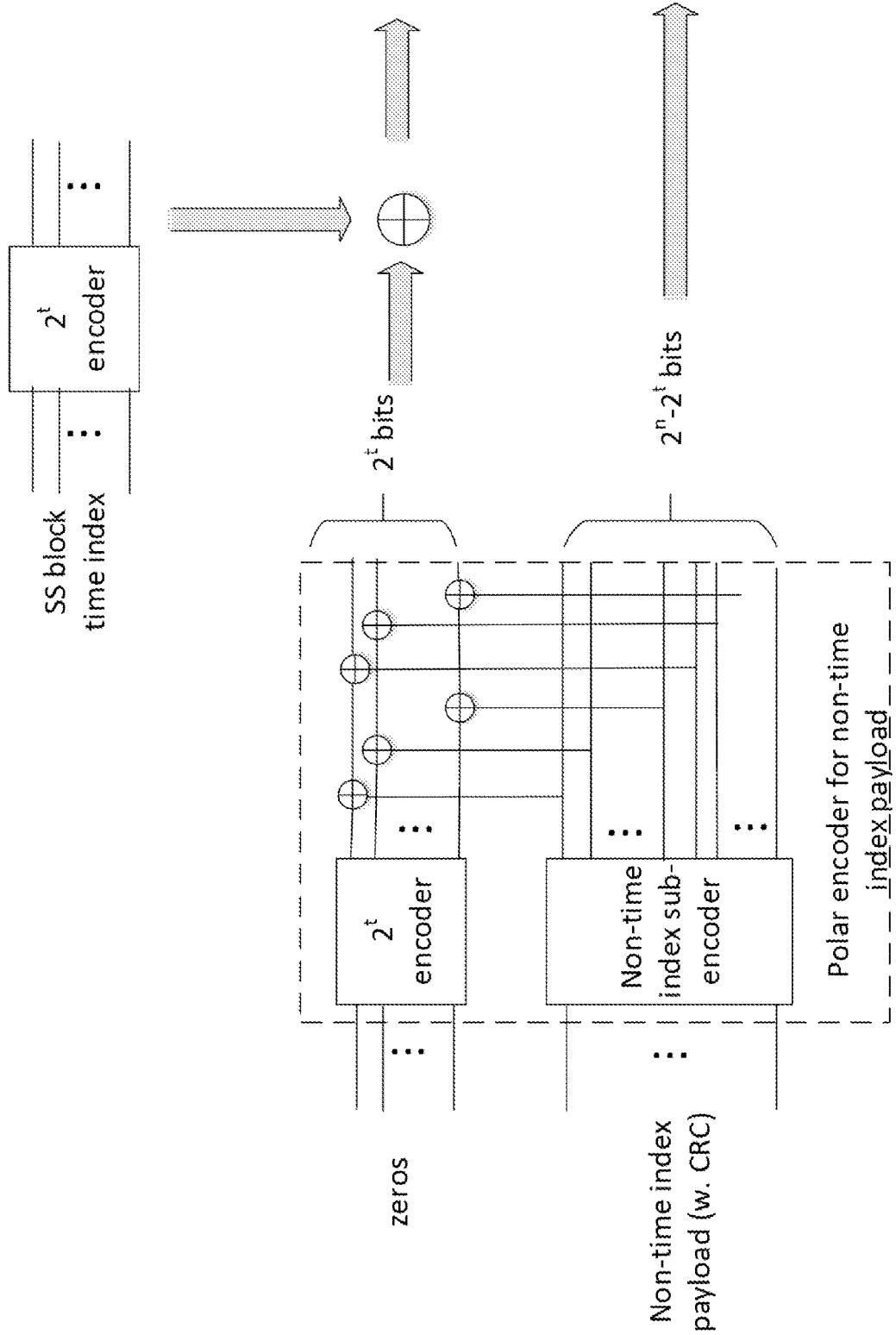
FIG. 16 is an example of isolated mapping and polar encoding for a non-time index MIB and its combination with polar encoding for an SS block index MIB.

FIG. 16 is an example of isolated mapping and polar encoding for a non-time index MIB and its combination with polar encoding for an SS block index MIB. FIG. 16 shows an example of detailed operations of: (i) isolated mapping and polar encoding for a non-time index MIB; (ii) polar encoding for an SS block index MIB; and (iii) combining operations of polar encoded bits from the SS block index MIB and non-time index MIB.

An SS block index MIB may be pre-encoded and the coded bits may be saved (e.g., for easy access). In examples, the total supported SS blocks may be, for example, up to 64 (e.g., in NR). Saving 64 polar codewords may not use significant memory, for example, considering the length of codewords may be limited to $2^t$ bits. Saved codewords may be (e.g., directly) combined with coded bits of non-time index MIBs.

An NR-PBCH signal may be received at a WTRU side in various scenarios or cases. Processing by a WTRU may be different for various cases.

In examples, a WTRU may receive multiple NR-PBCH signals from multiple SS blocks. A WTRU may not know an SS block index for each of them. One or more of the following may apply. The WTRU may (e.g., first) puncture the first $2^t$ bits from the received NR-PBCH signals. The WTRU may (e.g., then) soft combine the NR-PBCH signals and decode a non-time index MIB. A decoded non-time index MIB may be re-encoded and its impact to the first $2^t$ bit channels may be cancelled out in the received NR-PBCH signals. The WTRU may (e.g., then) decode the SS block index for each received NR-PBCH signal.

In examples, a WTRU may receive a single NR-PBCH signal with a previously obtained SS block index. One or more of the following may apply. The WTRU may encode the SS block index and cancel out its contribution to the NR-PBCH signal. The WTRU may decode a non-time index MIB.

In examples, a WTRU may receive multiple NR-PBCH signals with previously obtained SS block indices. One or more of the following may apply. The WTRU may encode the SS block index and cancel out its contribution to the corresponding NR-PBCH signals. The WTRU may combine the NR-PBCH signals and decode a non-time index MIB from the combined NR-PBCH signals.

Figure 17:
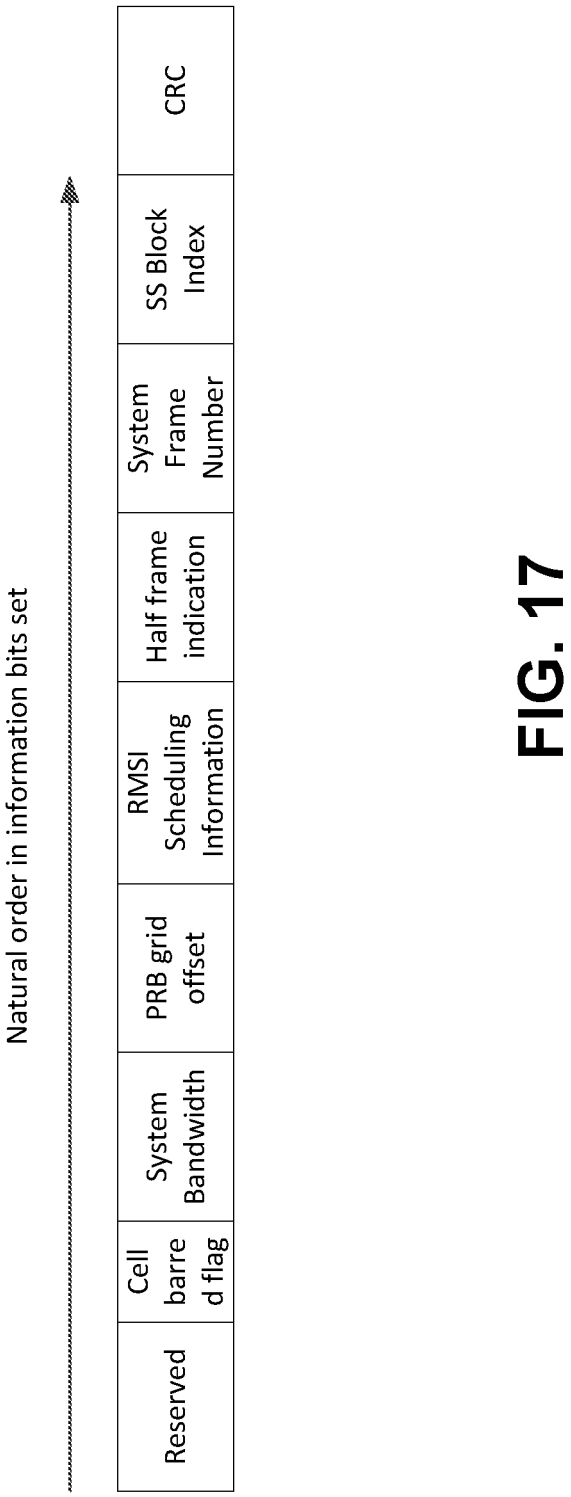
FIG. 17 is an example of bit channel mapping for MIB information.
Figure 18:
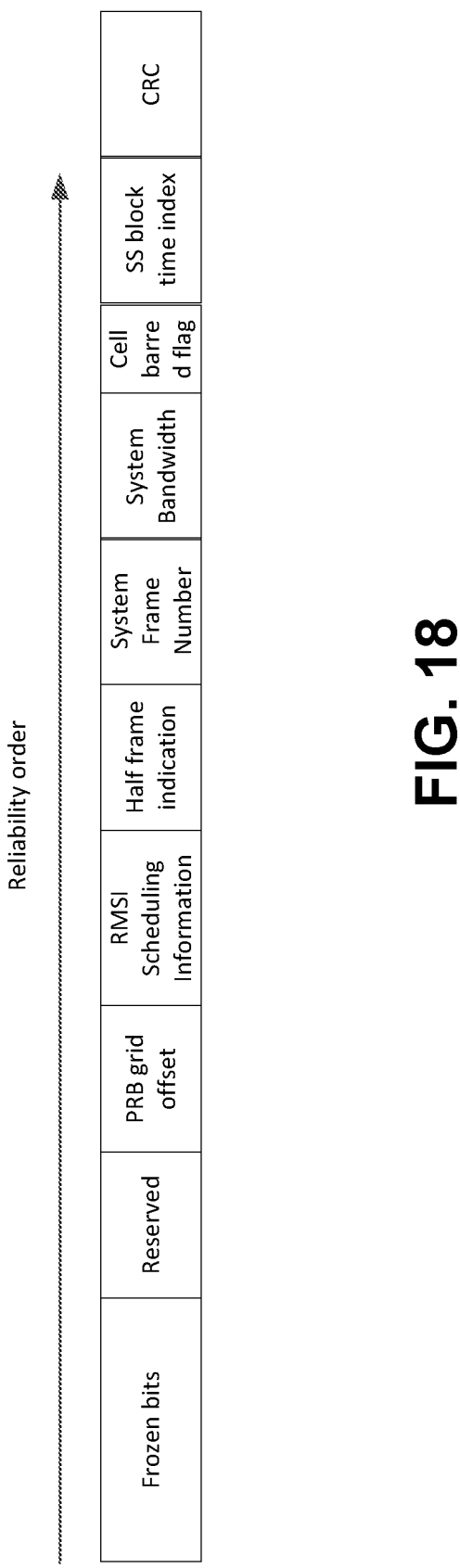
FIG. 18 is an example of bit channel mapping for MIB information.

In the various cases described herein, the assumptions may include that the SS block time index is isolatedly encoded. Some reliable bit channels may not be utilized. Some BLER performance loss may result. SS block time index and/or other non-time index MIBs may be jointly encoded. Priority mapping may be applied. The SS block time index may be assigned to the latter bit channels (e.g., FIG. 17) or the more reliable bit channels (e.g., FIG. 18). SS block time index may be decoded frequently, while other non-time index MIBs may be decoded less frequently or infrequently. By assigning SS block time index to the end bit channels, the reliable decoding of the more frequent system information may be enhanced, for example, via some information decoding (e.g., previously obtained information decoding).

An NR PBCH channel coding design may be provided, for example, using approaches, techniques or criteria described herein.

Figures 19, 20:
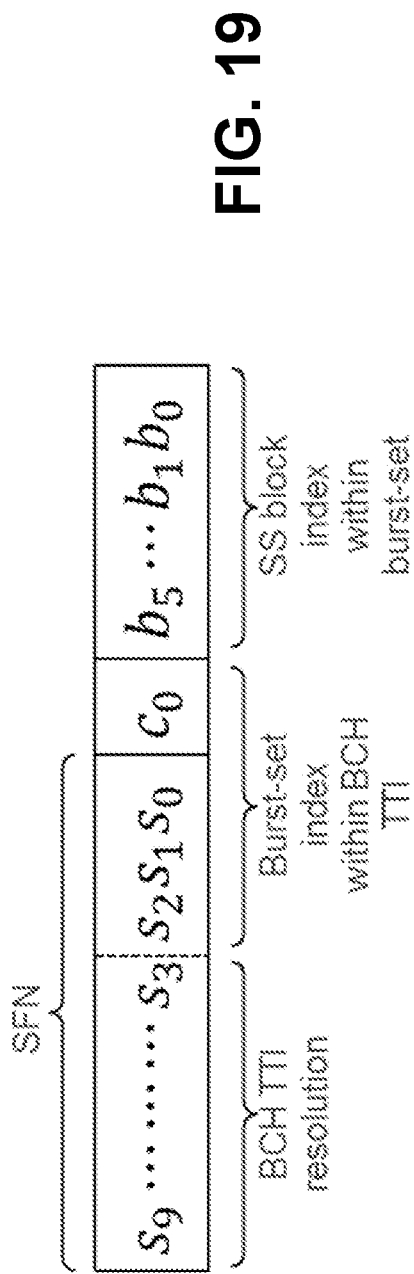
FIG. 19 is an example of NR time related information.
FIG. 20 is an example of a table related to PBCH scrambling.

FIG. 19 shows an example of NR time related information, including 10 system frame number (SFN) bits, one half frame indication bit and 6 SS Block Index (SSBI) bits. The 7 MSB of SFN may provide the BCH TTI resolution. The 3 LSB of SFN and the half frame indication bit may be the burst set index within BCH TTI. The 6 bits of SSBI may be within burst set. For above 6 GHz band, the 10 SFN bits, the half frame indication bit and 3 MSB of SSBI may be in the NR-PBCH payload, and/or the 3 LSB of SSBI may be indicated by 8 different PBCH-DMRS sequences. For below 6 GHz band, the 3 MSB of SSBI may not be in the NR-PBCH payload. Subsequently, the reserved bits for below 6 GHz band may be 3 bits longer than those for above 6 GHz band.

In examples, a $1^{st}$ scrambling initialization, which may be based on a cell ID and a part of SFN, may be applied to PBCH payload excluding SS block index, half radio frame (e.g., if present), and the part of SFN prior to CRC attachment and encoding process. The part of SFN may be one or more of the following, (e.g., to be selected by NR AH3): 3 LSB bits of SFN, and $2^{nd}$ and $3^{rd}$ LSB bits of SFN.

In examples, the $1^{st}$ PBCH scrambling may include a Gold sequence initialized by cell ID. The $2^{nd}$ and $3^{rd}$ LSBs of SFN may be used for determining a sequential non-overlapping portion of the sequence. A Gold sequence of length 4 M may be generated, where M is the number of bits to be scrambled. The generated sequence may be partitioned into 4 non-overlapping portions. The $2^{nd}$ and $3^{rd}$ LSBs may identify (e.g., uniquely) indices of one or more (e.g., each) of the non-overlapping portion of the sequence. This is shown in FIG. 20.

A working assumption may include that NR-PBCH has a payload size of 56 bits (e.g., including CRC). 10-bit SFN may be carried by NR-PBCH. A working assumption may include that 4-bit PRB grid offset is carried by NR-PBCH. A single bit may be used in NR-PBCH for indicating numerology for remaining system information (RMSI), Msg. 2/4 for initial access and broadcasted other system information (OSI). One or more of the following examples may be used by a gNB (e.g., as a numerology for RMSI). For sub-6 GHz, 0: 15 kHz and 1: 30 kHz may be used. For >6 GHz, 0: 60 kHz and 1: 120 kHz may be used.

One-bit half frame indication may be part of PBCH payload, and when CSI-RS for measurement has a periodicity of 20 ms or larger, the WTRU may assume that the network is "synchronous" for the purpose of measurement. For example, for 3 GHz and below, half frame indication may be further (e.g., implicitly) signaled (e.g., signaled as part of PBCH DMRS for max L=4).

Polar code design of PDCCH (e.g., 24-bit D-CRC with the associated interleaver) may be reused. A working assumption (e.g., from RAN1#89 and as a confirmed one) may include that the data, including time index if carried by NR-PBCH, may be transmitted explicitly.

Figure 21:
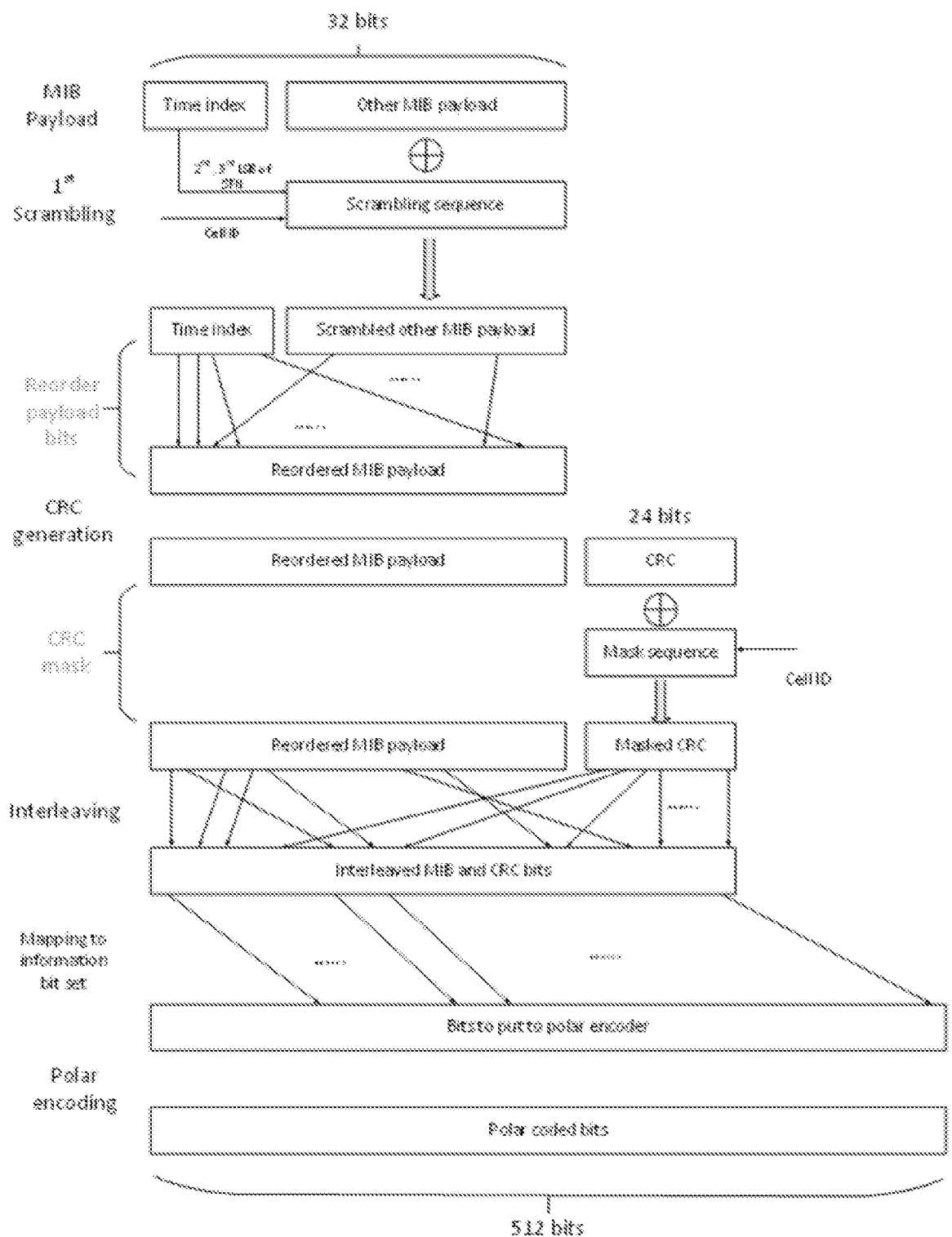
FIG. 21 is an example of PBCH encoding process.

FIG. 21 illustrates an example of a channel (e.g., PBCH) encoding process, for example, based on approaches and techniques herein. An order of the PBCH fields may be proposed herein and may be used, for example, by putting previously obtained (e.g., previously derived or decoded) bits before the bits that are not previously obtained and/or prior to the polar encoding. The order may be used to improve PBCH decoder performance and/or latency. Some previously obtained information bits may be one or more of the following: SSBI, reserved bits, (part or all of) SFN, or half radio frame indication.

The information bits may be put in a time index field. Part or all of the information bits may be put in the time index field. For example, the information (e.g., previously obtained information) may include some system information. The system information may include SSBI, (part or all of) SFN, and/or the like. In examples, the information may include some system information and/or reserved bits. Some information (e.g., previously obtained information) may include some system information and/or part of reserved bits.

The MIB payload (e.g., 32 bits) may be divided to multiple (e.g., two) parts including, for example, (e.g., unscrambled) time index and other MIB payload. The (e.g., unscrambled) time index may include one or more of the following: $2^{nd}$, and $3^{rd}$ LSB of SFN; 3 MSB of SS block index; or half radio frame. Some (e.g., the other) MIB payload may include one or more of 1 LSB and 7 MSB of SFN, 4-bit PRB grid offset, 1-bit numerology for RMSI, reserved bits, or other bits.

A scrambling sequence may be generated and/or used to scramble with MIB payload (e.g., other MIB payload), for example, based on time index information and/or cell ID. The unscrambled time index and the scrambled other MIB payloads may be re-ordered in some pattern(s). A reordering pattern of MIB payloads may be used, for example, to reduce PBCH decoding complexity and/or to improve the PBCH decoding performance. For example, certain MIB contents may be placed in certain area of one or more bit channels of a polar encoder. The NR-PBCH fields ordering may compensate the effect of the interleaver (e.g., *) for distributed CRC, for example, before polar encoding.

Re-ordered MIB payload may be used to generate CRC bits (e.g., 24 bits), for example, based on a fixed CRC polynomial. The CRC bits may be masked with some bits generated from cell ID.

The MIB payload and masked CRC bits may be distributed, for example, based on a given interleaver pattern. The following interleaver pattern may be derived from some (e.g., agreed) interleaver pattern(s).

[0 2 3 5 7 10 11 12 14 15 18 19 21 24 26 30 31 32 1 4 6 8 13 16 20 22 25 27 33 9 17 23 28 34 29 35 36 37 38 39 40 41 42 43 44 45 46 47 48 49 50 51 52 53 54 55] (*)

For example, as described herein, the first interleaving output bit may be the first interleaving input bit, the second interleaving output bit may be the third interleaving input bit, the third interleaving output bit may be the fourth interleaving input bit, and/or the fourth interleaving output but may be the sixth interleaving input bit etc.

The interleaved MIB and CRC bits may be mapped to information bit set(s) of a polar code, for example, with a given polar code sequence. For example, 512-bit mother code length may be used. Polar encoding may be applied.

CRC mask operation(s) may be provided. Part or all of the CRC bits may be masked, for example, with one or more bits (e.g., generated from a cell ID).

In examples, a cell ID may be of 16 bits, and the CRC length may be of 24 bits. Different ways of masking the CRC bits may be used, for example, one or more of the following may be used. The cell ID may (e.g., first) pass the pseudo-random sequence generation, or the cell ID may be XORed (e.g., may be directly XORed) with part or all of the CRC bits.

The cell ID may pass (e.g., may first pass) the pseudo-random sequence generation, for example, as an initial sequence, which may be based on a Gold sequence or other sequences. 24 generated pseudo-random sequence bits (e.g., the first 24 or the 24 after a specific offset) may be used to have XOR operations with the 24 CRC bits. In some example, the first A (e.g., A<24) generated sequence bits may be used to have the XOR operations with part of the 24 CRC bits. For example, A=21 and only the last (or the first)

21 CRC bits may be XOR-ed with the generated sequence. The last 21 CRC bits may not be distributed, and/or the last 21 CRC bits may be appended after CRC distribution.

The cell ID may be XORed (e.g., may be directly XORed) with part or all of the CRC bits. For example, if the cell ID is 16 bits, the XOR operation may be towards the first or the last 16 CRC bits. In example, the XOR operation may be applied to the last 16 CRC bits with the cell ID (e.g., since the last 16 CRC bits may not be distributed).

The cell ID may be cycled from 16 bits to 24 bits and then XORed with 24 CRC bits (e.g., all of the 24 CRC bits).

The cell ID may be cycled from 16 bits to A (16<A<24) bits and then XORed with the last A CRC bits. If a 16-bit cell ID is XORed with part of the CRC bits, part of CRC bits XOR-ed with the bits generated from cell ID may not include the distributed CRC bits. For example, in the interleaver pattern described herein, (*), the last 21 bits may not be distributed. The cell ID may be expanded (e.g., may first be expanded) from 16 bits to 21 bits (e.g., by a cyclic expansion). The 21 expanded bits may be used to XOR the last 21 CRC bits, which may not be distributed.

One or more re-ordering patterns for MIB payload may be used, for example, before CRC generation (e.g., the "Reorder payload bits" in FIG. 21).

Information (e.g., pieces of information) may be mapped to the bit channels, depending on an information stability level, for example, as described herein.

A design criteria may include assigning system information (e.g., system information that is not previously obtained such as other MIB payload in FIG. 21) to end bit channels, and/or assigning system information (e.g., previously obtained system information such as time index in FIG. 21) to front bit channels. BLER performance gain may be achieved, for example, with the information based decoding described herein For example, 6-bit SS block indices (SSBI) may be denoted by b5, b4, b3, b2, b1, b0, where b5 is the most significant bit (MSB) and b0 is the least significant bit (LSB). In examples, b5, b4 and b3 (e.g., only b5, b4 and b3) may be contained in a PBCH payload. b3, b4, b5 of SSBI may be described herein. Half frame indication bit may be denoted by c0. 10-bit SFN may be denoted by s9, . . . , s0, where s9 is the MSB and s0 is the LSB. s2 and s1 (e.g., only s2 and s1) may be contained in the time index contents in FIG. 21. Reserved bits may be denoted by r0, r1, . . . . The number of reserved bits for sub-6 GHz channels may be 3 bits more than the number of reserved bits for above-6 GHz channel.

One or more of the following schemes on the MIB payload re-ordering patterns may be provided and/or used. MIB payload may be assigned to a polar code bit channel(s) such that SSBI may be in the front, for example, in a natural order in the information bits set. MIB payload may be assigned to polar code bit channel(s) such that (s1, s2) is in the front in a natural order in an information bits set. MIB payload may be assigned to polar code bit channel such that c0 is in the front in a natural order in an information bits set. MIB payload may be assigned to polar code bit channel such that reserved bits (r0, r1, . . . ) may be in the front in a natural order in an information bits set.

MIB payload may be assigned to a polar code bit channel(s). SSBI may be in the front, for example, in a natural order in the information bits set.

(b3, b4, b5) may be assigned to the front of the information bits set. For example, in the interleaver pattern (*), (b3, b4, b5) or (b5, b4, b3) may be put to the positions of (0, 2, 3) in an MIB payload re-ordering process. One or more of the following features may be used, for example, c0 may be assigned to the second from the front in the natural order, (s1, s2) may be assigned to the second from the front in the natural order, or reserved bits may be assigned to the second from the front in the natural order.

c0 may be assigned to the second from the front in the natural order. Half frame indication may not be scrambled by the sequence before the polar encoder. c0 may be put in the second front in the natural order. Decoding of this bit may occur after the SSBI decoding (e.g., just after the SSBI decoding). For example, c0 may be re-ordered to the fifth position in the MIB payload re-ordering process (e.g., using the interleaver pattern (*)).

Figure 22:
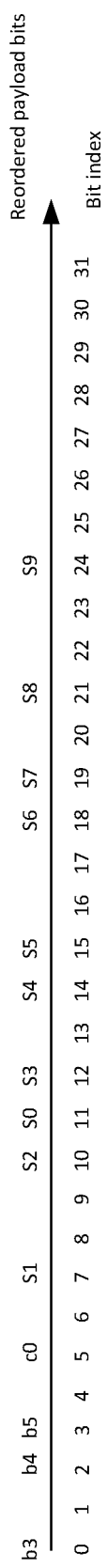
FIG. 22 is an example of a payload bits reordering pattern in a natural order of [SSBI, half frame indication, SFN].

SFN bits may be assigned to the third from the front in the natural order, for example, following the assignment of c0 to the second from the front. Two bits (e.g., (s1, s2)) may be put in front of the other SFN bits. The two bits may be used to generate a scrambling sequence. Some bits (e.g., the other bits) may be scrambled by the scrambling sequence. (s1, s2) or (s2, s1) may be re-ordered to the positions of (7, 10) in the MIB payload re-ordering process/scheme. (s0, s3, s4, . . . , s9) or (s9, s8, . . . , s3, s0) may be assigned (e.g., subsequently) to the positions of (11, 12, 14, 15, 18, 19, 21, 24). FIG. 22 shows an example of a payload bits reordering pattern in a natural order of [SSBI, half frame indication, SFN].

Figure 23:
FIG. 23 is an example of a PBCH payload bits reordering pattern in a natural order of [SSBI, half frame indication, SFN].

10 SFN bits may be assigned as a whole. (s1, s2) may not be treated differently. For example, (s0, s1, . . . , s9) or (s9, s8, . . . , 50) may be re-ordered to the positions of (7, 10, 11, 12, 14, 15, 18, 19, 21, 24). FIG. 23 shows an example of a payload bits reordering pattern in a natural order of [SSBI, half frame indication, SFN].

(s1, s2) may be assigned to the second from the front in the natural order. (s1, s2) may be used for generating the scrambling sequence. (s1, s2) may be put to the second from the front in the natural order. Putting (s1, s2) to the second front in the natural order may facilitate an early decoding of (s1, s2) and/or a prompt generation of the scrambling sequence at a WTRU side. (s1, s2) or (s2, s1) may be put to the positions of (5, 7) in the MIB payload re-ordering process/scheme, for example, using the interleaver pattern (*).

Figure 24:
FIG. 24 is an example of a PBCH payload bits reordering pattern in a natural order of [SSBI, SFN, half frame indication].
Figure 25:
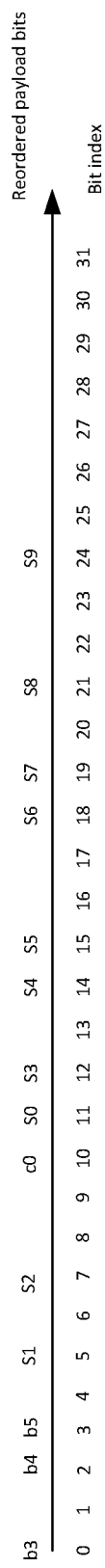
FIG. 25 is an example of a PBCH payload bits reordering pattern in a natural order of [SSBI, (s1, s2), half frame indication, other SFN].

Remaining SFN bits may be assigned to the third front in the natural order, for example, following the assignment of (s1, s2) to the second front in the natural order. For example, (s0, s3, s4, . . . , s9) or (s9, s8, . . . , s3, s0) may be put to the positions of (10, 11, 12, 14, 15, 18, 19, 21) in the MIB payload re-ordering process/scheme. Half frame indication (e.g., c0) may be put to the position of 24. FIG. 24 may show an example of PBCH payload bits reordering pattern in the natural order of [SSBI, SFN, half frame indication].

c0 may be assigned to the third from the front in the natural order. The remaining SFN bits may be assigned, for example, after c0 may be assigned to the third front in the natural order. For example, half frame indication (e.g., c0) may be assigned to the position of 10. The other SFN bits (e.g., except (s1, s2)) may be assigned to positions (11, 12, 14, 15, 18, 19, 21, 24). FIG. 25 may show an example of PBCH payload bits reordering pattern in the natural order of [SSBI, (s1, s2), half frame indication, other SFN].

Figure 26:
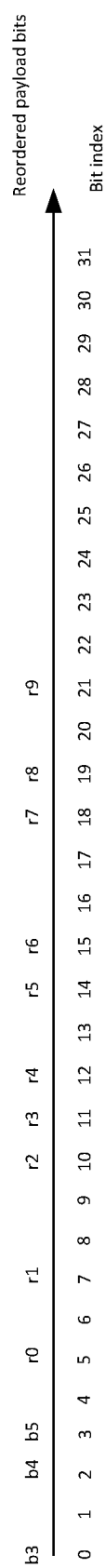
FIG. 26 is an example of a PBCH payload bits reordering pattern in a natural order of [SSBI, reserved bits].

Reserved bits may be assigned to the second from the front in the natural order. For example, for sub-6 GHz channels, some (e.g., all) the of three bits SSBI may be zero, and/or some (e.g., all) of the three bits SSBI may be considered as part of reserved bits. For above-6 GHz channels, the 3-bit SSBI may be valid, and/or the number of reserved bits may be 3 bits less than the number of reserved bits in sub-6 GHz channels. Contents of SSBI may be linked with reserved bits. SSBI and/or reserved bits may be put in the front of the natural order. The assignment of reserved bits in the front of the natural order may not lead to decoding performance loss. The front channels may be (e.g., in general) less reliable than the end channels. Assigning less important (e.g., "don't care" or "previously obtained bits") bits to the less reliable bit channels may reduce decoding performance loss. FIG. 26 may show an example of a PBCH payload bits reordering pattern in the natural order of [SSBI, reserved bits], where the number of reserved bits is assumed to be 10.

The remaining assignments may be applied using the approaches shown in the example(s) herein, for example, following this assignment of the reserved bits to the second front in the natural order. c0 may be assigned to the third front, and/or SFN may be assigned to the fourth front. SFN may be assigned to the third front, and/or c0 may be assigned to the fourth front. The positions of (s1, s2) and reserved bits may be exchanged.

MIB payload may be assigned to polar code bit channel(s) such that (s1, s2) is in the front in a natural order in an information bits set.

(s1, s2) may be assigned to the front of the information bits set. (s1, s2) or (s2, s1) may be put to the positions of (0, 2) in the MIB payload re-ordering process/scheme, for example, using the interleaver pattern (*). For example, one or more of the following may be used: (b3, b4, b5) may be assigned to the second from the front in the natural order, or c0 may be assigned to the second from the front in the natural order.

(b3, b4, b5) may be assigned to the second from the front in the natural order.

In neighbor cell measurement cases, the SSBI (e.g., only the SSBI) of a neighbor cell may be used (e.g., needed) from PBCH decoding. SSBI may be put to the second front in the natural order. For example, (b3, b4, b5) or (b5, b4, b3) may be assigned to the positions of (3, 5, 7) (e.g., using the interleaver pattern (*)).

One or more of the reserved bits, half frame indication, or other SFN bits (e.g., s0, s3, . . . , s9) may be put after the SSBI in the natural order, for example, following the assignment of (b3, b4, b5) to the second front in the natural order. Different orders among reserved bits, half frame indication, and/or other SFN bits may be used.

c0 may be assigned to the second from the front in the natural order.

c0 may be assigned to the position 3, for example, using the interleaver pattern (*).

One or more the SSBI, remaining SFN bits (i.e., s0, s3, . . . , s9), or reserved bits may be put after c0 in a natural order, for example, following the assignment of c0 to the position 3. Different orders among SSBI, remaining SFN bits, and/or reserved bits may be used.

MIB payload may be assigned to polar code bit channel such that c0 is in the front in a natural order in an information bits set.

The rest of bit assignment may re-use the bit field order described herein, for example, without c0. In examples, SSBI and/or SFN may be assigned in the second and/or the third front in the natural order. In examples, reserved bits may be assigned in the second front in the natural order, and/or SSBI and SFN may be assigned in the third and the fourth front in the natural order.

Figure 27A:
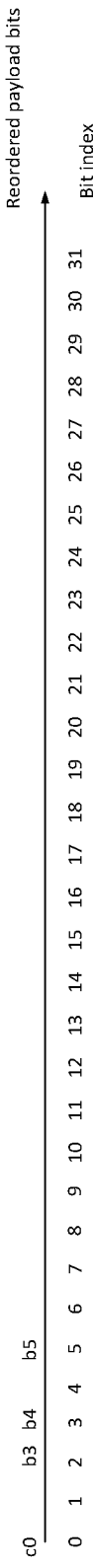
FIG. 27A is an example associated with a payload bit reordering pattern.

In examples, the interleaver pattern (*) may assign SSBI and/or SFN in the second and/or the third front in the natural order when an MIB payload is assigned to a polar code bit channel such that c0 is in the front in the natural order in the information bits set One or more of the following may apply. The half frame indication c0 may be assigned to a first position, and the three SSBI bits (b3, b4, b5) may be assigned to the positions of (2, 3, 5). FIG. 27A shows an exemplary payload bit reordering pattern. As seen in FIG. 27A, PBCH payload bits may be reordered in a natural order (e.g., half frame indication bits may be placed before SSBI bits).

MIB payload may be assigned to polar code bit channel such that reserved bits (r0, r1, . . . ) may be in the front in a natural order in an information bits set.

The rest of bit assignment may re-use the bit field order described herein, for example, without reserved bits. One or more of the following may be used, for example, the SSBI bits (b3, b4, b5) may be assigned to the second front in the natural order, or half radio frame indication c0 may be put to the second front in the natural order.

The SSBI bits (b3, b4, b5) may be assigned to the second from the front in the natural order. The reason for assigning the SSBI bits (b3, b4, b5) to the second front in the natural order may include that SSBI bits may be related to reserved bits. For example, the number of reserved bits for above 6 GHz band may be 3 bits less than that for below 6 GHz band, and/or the SSBI bits may (e.g., only) occur for above 6 GHz band. The sum number of SSBI bits and the reserved bits may be similar or identical for above 6 GHz band and below 6 GHz band. For example, SSBI and reserved bits may be assigned as neighbors in the natural order. Assigning SSBI and reserved bits as neighbors in the natural order may allow a unified design of the PBCH for the above 6 GHz band and below 6 GHz band. The half radio frame indication and the SFN bits may be put in the third or the fourth front in the natural order, for example, following the assignment of SSBI and reserved bits as neighbors in the natural order.

Figure 27B:
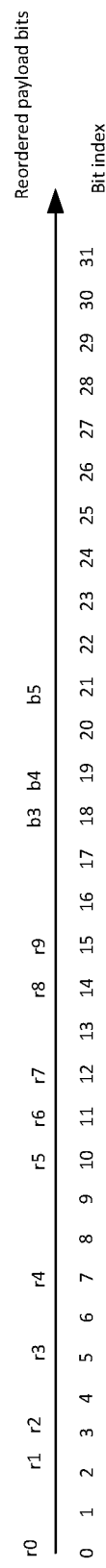
FIG. 27B is an example of a PBCH payload bits reordering pattern in a natural order of [reserved bits, SSBI] for above 6 GHz band.

For example, 10 reserved bits and 3 SSBI bits may be used for above 6 GHz band. An exemplary re-ordering technique is shown in FIG. 27B. FIG. 27B is an example of a PBCH payload bits reordering pattern in the natural order (e.g., natural order of reserved bits, SSBI) for above 6 GHz band.

Figure 28:
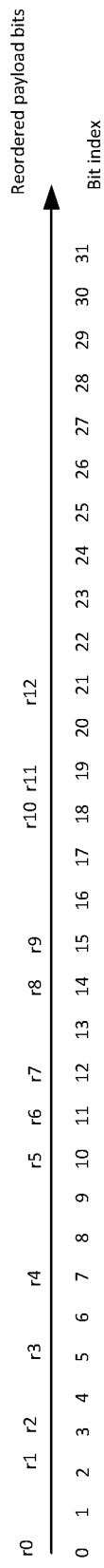
FIG. 28 is an example of a PBCH payload bits reordering pattern in a natural order of [reserved bits] for below 6 GHz band.

13 reserved bits and no SSBI bits may be used for below 6 GHz band. An exemplary re-ordering technique is shown in FIG. 28. FIG. 28 is an example of a PBCH payload bits reordering pattern in the natural order (e.g., natural order of reserved bits) for below 6 GHz band.

Half radio frame indication c0 may be put to the second from the front in the natural order. SFN and SSBI may be assigned to the third and fourth from the front in the natural order, respectively. The order of SFN and SSBI may be reversed.

Reserved bits may be assumed as a whole in the bit assignments in one or more of the schemes. For example, one or more reserved bits (e.g., all reserved bits) may be treated/processed the same in the bit assignments. Some reserved bits may be used for other purpose(s) (e.g., in Narrow Band IoT (NB-IoT)). It may be assumed that part of the reserved bits as previously obtained bits, and part of the reserved bits (e.g., the other reserved bits) may be for future usage and may not be considered as previously obtained bits. The schemes described herein may be applied to (e.g., may only be applied to) the part of the reserved bits, which may not be used in the future.

Part or all of the reserved bits may be set as frozen bits in some cases. Setting part or all of the reserved bits as frozen bits may imply that the payload of MIB may be less than 56 bits. To fulfil the 56 information bits set, some other payload of MIB may be repeated, which may increase its decoding reliability. The repeated payloads may include one or more of: SSBI, SFN, a cell barred flag, RMSI scheduling information, half frame indication, etc.

As described herein, the assignment of a PBCH payload may be in terms of natural order and/or in terms of reliability order. One or more of the following may apply for PBCH payload reordering. $Z_i$ may denote an information bit input, which may be reordered. $W_i$ may denote the bit index of a reordered MIB payload, which may correspond to $Z_i$. A may denote the interleaver pattern (e.g., as describe herein as (*)).

In examples, a polar sequence may be used to obtain 56 bit channel (e.g., the most reliable 56 bit channels). Given a polar sequence described herein, the 56 most reliable bit channels may be obtained in reliability increasing order as, which may be denoted by the set X.

X=[441 469 247 367 253 375 444 470 483 415 485 473 474 254 379 431 489 486 476 439 490 463 381 497 492 443 382 498 445 471 500 446 475 487 504 255 477 491 478 383 493 499 502 494 501 447 505 506 479 508 495 503 507 509 510 511]

Set X may be sorted (e.g., sorted in a natural order), which may result in set Y.

Y=sort(X)=[247 253 254 255 367 375 379 381 382 383 415 431 439 441 443 444 445 446 447 463 469 470 471 473 474 475 476 477 478 479 483 485 486 487 489 490 491 492 493 494 495 497 498 499 500 501 502 503 504 505 506 507 508 509 510 511]

If $Z_i$ is to be placed to the i-th first bit channel (e.g., in terms of natural order), $W_i$ may be set to A(i) (e.g., $W_i$=A(i)). If $Z_i$ is to be placed to the i-th least reliable bit channel, an index, j, may be found such that Y(j)=X(i). $W_i$ may be set to A(j) (e.g., $W_i$=A(j)).

In examples, a first scrambling may be perfromed before payload bit reordering. In examples, the first scrambling may not affect the order of the PBCH payload bits (e.g., since it is simply an XOR operation). As described herein, MIB payload reordering may be applied (e.g., may also be applied) to unscrambled bits. As described herein, scrambling may be performed (e.g., may be performed after the payload reordering operation).

A polar coding scheme may be provided for NR-PBCH for combining over SFN. NR-PBCH signals from different SS blocks may (e.g., as previously discussed) be combined to achieve better decoding performance, but this may not be useful, for example, when NR-PBCH signals are different from the system frame numbers (SFNs). NR-PBCH signals with different SFNs and different SS blocks may be combined, for example, by extending example schemes, e.g., to isolate an SFN and an SS block index.

Figure 29:
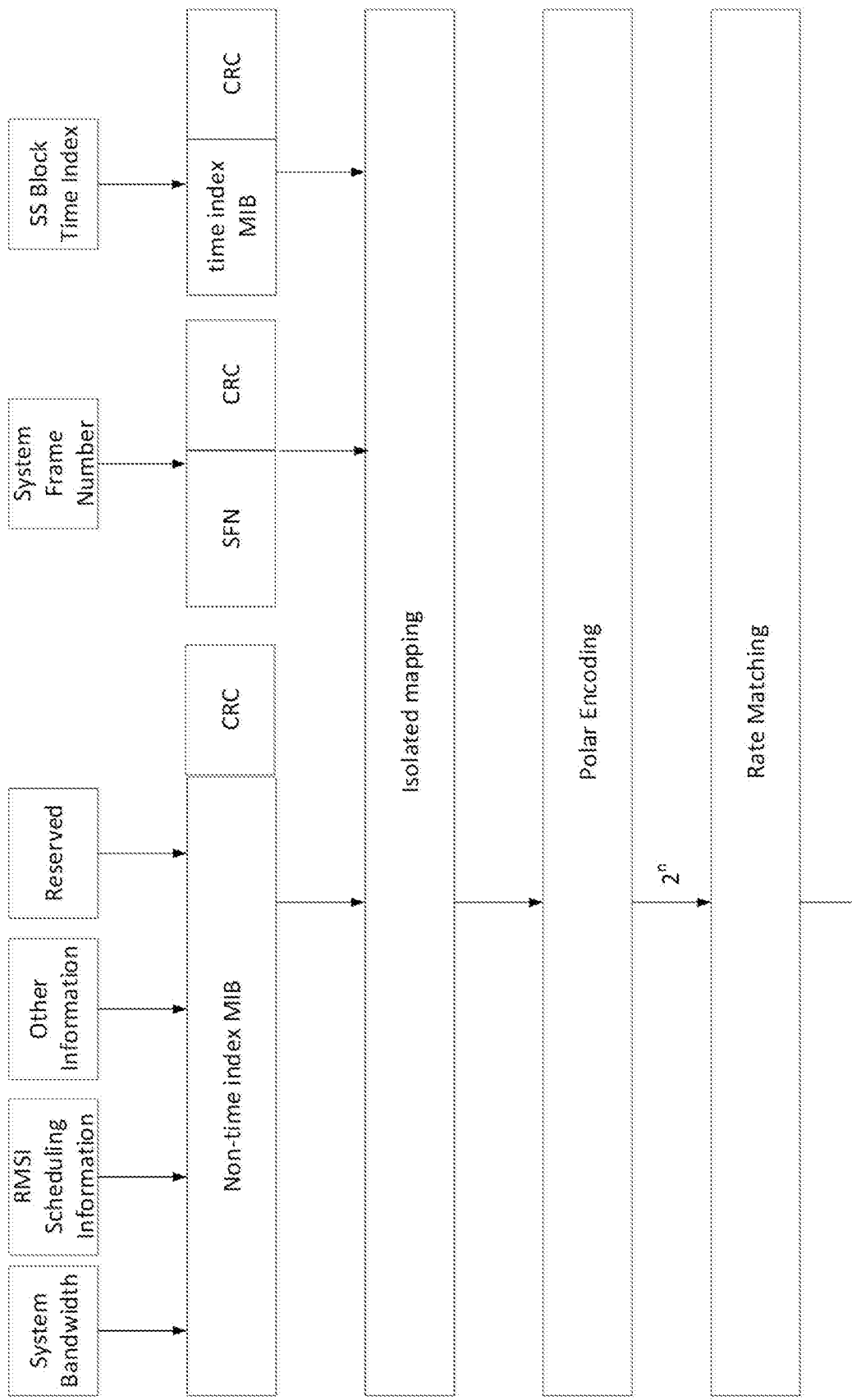
FIG. 29 is an example of an NR-PBCH coding procedure with joint encoding of an SS block index and SFN.

FIG. 29 is an example of an NR-PBCH coding procedure with joint encoding of an SS block index and SFN. FIG. 29 shows an extension based on FIG. 12.

In examples, payloads of MIB may be separated into three parts: (i) time index payload (e.g., SS block index and half radio frame timing); (ii) SFN payload, and (iii) non-time index/SFN payload (e.g., bandwidth, etc.).

A part (e.g., each part) of MIB payloads may be attached with separate CRCs. CRC lengths for the three parts may be different from each other. In examples, a CRC length for a non-time index MIB may be larger than a CRC length for a time-index MIB.

In examples, a mother code length of a polar code may be N=$2^n$ bits. A time index MIB with CRC may be mapped to the first $2^t$ bit channels at the top of an encoder, e.g., for some integer t. An SFN with CRC may be mapped to the second $2^t$ bit channels at the top of the encoder. A non-time index/SFN MIB with CRC may be mapped to remaining bit channels at the bottom of the encoder.

The non-time index/SFN MIBs part may receive prioritized mapping (e.g., further prioritized mapping) to the bit channels on the bottom of the encoder, for example, depending on payload contents and their importance level.

Mapping of the non-time index/SFN MIB part, the SFN MIB part, and time index MIB part may, for example, depend on a rate matching or puncturing scheme that is used. In examples (e.g., with a natural puncturing scheme), a certain amount of bits may be punctured from the top. Corresponding input bit channels may (e.g., also) be set to be zero. These bits may be at the top of bit channels, e.g., together with the time index MIB part.

Source bits may (e.g., then) be passed to a polar encoder with generator matrix $F2^{(\otimes n)}$, where $(\bullet)^{\otimes n}$ may denote the n-th Kronecker power and $$F_2 = \begin{bmatrix} 1 & 0 \\ 1 & 1 \end{bmatrix}.$$

A puncturing type of rate matching operation may be used for a polar codeword, for example, to fit the given resource blocks for NR-PBCH.

Figure 30:
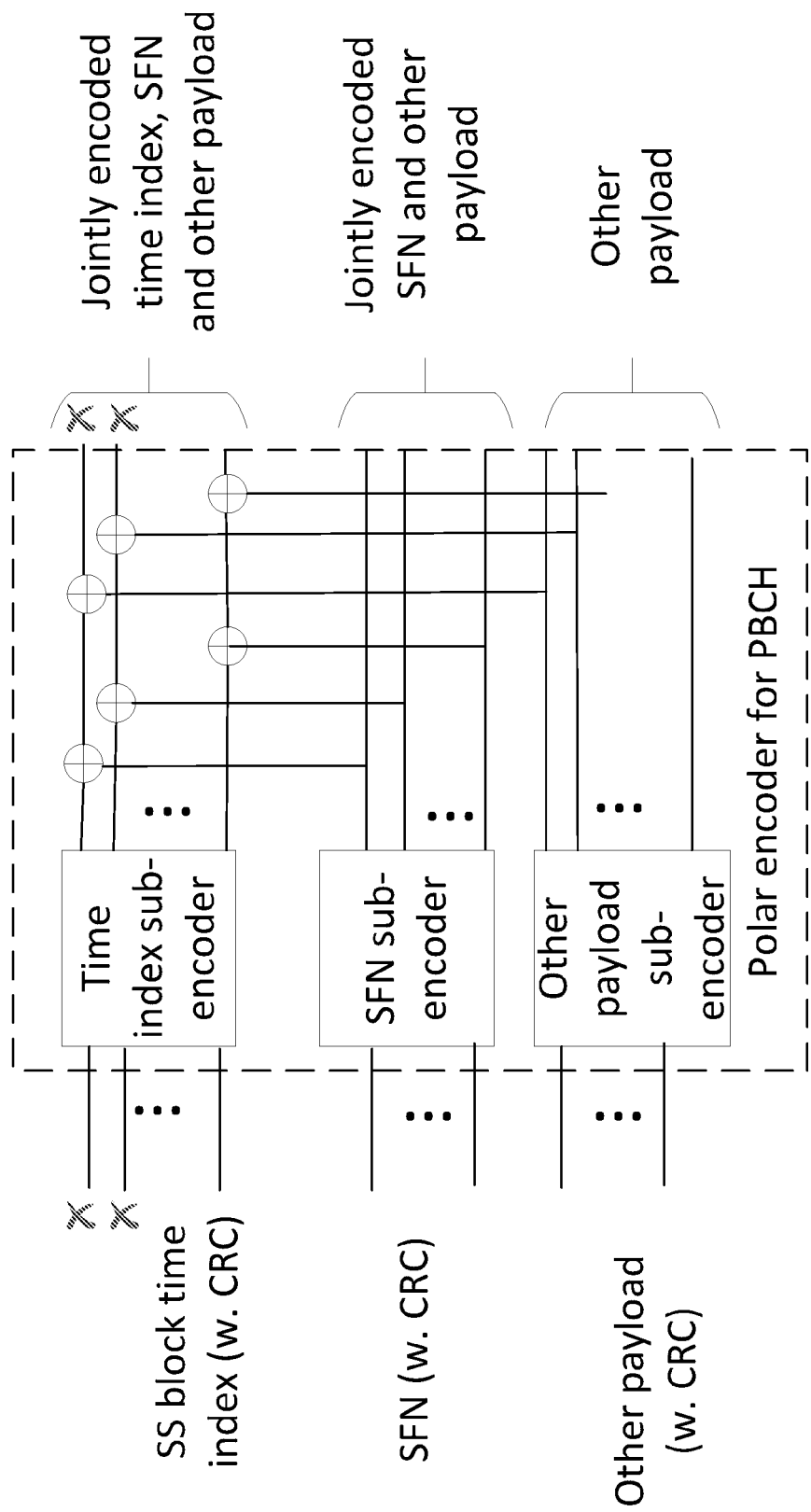
FIG. 30 is an example of isolated mapping and polar encoding for NR-PBCH.

FIG. 30 is an example of isolated mapping and polar encoding for NR-PBCH. FIG. 30 shows an example of isolated mapping and polar encoding operations. An SS block time index with CRC may be mapped to the top $2^t$ sub-encoder. An SFN block with CRC may be mapped to the next $2^t$ sub-encoder. A non-time index/SFN payload with CRC may be mapped to the bottom $2^n$-$2^{(t+1)}$ sub-encoder. The three sub-encoders may be connected, for example, at the last stage of an encoding process.

Figure 31:
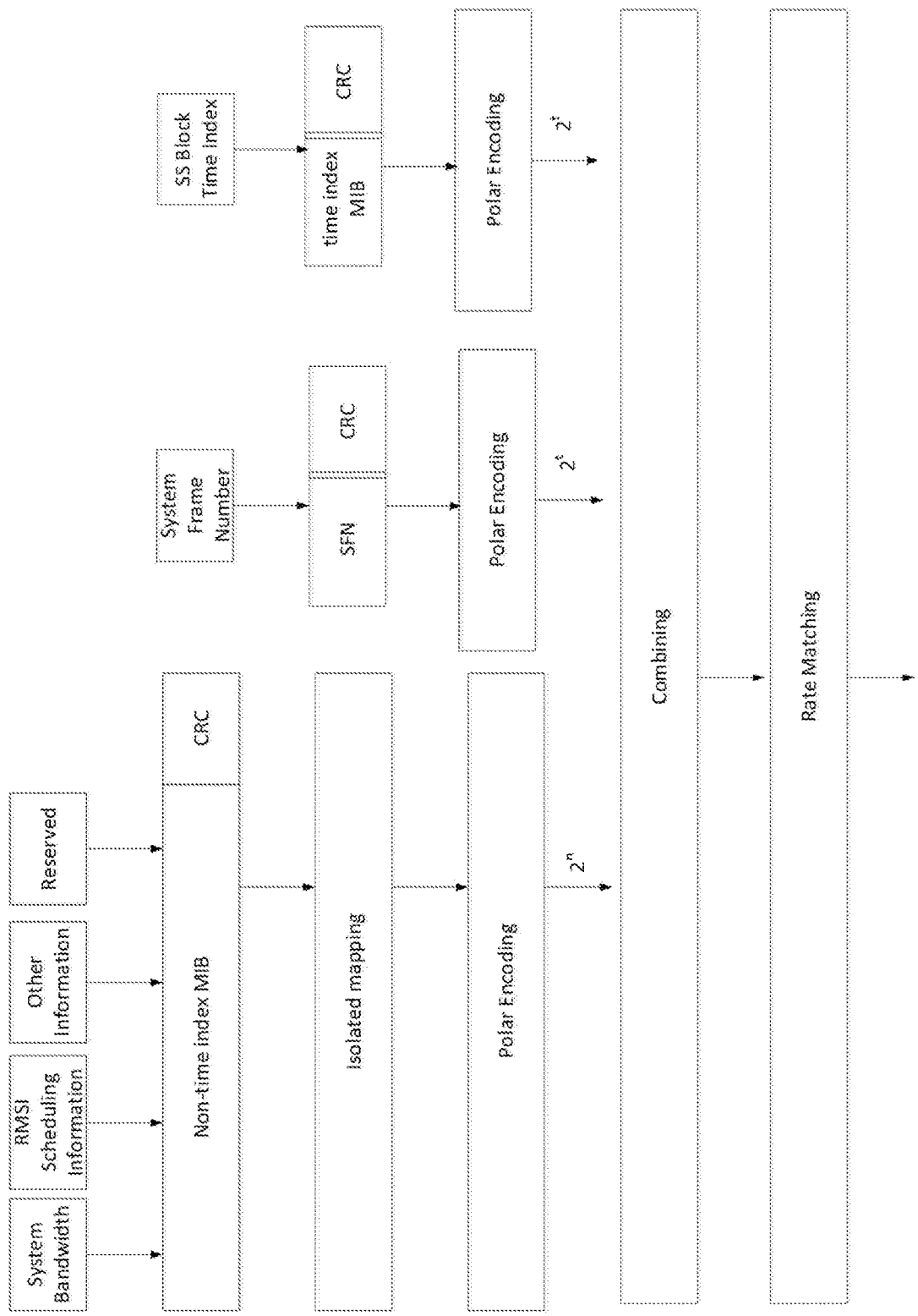
FIG. 31 is an example of an NR-PBCH coding procedure with separate encoding of an SS block index and SFN.

FIG. 31 is an example of an NR-PBCH coding procedure with separate encoding of an SS block index and SFN. FIG. 31 shows an example extension of FIG. 15.

Payloads of MIB may be separated into three parts: (i) time index payload (e.g., SS block index and half radio frame timing); (ii) SFN payload, and (iii) non-time index/SFN payload (e.g., bandwidth, etc.).

A (e.g., each) part of MIB payloads may be attached with separate CRCs. CRC lengths for the three parts may be different from each other.

A mother code length of a polar code may be N=$2^n$ bits. A non-time index/SFN MIB may be polar encoded. The first $2^{(t+1)}$ bit channels at the top of encoder may be (e.g., manually) set as zero. Actual information may be isolated to the bottom part of the bit channels. This may reserve the top part of the bit channels for a (e.g., later) combination with a time index MIB and SFN MIB. The polar encoding on the non-time index may be performed (e.g., only once) for (e.g., all) possible SS blocks for (e.g., all) possible values of SFN.

An SS block index MIB may be polar encoded. A polar code with mother code length $2^t$ bits may be used. This operation may be performed (e.g., performed once) for a (e.g., each) possible SS block.

An SFN MIB may be polar encoded. A polar code with mother code length $2^t$ bits may be used. This operation may be performed (e.g., once) for a (e.g., each) possible SFN value.

Encoded bits of the non-time index MIB may be combined with encoded bits of the SS block index MIB and encoded bits of the SNF MIB. Encoded bits for the former part may be $2^n$ bits while encoded bits for the latter two parts may be $2^t$ bits. A combination may comprise, for example, an XOR of the first $2^t$ bits of the non-time index MIB part with the encoded bits for the SS block index part, and an XOR of the second $2^t$ bits of the non-time index MIB part with the encoded bits for the SFN MIB part.

Figure 32:
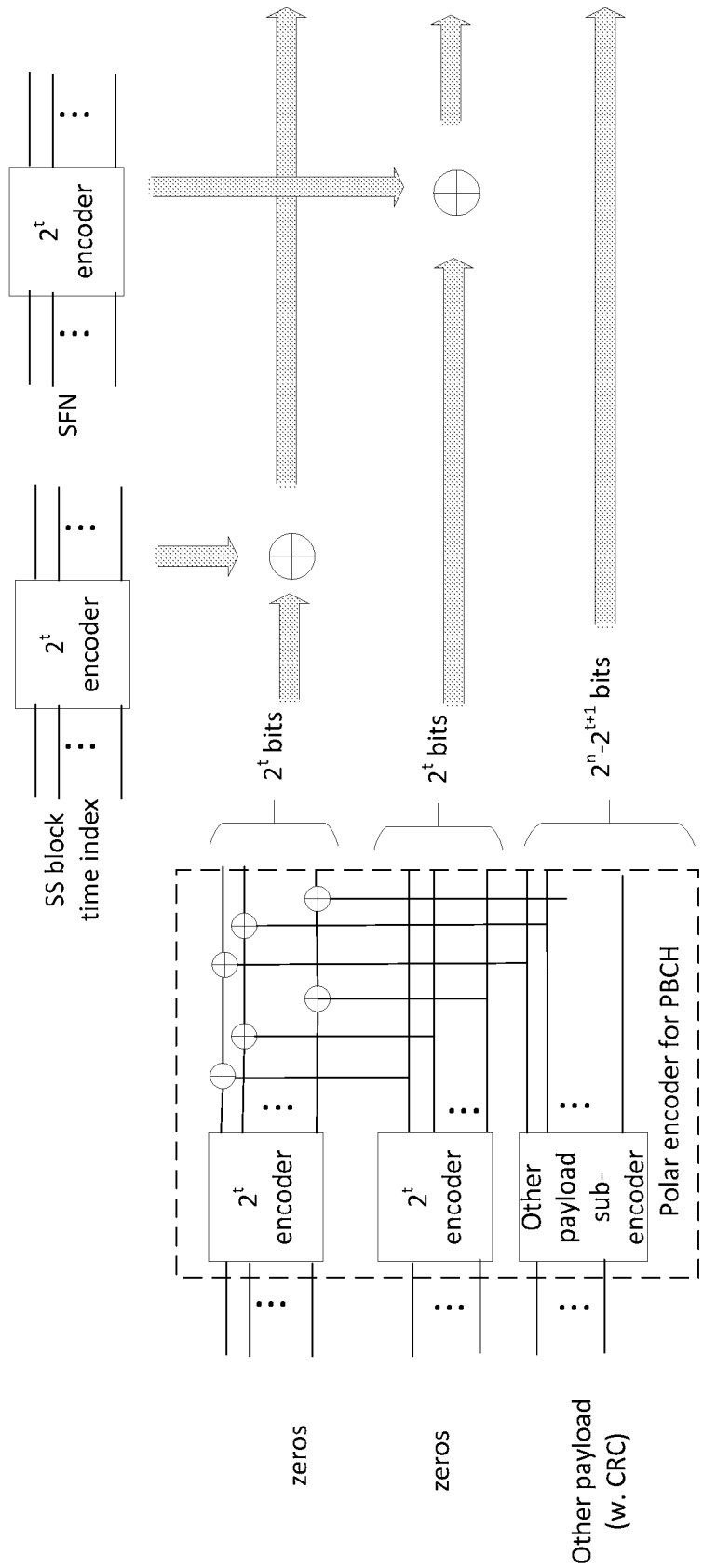
FIG. 32 is an example of isolated mapping and polar encoding for a non-time index/SFN MIB and its combination with polar encoding for an SS block index MIB and polar encoding for an SFN MIB.

FIG. 32 is an example of isolated mapping and polar encoding for a non-time index/SFN MIB and its combination with polar encoding for an SS block index MIB and polar encoding for an SFN MIB. FIG. 32 shows an example of detailed operations of: (i) isolated mapping and polar encoding for a non-time index MIB; (ii) polar encoding for an SS block index MIB and polar encoding for an SFN MIB; and (iii) combining operations of polar encoded bits from an SS block index MIB, SFN MIB and non-time index MIB.

Polar code construction for early termination may be described herein. One or more of the following may apply: interleaver design and CRC polynomials; list pruning design and/or configuration; WTRU specific scrambling; or segmentation for early termination.

Interleaver design and CRC polynomials may be described herein.

Figure 33:
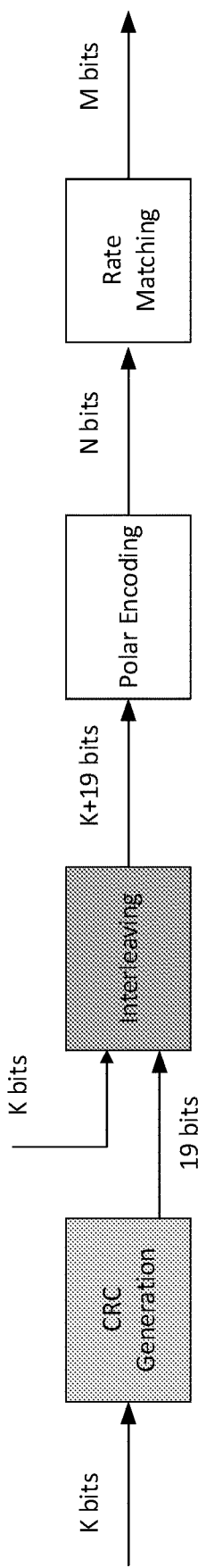
FIG. 33 illustrates an example polar code construction flow with distributed CRC for DL control channel.

A CRC polynomial (e.g., a single CRC polynomial) may be used for downlink control channel coding. The CRC polynomial may be followed by an interleaver implementation, e.g., to deliver early termination benefits, while achieving the FAR and/or BLER targets (e.g., with acceptable complexity and/or latency). An example polar code construction flow with distributed CRC scheme may be shown in FIG. 33. As shown in FIG. 33, one or more K source bits may be (e.g., first) passed to a CRC generation block to obtain one or more (e.g., 19) CRC bits. The one or more (e.g., 19) CRC bits may be appended to the source information. The K+19 bits may be passed through an interleaving block, where 3 out of 19 CRC bits may be distributed among the K source bits. The K source bits may be interleaved to match the distributed CRC bits.

FIG. 33 may provide an example polar code construction flow. The CRC generation block and the Interleaving block may be described herein. CRC polynomial(s) may be provided, where the CRC polynomial(s) may be used in the CRC generation block. The example CRC polynomials described herein may provide good BLER performance, good FAR performance, and/or good early termination performance. An example of 19-bits CRC polynomials may include one or more of the following:

1. $x^{19}+x^{16}+x^{15}+x^{14}+x^{13}+x^{11}+x^{10}+x^8+x^6+x^2+1$ or 0x9ED45;
2. $x^{19}+x^{17}+x^{13}+x^{11}+x^9+x^8+x^6+x^5+x^4+x^3+1$ or 0xA2B79;
3. $x^{19}+x^{17}+x^{16}+x^{15}+x^{13}+x^{12}+x^{11}+x^{10}+x^9+x^8+x^3+x^2+x+1$ or 0xBBF0F;
4. $x^{19}+x^{18}+x^{17}+x^{16}+x^{11}+x^{10}+x^9+x^8+x^7+x^6+x^4+x^3+x^2+1$ or 0xF0FDD; and/or
5. 0xDF6AF, 0x81375, 0x97599, 0x9ED45, 0x9013F, 0xEAE7F, 0x8BE39, 0xDA267, 0xEF61F, 0xAD0B5, 0xA1693, 0xEF38F, 0x89EEB, 0xA3AF3, 0x80027, 0x80029.

An example of 11-bits CRC polynomials may include one or more of the following:

1. 0xBB7, 0xBAF, 0x8E7, 0xC57, 0xB07, 0xA65, 0xAE3, 0x9EB, 0xC9B, 0x805, 0xFBF, 0xA7F, 0x80B, 0xD77, 0x6FD, 0xB85;
2. 0x9AF; and/or
3. 0xE71.

An interleaving pattern calculation may include one or more of the following. A largest information block length to be supported $K_{max}$ may be defined. A parity matrix may be generated (e.g., based on the CRC polynomial). For example, a parity matrix may include dimension $K_{max} \times C$, where C may be the CRC polynomial depth. A column from the parity matrix may be selected; the corresponding parity bit may be selected to be distributed. If the total number of selected columns is less than the number of CRC bits to be distributed, one or more (e.g., all) the rows of the selected column with value 1 may be removed, and a column for the parity matrix may be selected. For the selected columns in order, one or more (e.g., all) the information bits corresponding to 1 in that column may be placed in front of the corresponding parity bit. Selecting a column (e.g., from the parity generator matrix) may be described herein. In examples, the indexing order of information bits (e.g., not CRC) may be reversed. For example, the indexing order of information bits may start from the ending part of column. For example, the indexing order of information bits may start from the starting part of column. One or more of the following choices may be applied: the column that has the largest weight may be selected, the column that has the smallest weight may be selected, and/or the column that has the minimum highest 1 in the parity generation matrix may be selected. For example, one or more of the choices may be applied when the indexing order of information bits may start from the starting part of column.

Selecting a column with minimum highest 1 may be that among the set of highest positions of element 1 in each of the columns in a parity matrix, the column corresponding to the lowest position may be selected. An exemplary matrix may be provided herein.

0 0 0
0 1 1
1 0 1
1 0 0

The highest position of "1" in the first column may be 2. The highest position of "1" in the second column may be 3. The highest position of "1" in the last column may be 3. From this exemplary matrix, column 1 may be selected, since the column 1 has the minimum position (e.g., 2) of the highest element "1" among all the columns.

The column that has the largest weight may be selected. In examples, if more than one column has the same largest weight, one of the following may be used: the leftmost column among the candidate columns that have the same largest weight may be picked; the candidate columns that have the same largest weight the column with the minimum highest 1 in the parity matrix may be picked; or the candidate columns that have the same largest weight the column with the maximum lowest 1 in the parity matrix may be picked. For the case where the column with the minimum highest 1 in the parity matrix is selected, it may be the column that has the minimum row index of highest 1 among the columns that is selected. If there is still more than one column remaining, having the same minimum highest 1 in the parity matrix, the leftmost column of the remaining columns may be picked or the remaining columns with the minimum second highest 1 in the parity matrix may be picked.

The column that has the smallest weight may be selected. If more than one column has the same smallest weight, one or more examples described herein may be used. For example, the leftmost column among the candidates may be picked; the candidate columns with the minimum highest 1 in the parity matrix may be picked; or the candidate column with the maximum highest 1 in the parity matrix may be picked.

The following example may be considered. When a CRC polynomial is x4+x3+1 (e.g., 0x19=0b11001), the parity generator matrix may be as provided herein for 12 information bits.

$$\begin{pmatrix} 0001 \\ 1100 \\ 0110 \\ 0011 \\ 1101 \\ 1010 \\ 0101 \\ 1110 \\ 0111 \\ 1111 \\ 1011 \\ 1001 \end{pmatrix}$$

The number of 1's in each column may be 7, 7, 7, and 8, respectively. The smallest weight may be 7, and three columns may have weight 7. For the first column, the first "1" starting from the top may be at the second row. For the second column, the first "1" starting from the top may be at the second row. For the third column, the first "1" starting from the top may be at the third row. By the "minimum highest 1" rule, as described herein, the third column may be selected from this exemplary matrix.

The column that has the minimum highest 1 in the parity matrix may be selected. If more than one column has the same minimum highest 1 in the parity matrix, one or more of the following may be used for the selection: the leftmost column among the candidate columns may be picked; the candidate column with the minimum second highest 1 in the parity matrix may be picked; or the candidate column with the highest (or lowest weight) may be picked.

If the leftmost column among the candidate columns is selected and $K_{max}$=200 bits, the following interleaver pattern may be provided. The underlined values in the interleaver pattern herein may indicate used CRC bits.
0 1 5 7 10 14 16 18 21 23 24 25 27 28 29 33 34 35 36 38 39 40 45 47 48 52 54 56 57 58 60 61 62 63 66 67 69 70 72 73 79 80 83 86 87 89 91 93 96 97 99 101 102 103 106 107 113 116 121 122 123 126 131 138 139 140 145 149 150 151 159 161 167 168 175 176 177 179 180 182 184 186 187 192 193 194 196 198 <u>207</u> 3 4 11 13 17 22 31 37 41 51 55 71 75 88 90 95 100 110 111 114 115 124 127 128 130 133 136 142 143 144 148 153 155 156 158 163 165 169 174 178 181 189 190 195 199 <u>218</u> 2 9 12 26 44 50 74 84 94 105 109 120 134 137 147 160 162 164 166 170 172 183 188 191 <u>203</u> 30 59 65 68 92 129 132 135 141 152 154 157 173 185 197 <u>200</u> 20 42 49 64 81 82 85 98 104 108 118 125 <u>205</u> 15 32 46 53 112 146 <u>201</u> 6 8 19 43 76 77 78 117 119 171 202 204 206 208 209 210 211 212 213 214 215 216 217.

An example matrix may be provided herein.
0 0 0
1 1 1
1 0 0
1 0 1
0 1 0

The highest position of "1" in the first column may be 4, the highest position of "1" in the second column may be 4, and the highest position of "1" in the last column may be 4. The second highest position of *1 in the first column may be 3, the second highest position of "1" in the second column may be 1, and the second highest position of "1" in the last column may be 2. Column 1 may be selected, since the column 1 has the minimum position (e.g., 3) of the second highest element "1" among all the columns from the exemplary matrix.

One or more exemplary list pruning designs and/or configurations may be described herein.

One or more CRC bits may be distributed in the polar code construction. In examples, 3 CRC bits may be distributed in the polar code construction. At the polar decoder, the 3 distributed CRC bits may be used for early termination. The 3 distributed CRC bits may be used for list (or path) pruning. The usage of distributed CRC bits for list pruning may improve the BLER performance. The usage of distributed CRC bits may degrade the false alarm performance and/or the early termination gain. The usage of distributed CRC bits may or may not be included (e.g., or configured) at polar decoder. The corresponding decision may be synchronized to the transmitter. Such a selection may be predetermined or may be configured. The configuration may be via a RRC message. For example, one or more items shown in Table 1 may be added to the RRCConectionReconfiguration message.

TABLE 1

Example RRCConnectionReconfiguration message

RRCConnection Reconfiguration ::= SEQUENCE {
  Tree_pruning_enabled       ENUMERATED {true, false}
  ......
}

When two stage DCI is adopted, the first control channel containing the first DCI may indicate whether the path pruning is applied or not for the second DCI to be received at the receiver side. The flag indicating path pruning may be included in the first DCI.

One or more rules may be established to handle the distributed CRC. For example, a distributed CRC in a PBCH, common control channel, or uplink control channel may be used for path pruning. The distributed CRC in a PDCCH or a WTRU specific control channel may not be used for early termination (e.g., not path pruning).

WTRU specific scrambling may be described herein. In examples, WTRU specific scrambling may not be precluded. One or more exemplary polar code constructions with WTRU specific scrambling may be described herein. WTRU specific scrambling may enhance the error detection performance. For example, WTRU specific scrambling may not decode the non-intended data due to the WTRU ID difference. WTRU specific scrambling may reduce the false alarm rate. The decoding may be stopped earlier e.g., due to the CRC bits mismatch, and may enable early termination.

Figure 34:
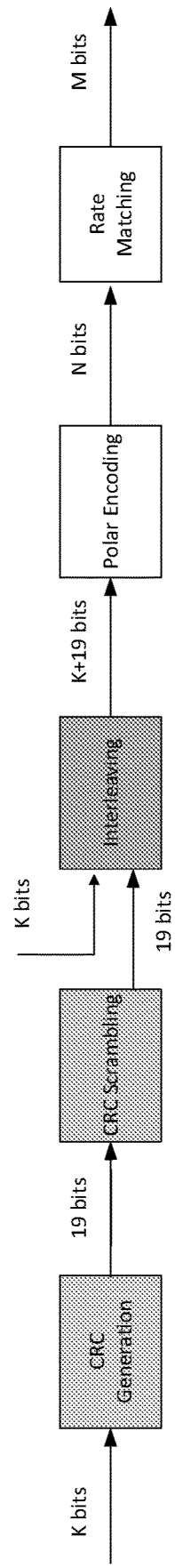
FIG. 34 illustrates an exemplary polar code construction flow with distributed CRC and WTRU-specific scrambling for DL control channel.

FIG. 34 illustrates an exemplary polar code construction flow with distributed CRC and WTRU-specific scrambling for DL control channel. A CRC Scrambling block may be inserted as shown in FIG. 34 (e.g., comparing with FIG. 33). An input to the CRC scrambling block may be the WTRU-ID or C-RNTI. One or more of the following RNTIs may be included (e.g., may also be included): Temporary C-RNTI, SPS C-RNTI, P-RNTI, RA-RNTI, TPC-PUSCH-RNTI, TPC-PUCCH-RNTI, or etc.

In examples, scrambling operation may include one or more of the following. The WTRU-ID may (e.g., first) pass the pseudo-random sequences generation (e.g., as the initial sequence), which may be based on a Gold sequence or other sequences. The generated pseudo-random sequence bits (e.g., first 19 or 11 generated pseudo-random sequence bits) may be used to have the XOR operations with the 19 (or 11) CRC bits.

In examples, scrambling operation may (e.g., directly) XOR WTRU-ID with one or more (e.g., all) of the CRC bits. If the WTRU-ID is 16 bits, the XOR operation may be towards the first or the last 16 CRC bits. In examples, the WTRU-ID may be cycled or repeated from 16 bits to 19 bits and/or XOR with the 19 CRC bits. The CRC Scrambling operation may be deployed (e.g., jointly deployed) with WTRU-ID additionally put in the frozen bit set or with the scheme where one or more (e.g., all) the encoded bits are scrambled by WTRU-ID as described herein.

Figure 35:
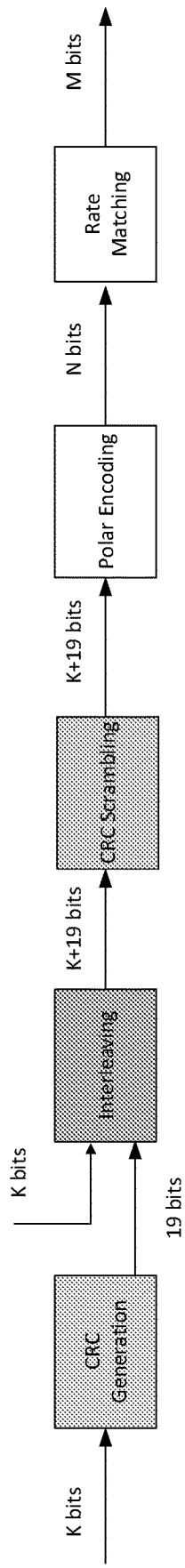
FIG. 35 illustrates an example polar code construction flow with distributed CRC and WTRU-specific scrambling for DL control channel.

FIG. 35 illustrates an example polar code construction flow with distributed CRC and WTRU-specific scrambling for DL control channel. If the 16-bit WTRU-ID XOR with part of the CRC bits, the part of CRC bits XOR-ed may include the distributed CRC bits. The False Alarm Rate (FAR) performance may be improved. If the XOR-ed CRC bits include the distributed CRC bits, the CRC scrambling operation may be added to the example polar code construction flow (e.g., after the Interleaving block), as shown in FIG. 35. The CRC Scrambling operation may be deployed (e.g., jointly deployed) with WTRU-ID additionally put in the frozen bit set or with the scheme where one or more (e.g., all) the encoded bits are scrambled by WTRU-ID as described herein.

Segmentation for early termination may be described herein.

Figure 36:
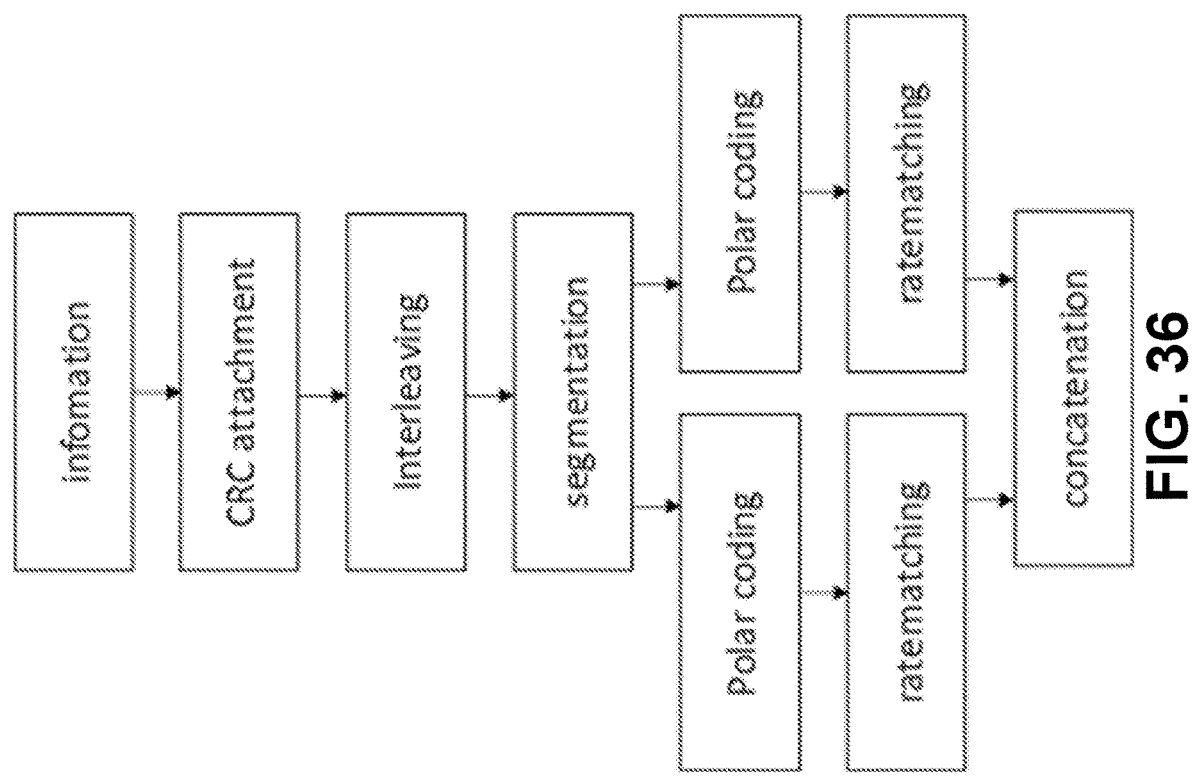
FIG. 36 illustrates an example segmentation of transmitter.
Figure 37:
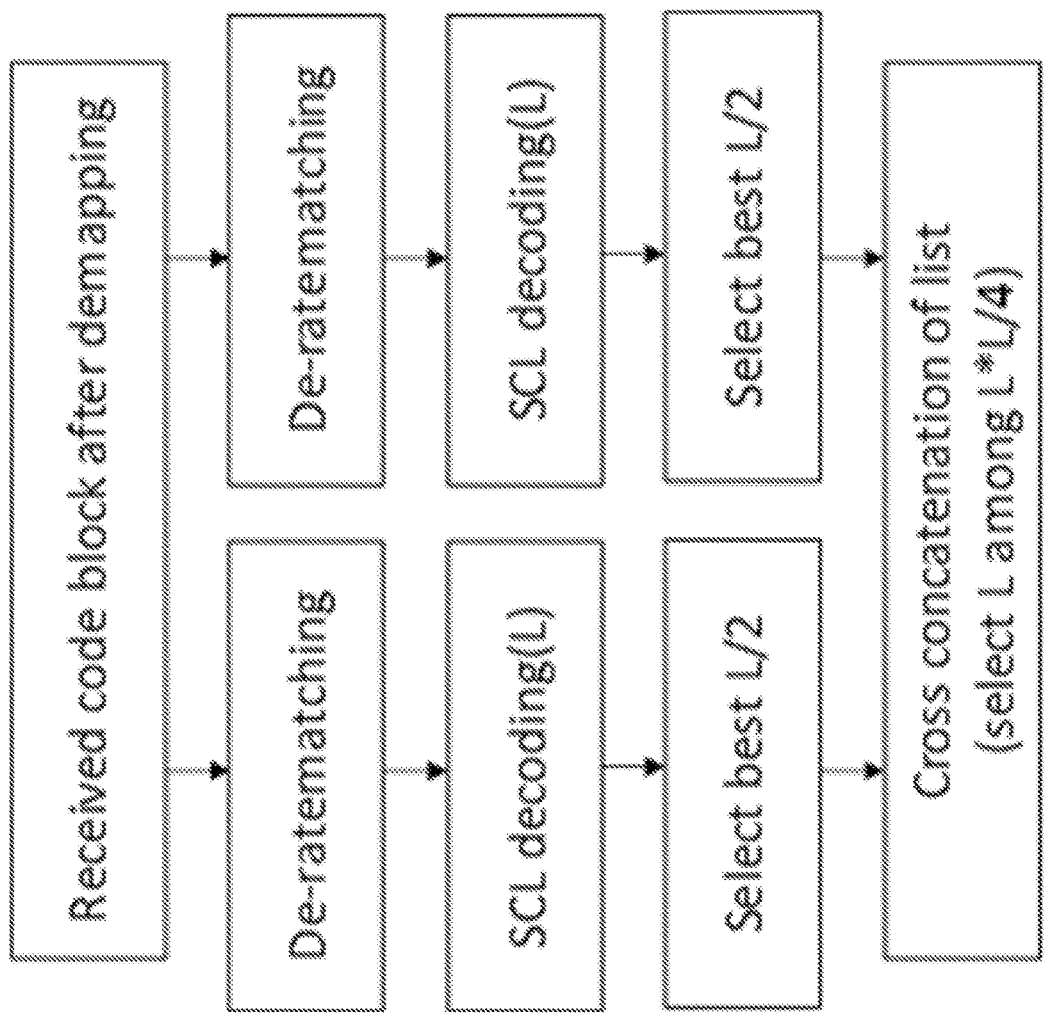
FIG. 37 illustrates an example decoding of segmented polar coded block.

In a NR polar code implementation, code block size may be limited based on the maximum decoder complexity and/or latency. When the wanted code block size exceeds the limit, repetition may be applied. When repetitions (e.g., severe repetitions) needs to be applied, segmentation may be adopted (e.g., to have better performance than the repetition). An example segmentation procedure at transmitter may be shown in FIG. 36. An example procedure of polar decoding of segmented polar coded block may be shown in FIG. 37.

In the segmentation block, the information bits with CRC bits may be divided into multiple segment(s). In examples, two segments may be assumed. The exemplary two segments may be divided (e.g., divided equally), respectively $$\left\lfloor \frac{K+C}{2} \right\rfloor$$

bits may be allocated to each segment. One or more CRC bits may be distributed over the input block (e.g., over the entire input block) and may exist in the segment (e.g., first segment).

Latency of decoding may be a factor (e.g., to some application like URLLC), and a parallel implementation may be disclosed. The parallel decoding of segmented polar code may be configured. When distributed CRC bits are in the second segment, the distributed CRC bits in parallel decoding may not contribute to early termination performance.

Distributed CRC bits may be placed in the first segment (e.g., only the first segment). Distributed CRC bits may be handled under segmentation. In examples, x may be the index of the last distributed CRC bit, e.g., in domain of information bits. The following choices may apply if x is larger than the last index of the first segment: the number of distributed CRC bits may be reduced until one or more (e.g., all) distributed CRC bits are included in the first segment; and/or the number of information bits in the first segment may be increased until one or more (e.g., all) distributed CRC bits are included in the first segment.

In examples, if x is larger than the last index of the first segment, the number of distributed CRC bits may be reduced until one or more (e.g., all) distributed CRC bits are included in the first segment. Interleaver configurations may be changed according to the change of distributed CRC bits.

The reduction of distributed CRC bits may be synchronized between transmitter and receiver. The following choices may apply: the receiver may perform the same calculation as the transmitter based on the information block length; the calculation may be done offline; or the transmitter may signal whether and/or how much is the reduction of distributed CRC bit(s) to the receiver. For example, the transmitter may calculate whether or not the number of distributed CRC bit(s) is reduced and/or how many distributed CRC bit(s) is reduced. The calculation may be done pre-hand, e.g., based on segmentation size. The calculation results may be pre-stored, e.g., to avoid real-time calculation. For the case where the receiver performs the same calculation as the transmitter based on the information block length, the receiver may know which CRC bit(s) are to be reduced. For the case where the calculation can be done offline, the table of reduced CRC bit(s) in terms of the length of information bits may be provided and/or specified. For the case where the transmitter signals this information to receiver, a signaling (e.g., 2 bits signaling) may be configured. In examples, 2 bits signaling may indicate how many of the 3 distributed CRC bits are reduced. In examples, "00" may indicate no distributed CRC bit is reduced. "01" may indicate 1 distributed CRC bit is reduced. "10" may indicate 2 distributed CRC bits are reduced. "11" may indicate 3 distributed CRC bits are reduced.

In examples, if x is larger than the last index of the first segment, the number of information bits in the first segment may be increased until one or more (e.g., all) distributed CRC bits are included in the first segment. One or more (e.g., all) information bits, which may be limited to x, may be included in the first segment, and the remaining information bits may be allocated to the second segment.

The segment size may be flexible. For example, the segment size may depend on the information block length. The segmentation size may be synchronized between transmitter and receiver. The following choices may apply: the receiver may perform the same calculation as the transmitter based on the information block length; the calculation may be done offline; or the transmitter may signal this information to receiver. For the case where the receiver performs the same calculation as the transmitter based on the information block length, the receiver may know the size of each segmentation. For the case where the calculation can be done offline, the table of first segment length in terms of the length of information bits may be provided and/or specified and/or signalled.

Interleaver design and CRC polynomials (e.g., for new radio (NR)) may be described herein.

Figure 38:
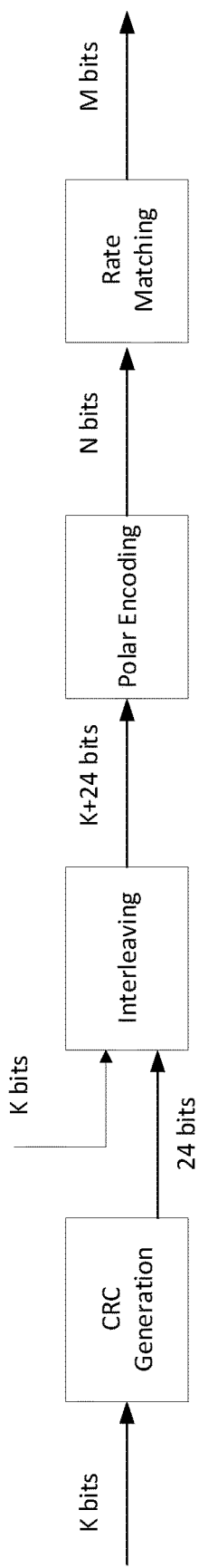
FIG. 38 illustrates an example NR polar code construction flow with distributed CRC for DL control channel.

The number of CRC bits for DL may be increased to 24 from 16 (e.g., as in LTE). FIG. 38 illustrates an example NR polar code construction flow with distributed CRC for DL control channel.

The CRC polynomial to be used may be provided as follows:

$D^{24}+D^{23}+D^{21}+D^{20}+D^{17}+D^{15}+D^{13}+D^{12}+D^{8}+D^{4}+D^{2}+D+1$.

With the $K_{max}$ estimated as 200, the corresponding interleaver pattern may be:

0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, <u>200</u>, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, <u>201</u>, 10, 15, 18, 26, 30, 52, 66, 71, 76, 82, 90, 93, 96, 104, 107, 124, 134, 139, 145, 157, 160, 163, 177, 185, 191, 196, <u>202</u>, 27, 31, 53, 72, 77, 83, 97, 108, 135, 140, 146, 197, <u>203</u>, 73, 78, 98, <u>204</u>, 99, <u>205</u>, 100, <u>206</u>, 101, <u>207,208,209,210,211,212,213,214,215,216,217,218,219, 220,221,222,223</u>.

The underlined values in the interleaver pattern herein may indicate CRC bits.

One or more modifications to the polynomial and/or interleaver pattern as described herein may be modified (e.g., keeping the modifications as minimal as possible).

The FAR performance of the interleaver pattern (e.g., shown above) may not be satisfactory, as the FAR with intended codewords may be above the target $2^{(-21)}$. The FAR performance may reach as high as $1.5*2^{(-21)}$. The FAR performance may be improved by increasing the number of appended CRC bits. If the number of appended CRC bits are increased, the early termination gain may be reduced. The early termination gain may be tolerant (e.g., FAR performance may be more of a concern). One or more exemplary modifications of the interleaver patterns may be provided (e.g., modifications may be shown in bold).

0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, <u>200</u>, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, <u>201</u>, 10, 15, 18, 26, 30, 52, 66, 71, 76, 82, 90, 93, 96, 104, 107, 124, 134, 139, 145, 157, 160, 163, 177, 185, 191, 196, <u>202</u>, 27, 31, 53, 72, 77, 83, 97, 108, 135, 140, 146, 197, <u>203</u>, 73, 78, 98, <u>204</u>, 99, <u>205</u>, 100, 101, <u>206,207,208,209,210,211,212,213,214,215,216,217, 218,219,220,221,222,223</u>.

In the exemplary modified pattern, the number of appended CRC bits may be increased to 18 bits (e.g., while in the unmodified pattern, the number of appended CRC bits may be 17 bits).

The appended CRC number may be increased (e.g., further increased) to reduce (e.g., further reduce) the FAR, e.g., at the cost of early termination gain. In examples, modifications of the interleaver patterns may be provided (e.g., modifications may be shown in bold).

0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, <u>200</u>, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, <u>201</u>, 10, 15, 18, 26, 30, 52, 66, 71, 76, 82, 90, 93, 96, 104, 107, 124, 134, 139, 145, 157, 160, 163, 177, 185, 191, 196, <u>202</u>, 27, 31, 53, 72, 77, 83, 97, 108, 135, 140, 146, 197, <u>203</u>, 73, 78, 98, <u>204</u>, 99, 100, 101, <u>205,206,207,208,209,210,211,212,213,214,215,216,217, 218,219,220,221,222,223</u>.

In examples, modifications of the interleaver patterns may be provided (e.g., modifications may be shown in bold).

0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, <u>200</u>, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, <u>201</u>, 10, 15, 18, 26, 30, 52, 66, 71, 76, 82, 90, 93, 96, 104, 107, 124, 134, 139, 145, 157, 160, 163, 177, 185, 191, 196, <u>202</u>, 27, 31, 53, 72, 77, 83, 97, 108, 135, 140, 146, 197, <u>203</u>, 73, 78, 98, 99, 100, 101 ,<u>204,205,206,207,208,209,210,211,212,213,214,215,216, 217,218,219,220,221,222,223</u>.

In examples, modifications of the interleaver patterns may be provided (e.g., modifications may be shown in bold).

0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, <u>200</u>, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, <u>201</u>, 10, 15, 18, 26, 30, 52, 66, 71, 76, 82, 90, 93, 96, 104, 107, 124, 134, 139, 145, 157, 160, 163, 177, 185, 191, 196, <u>202</u>, 27, 31, 53, 72, 77, 83, 97, 108, 135, 140, 146, 197, 73, 78, 98, 99, 100, 101, <u>203,204,205,206,207,208,209,210,211,212,213,214,215, 216,217,218,219,220,221,222,223</u>.

In one or more (e.g., all) of the exemplary modified interleaver patterns, the difference from the unmodified pattern may be shown in bold text, and CRC bits may be shown in underlined text.

The parameter $K_{max}$ may be provided such that: $K_{max}$=max(140, max DCI payload size in Rel-15+20). One or more (e.g., all) of the modified patterns described herein may be based on $K_{max}$=200. One or more of the following exemplary interleaver patterns may be based on $K_{max}$=140.

0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, <u>140</u>, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, <u>141</u>, 10, 15, 18, 26, 30, 52, 66, 71, 76, 82, 90, 93, 96, 104, 107, 124, 134, 139, <u>142</u>, 27, 31, 53, 72, 77, 83, 97, 108, 135, <u>143</u>, 73, 78, 98, <u>144</u>, 99, <u>145</u>, 100, <u>146</u>, 101, <u>147,148,149,150,151,152,153,154,155,156,157,158,159, 160,161,162,163</u>.

Or 0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 140, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 141, 10, 15, 18, 26, 30, 52, 66, 71, 76, 82, 90, 93, 96, 104, 107, 124, 134, 139, 142, 27, 31, 53, 72, 77, 83, 97, 108, 135, 143, 73, 78, 98, 144, 99, 145, 100, 101, 146,147,148,149,150,151,152,153,154,155,156,157,158, 159,160,161,162,163.

Or 0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 140, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 141, 10, 15, 18, 26, 30, 52, 66, 71, 76, 82, 90, 93, 96, 104, 107, 124, 134, 139, 142, 27, 31, 53, 72, 77, 83, 97, 108, 135, 143, 73, 78, 98, 144, 99, 100, 101, 145,146,147,148,149,150,151,152,153,154,155,156,157, 158,159,160,161,162,163.

Or 0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 140, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 141, 10, 15, 18, 26, 30, 52, 66, 71, 76, 82, 90, 93, 96, 104, 107, 124, 134, 139, 142, 27, 31, 53, 72, 77, 83, 97, 108, 135, 143, 73, 78, 98, 99, 100, 101, 144,145,146,147,148,149,150,151,152,153,154,155,156, 157,158,159,160,161,162,163.

Or 0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 140, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 141, 10, 15, 18, 26, 30, 52, 66, 71, 76, 82, 90, 93, 96, 104, 107, 124, 134, 139, 142, 27, 31, 53, 72, 77, 83, 97, 108, 135, 73, 78, 98, 99, 100, 101, 143,144,145,146,147,148,149,150,151,152,153,154,155, 156,157,158,159,160,161,162,163.

With the above modified interleaver pattern (e.g., based on $K_{max}$=140), the FAR performance may achieve the target level of $2^{(-21)}$, e.g., while keeping the good early termination gain.

The interleaver pattern may be generated by picking the minimum highest 1 in the parity matrix, e.g., with the priority of picking the leftmost column among the candidate columns which may have the same minimum highest 1, where:

2 4 7 9 10 14 15 16 17 19 20 21 22 25 26 30 38 43 44 46 48 49 53 54 57 58 59 64 65 70 71 72 75 76 77 78 79 80 83 86 87 89 94 101 103 104 105 109 116 117 120 121 122 123 127 128 129 130 131 135 136 137 149 3 5 8 11 18 23 27 31 39 45 47 50 55 60 66 73 81 84 88 90 95 102 106 110 118 124 132 138 148 0 1 12 13 28 29 33 35 36 40 82 92 98 99 100 112 115 119 125 133 163 6 52 61 69 97 111 113 114 126 134 139 142 34 42 56 67 85 93 108 159 24 41 74 161 37 63 150 32 51 62 68 91 96 107 140141143144145146147150151152153154155156157158160162.

Or 2 4 7 9 10 14 15 16 17 19 20 21 22 25 26 30 38 43 44 46 48 49 53 54 57 58 59 64 65 70 71 72 75 76 77 78 79 80 83 86 87 89 94 101 103 104 105 109 116 117 120 121 122 123 127 128 129 130 131 135 136 137 149 3 5 8 11 18 23 27 31 39 45 47 50 55 60 66 73 81 84 88 90 95 102 106 110 118 124 132 138 148 0 1 12 13 28 29 33 35 36 40 82 92 98 99 100 112 115 119 125 133 163 6 52 61 69 97 111 113 114 126 134 139 142 34 42 56 67 85 93 108 159 24 41 74 161 32 37 51 62 63 68 91 96 107 140141143144145146147150151152153154155156157158160162.

Or 2 4 7 9 10 14 15 16 17 19 20 21 22 25 26 30 38 43 44 46 48 49 53 54 57 58 59 64 65 70 71 72 75 76 77 78 79 80 83 86 87 89 94 101 103 104 105 109 116 117 120 121 122 123 127 128 129 130 131 135 136 137 149 3 5 8 11 18 23 27 31 39 45 47 50 55 60 66 73 81 84 88 90 95 102 106 110 118 124 132 138 148 0 1 12 13 28 29 33 35 36 40 82 92 98 99 100 112 115 119 125 133 163 6 52 61 69 97 111 113 114 126 134 139 142 24 32 34 37 41 42 51 56 62 63 67 68 74 85 91 96 107 140141143144145146147150151152153154155156157158160161162.

Or 2 4 7 9 10 14 15 16 17 19 20 21 22 25 26 30 38 43 44 46 48 49 53 54 57 58 59 64 65 70 71 72 75 76 77 78 79 80 83 86 87 89 94 101 103 104 105 109 116 117 120 121 122 123 127 128 129 130 131 135 136 137 149 3 5 8 11 18 23 27 31 39 45 47 50 55 60 66 73 81 84 88 90 95 102 106 110 118 124 132 138 148 0 1 12 13 28 29 33 35 36 40 82 92 98 99 100 112 115 119 125 133 163 6 52 61 69 97 111 113 114 126 134 139 142 24 32 34 37 41 42 51 56 62 63 67 68 74 85 91 93 96 107 108 140141143144145146147150151152153154155156157-158159160161162.

Or 2 4 7 9 10 14 15 16 17 19 20 21 22 25 26 30 38 43 44 46 48 49 53 54 57 58 59 64 65 70 71 72 75 76 77 78 79 80 83 86 87 89 94 101 103 104 105 109 116 117 120 121 122 123 127 128 129 130 131 135 136 137 149 3 5 8 11 18 23 27 31 39 45 47 50 55 60 66 73 81 84 88 90 95 102 106 110 118 124 132 138 148 0 1 12 13 28 29 33 35 36 40 82 92 98 99 100 112 115 119 125 133 163 6 24 32 34 37 41 42 51 52 56 61 62 63 67 68 69 74 85 91 93 96 97 107 108 111 113 114 126 134 139 140141142143144145146147150151152153154155156-157158159160161162.

The interleaver pattern may be generated by other selection procedure after the first column selection, e.g., based on picking the minimum highest 1 in the parity matrix, with the priority of picking the leftmost column among the candidate columns which may have the same minimum highest 1. For example, the column with maximum weight for the remaining distributed CRC bits may be selected (e.g., instead of selecting the column with minimum weight). In the selection procedure described herein, the rows with a value of '1' in the previous selected columns may not be considered (e.g., deleted).

The following patterns may illustrate examples of the interleaver pattern generated by the procedure described herein (e.g., selecting the maximum weight instead of minimum weight).

2 4 7 9 10 14 15 16 17 19 20 21 22 25 26 30 38 43 44 46 48 49 53 54 57 58 59 64 65 70 71 72 75 76 77 78 79 80 83 86 87 89 94 101 103 104 105 109 116 117 120 121 122 123 127 128 129 130 131 135 136 137 <u>149</u> 0 1 5 8 11 12 18 23 24 27 28 29 32 35 36 37 39 40 42 45 52 61 62 67 69 88 90 91 92 96 97 99 106 110 111 113 114 115 118 119 124 125 132 134 138 <u>156</u> 3 33 34 41 47 51 55 56 66 73 81 84 85 93 98 102 107 112 126 133 139 <u>162</u> 6 13 31 50 60 68 74 82 95 100 <u>158</u> 63 108 140141142143144145146147148150151152153154155-157159160161163.

Or 2 4 7 9 10 14 15 16 17 19 20 21 22 25 26 30 38 43 44 46 48 49 53 54 57 58 59 64 65 70 71 72 75 76 77 78 79 80 83 86 87 89 94 101 103 104 105 109 116 117 120 121 122 123 127 128 129 130 131 135 136 137 <u>149</u> 0 1 5 8 11 12 18 23 24 27 28 29 32 35 36 37 39 40 42 45 52 61 62 67 69 88 90 91 92 96 97 99 106 110 111 113 114 115 118 119 124 125 132 134 138 <u>156</u> 3 33 34 41 47 51 55 56 66 73 81 84 85 93 98 102 107 112 126 133 139 <u>162</u> 6 13 31 50 60 63 68 74 82 95 100 108 140141142143144145146147148150151152153154155-157158159160161163.

The one or more interleaver patterns described herein (e.g., selecting the maximum weight) may be based on the given CRC polynomial. One or more other CRC polynomials may be implemented. For example, one or more of the CRC polynomials for the 24-bit CRC in LTE may be reused.

$D^{24}+D^{23}+D^{18}+D^{17}+D^{14}+D^{11}+D^{10}+D^7+D^6+D^5+D^4+D^3+D+1$

Or $D^{24}+D^{23}+D^6+D^5+D+1$

The exemplary CRC polynomials provided herein may show good error detection performance and may be reused in NR (e.g., especially for distributed CRC scheme in polar coding).

A nested design for the interleaver may be provided. For example, in performing nested operations, the information bits may be $K \le K_{max}$. $X0, \ldots, X_{(K+23)}$ may be the output bits from a single CRC generator, where the last 24 bits may be appended CRC bits. K+24 bits may be expanded to $K_{max}+24$ bits. For example, $y_i = x_{K-i-1}, i=0, \ldots, K-1$, $y_i = \text{NULL}, i=K, \ldots, K_{max}-1$, $y_i = x_{i-(K_{max}-K)}, i=K_{max}, \ldots, K_{max}+23$, The expanded y bits may be passed to the interleaver with pattern as described herein. The output bits from the interleaver may be denoted by $z_0, \ldots, z_{K_{max}}+23$. One or more (e.g., all) the NULL bits may be removed from $z_0, \ldots, z_{K_{max}+23}$.

Based on an example nested structure, for $K_{max}=200$, the interleaver pattern may be 199, 197, 196, 194, 193, 191, 188, 187, 186, 183, 180, 179, 177, 175, 171, 167, 166, 164, 162, 161, 160, 159, 158, 157, 155, 153, 152, 150, 149, 145, 144, 142, 140, 139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, <u>200</u>, 198, 195, 192, 190, 185, 182, 178, 176, 174, 170, 165, 163, 156, 154, 151, 148, 143, 141, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, <u>201</u>, 189, 184, 181, 173, 169, 147, 133, 128, 123, 117, 109, 106, 103, 95, 92, 75, 65, 60, 54, 42, 39, 36, 22, 14, 8, 3, <u>202</u>, 172, 168, 146, 127, 122, 116, 102, 91, 64, 59, 53, 2, <u>203</u>, 126, 121, 101, <u>204</u>, 100, <u>205</u>, 99, <u>206</u>, 98, 207,208,209,210,211,212,213,214,215,216,217,218,219, 220,221,222,223 or 199, 197, 196, 194, 193, 191, 188, 187, 186, 183, 180, 179, 177, 175, 171, 167, 166, 164, 162, 161, 160, 159, 158, 157, 155, 153, 152, 150, 149, 145, 144, 142, 140, 139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, <u>200</u>, 198, 195, 192, 190, 185, 182, 178, 176, 174, 170, 165, 163, 156, 154, 151, 148, 143, 141, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, <u>201</u>, 189, 184, 181, 173, 169, 147, 133, 128, 123, 117, 109, 106, 103, 95, 92, 75, 65, 60, 54, 42, 39, 36, 22, 14, 8, 3, <u>202</u>, 172, 168, 146, 127, 122, 116, 102, 91, 64, 59, 53, 2, <u>203</u>, 126, 121, 101, <u>204</u>, 100, <u>205</u>, 99, 98, 206,207,208,209,210,211,212,213,214,215,216,217,218, 219,220,221,222,223

Or 199, 197, 196, 194, 193, 191, 188, 187, 186, 183, 180, 179, 177, 175, 171, 167, 166, 164, 162, 161, 160, 159, 158, 157, 155, 153, 152, 150, 149, 145, 144, 142, 140, 139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, <u>200</u>, 198, 195, 192, 190, 185, 182, 178, 176, 174, 170, 165, 163, 156, 154, 151, 148, 143, 141, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, <u>201</u>, 189, 184, 181, 173, 169, 147, 133, 128, 123, 117, 109, 106, 103, 95, 92, 75, 65, 60, 54, 42, 39, 36, 22, 14, 8, 3, <u>202</u>, 172, 168, 146, 127, 122, 116, 102, 91, 64, 59, 53, 2, <u>203</u>, 126, 121, 101, <u>204</u>, 100, 99, 98, 205,206,207,208,209,210,211,212,213,214,215,216,217, 218,219,220,221,222,223

Or 199, 197, 196, 194, 193, 191, 188, 187, 186, 183, 180, 179, 177, 175, 171, 167, 166, 164, 162, 161, 160, 159, 158, 157, 155, 153, 152, 150, 149, 145, 144, 142, 140, 139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, <u>200</u>, 198, 195, 192, 190, 185, 182, 178, 176, 174, 170, 165, 163, 156, 154, 151, 148, 143, 141, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, <u>201</u>, 189, 184, 181, 173, 169, 147, 133, 128, 123, 117, 109, 106, 103, 95, 92, 75, 65, 60, 54, 42, 39, 36, 22, 14, 8, 3, <u>202</u>, 172, 168, 146, 127, 122, 116, 102, 91, 64, 59, 53, 2, <u>203</u>, 126, 121, 101, 100, 99, 98, 204,205,206,207,208,209,210,211,212,213,214,215,216, 217,218,219,220,221,222,223

Or 199, 197, 196, 194, 193, 191, 188, 187, 186, 183, 180, 179, 177, 175, 171, 167, 166, 164, 162, 161, 160, 159, 158, 157, 155, 153, 152, 150, 149, 145, 144, 142, 140, 139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 200, 198, 195, 192, 190, 185, 182, 178, 176, 174, 170, 165, 163, 156, 154, 151, 148, 143, 141, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 201, 189, 184, 181, 173, 169, 147, 133, 128, 123, 117, 109, 106, 103, 95, 92, 75, 65, 60, 54, 42, 39, 36, 22, 14, 8, 3, 202, 172, 168, 146, 127, 122, 116, 102, 91, 64, 59, 53, 2, 126, 121, 101, 100, 99, 98, 203,204,205,206,207,208,209,210,211,212,213,214,215, 216,217,218,219,220,221,222,223

For $K_{max}$=140, the interleaver pattern may be
139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 140, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 141, 133, 128, 123, 117, 109, 106, 103, 95, 92, 75, 65, 60, 54, 42, 39, 36, 22, 14, 8, 3, 142, 127, 122, 116, 102, 91, 64, 59, 53, 2, 143, 126, 121, 101, 144, 100, 145, 99, 146, 98, 147,148,149,150,151,152,153,154,155,156,157,158,159, 160,161,162,163

Or
139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 140, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 141, 133, 128, 123, 117, 109, 106, 103, 95, 92, 75, 65, 60, 54, 42, 39, 36, 22, 14, 8, 3, 142, 127, 122, 116, 102, 91, 64, 59, 53, 2, 143, 126, 121, 101, 144, 100, 145, 99, 98, 146, 147,148,149,150,151,152,153,154,155,156,157,158,159, 160,161,162,163

Or
139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 140, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 141, 133, 128, 123, 117, 109, 106, 103, 95, 92, 75, 65, 60, 54, 42, 39, 36, 22, 14, 8, 3, 142, 127, 122, 116, 102, 91, 64, 59, 53, 2, 143, 126, 121, 101, 144, 100, 99, 98, 145,146,147,148,149,150,151,152,153,154,155,156, 157,158,159,160,161,162,163

Or
139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 140, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 141, 133, 128, 123, 117, 109, 106, 103, 95, 92, 75, 65, 60, 54, 42, 39, 36, 22, 14, 8, 3, 142, 127, 122, 116, 102, 91, 64, 59, 53, 2, 143, 126, 121, 101, 100, 99, 98, 144145,146,147,148,149,150,151,152,153,154,155,156, 157,158,159,160,161,162,163

Or
139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 140, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 141, 133, 128, 123, 117, 109, 106, 103, 95, 92, 75, 65, 60, 54, 42, 39, 36, 22, 14, 8, 3, 142, 127, 122, 116, 102, 91, 64, 59, 53, 2, 126, 121, 101, 100, 99, 98, 143,144,145,146,147,148,149,150,151,152,153,154,155, 156,157,158,159,160,161,162,163

In examples, a way of performing the nested operations may include supposing the actual information bits are $K \leq K_{max}$. $x_0, \ldots, x_{K+23}$ may be output bits from the single CRC generator, where the last 24 bits may be appended CRC bits. The bits fed into an interleaver may be shown as $y_i$=NULL,$i$=0, $\ldots$ ,$K_{max}$-$K$-1, $y_i$=$x_{i-(K_{max}-K)}$,$l$=$K_{max}$-$K$, $\ldots$ ,$K_{max}$+23, The expanded y bits may be passed to the interleaver with pattern shown herein. The output bits from the interleaver may be denoted by $z_0, \ldots, z_{K_{max}+23}$. One or more (e.g., all) the NULL bits may be removed from $z_0, \ldots, z_{K_{max}+23}$.

Based on the nested structure, for $K_{max}$=200, the interleaver pattern may be
0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, 200, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, 201, 10, 15, 18, 26, 30, 52, 66, 71, 76, 82, 90, 93, 96, 104, 107, 124, 134, 139, 145, 157, 160, 163, 177, 185, 191, 196, 202, 27, 31, 53, 72, 77, 83, 97, 108, 135, 140, 146, 197, 203, 73, 78, 98, 204, 99, 205, 100, 206, 101, 207,208,209,210,211,212,213,214,215,216,217,218,219, 220,221,222,223

Or
0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, 200, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, 201, 10, 15, 18, 26, 30, 52, 66, 71, 76, 82, 90, 93, 96, 104, 107, 124, 134, 139, 145, 157, 160, 163, 177, 185, 191, 196, 202, 27, 31, 53, 72, 77, 83, 97, 108, 135, 140, 146, 197, 203, 73, 78, 98, 204, 99, 205, 100, 101, 206, 207,208,209,210,211,212,213,214,215,216,217,218,219, 220,221,222,223

Or
0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, 200, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, 201, 10, 15, 18, 26, 30, 52, 66, 71, 76, 82, 90, 93, 96, 104, 107, 124, 134, 139, 145, 157, 160, 163, 177, 185, 191, 196, 202, 27, 31, 53, 72, 77, 83, 97, 108, 135, 140, 146, 197, 203, 73, 78, 98, 204, 99, 100, 101, 205, 206, 207,208,209,210,211,212,213,214,215,216,217,218,219, 220,221,222,223

Or 0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, 200, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, 201, 10, 15, 18, 26, 30, 52, 66, 71, 76, 82, 90, 93, 96, 104, 107, 124, 134, 139, 145, 157, 160, 163, 177, 185, 191, 196, 202, 27, 31, 53, 72, 77, 83, 97, 108, 135, 140, 146, 197, 203, 73, 78, 98, 99, 100, 101, 204, 205,206,207,208,209,210,211,212,213,214,215,216,217, 218,219,220,221,222,223

Or 0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, 200, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, 201, 10, 15, 18, 26, 30, 52, 66, 71, 76, 82, 90, 93, 96, 104, 107, 124, 134, 139, 145, 157, 160, 163, 177, 185, 191, 196, 202, 27, 31, 53, 72, 77, 83, 97, 108, 135, 140, 146, 197, 73, 78, 98, 99, 100, 101, 203,204,205,206,207,208,209,210,211,212,213,214,215, 216,217,218,219,220,221,222,223

For $K_{max}$=140, the interleaver pattern may be 0, 2, 4, 7, 9, 14, 19, 20, 24, 25, 26, 28, 31, 34, 42, 45, 49, 50, 51, 53, 54, 56, 58, 59, 61, 62, 65, 66, 67, 69, 70, 71, 72, 76, 77, 81, 82, 83, 87, 88, 89, 91, 93, 95, 98, 101, 104, 106, 108, 110, 111, 113, 115, 118, 119, 120, 122, 123, 126, 127, 129, 132, 134, 138, 139, 140, 1, 3, 5, 8, 10, 15, 21, 27, 29, 32, 35, 43, 46, 52, 55, 57, 60, 63, 68, 73, 78, 84, 90, 92, 94, 96, 99, 102, 105, 107, 109, 112, 114, 116, 121, 124, 128, 130, 133, 135, 141, 6, 11, 16, 22, 30, 33, 36, 44, 47, 64, 74, 79, 85, 97, 100, 103, 117, 125, 131, 136, 142, 12, 17, 23, 37, 48, 75, 80, 86, 137, 143, 13, 18, 38, 144, 39, 145, 40, 146, 41, 147,148,149,150,151,152,153,154,155,156,157,158,159, 160,161,162,163

Or 0, 2, 4, 7, 9, 14, 19, 20, 24, 25, 26, 28, 31, 34, 42, 45, 49, 50, 51, 53, 54, 56, 58, 59, 61, 62, 65, 66, 67, 69, 70, 71, 72, 76, 77, 81, 82, 83, 87, 88, 89, 91, 93, 95, 98, 101, 104, 106, 108, 110, 111, 113, 115, 118, 119, 120, 122, 123, 126, 127, 129, 132, 134, 138, 139, 140, 1, 3, 5, 8, 10, 15, 21, 27, 29, 32, 35, 43, 46, 52, 55, 57, 60, 63, 68, 73, 78, 84, 90, 92, 94, 96, 99, 102, 105, 107, 109, 112, 114, 116, 121, 124, 128, 130, 133, 135, 141, 6, 11, 16, 22, 30, 33, 36, 44, 47, 64, 74, 79, 85, 97, 100, 103, 117, 125, 131, 136, 142, 12, 17, 23, 37, 48, 75, 80, 86, 137, 143, 13, 18, 38, 144, 39, 40, 41, 145, 146, 147,148,149,150,151,152,153,154,155,156,157,158, 159,160,161,162,163

Or 0, 2, 4, 7, 9, 14, 19, 20, 24, 25, 26, 28, 31, 34, 42, 45, 49, 50, 51, 53, 54, 56, 58, 59, 61, 62, 65, 66, 67, 69, 70, 71, 72, 76, 77, 81, 82, 83, 87, 88, 89, 91, 93, 95, 98, 101, 104, 106, 108, 110, 111, 113, 115, 118, 119, 120, 122, 123, 126, 127, 129, 132, 134, 138, 139, 140, 1, 3, 5, 8, 10, 15, 21, 27, 29, 32, 35, 43, 46, 52, 55, 57, 60, 63, 68, 73, 78, 84, 90, 92, 94, 96, 99, 102, 105, 107, 109, 112, 114, 116, 121, 124, 128, 130, 133, 135, 141, 6, 11, 16, 22, 30, 33, 36, 44, 47, 64, 74, 79, 85, 97, 100, 103, 117, 125, 131, 136, 142, 12, 17, 23, 37, 48, 75, 80, 86, 137, 143, 13, 18, 38, 144, 39, 40, 41, 145, 146, 147,148,149,150,151,152,153,154,155,156,157,158,159, 160,161,162,163

Or 0, 2, 4, 7, 9, 14, 19, 20, 24, 25, 26, 28, 31, 34, 42, 45, 49, 50, 51, 53, 54, 56, 58, 59, 61, 62, 65, 66, 67, 69, 70, 71, 72, 76, 77, 81, 82, 83, 87, 88, 89, 91, 93, 95, 98, 101, 104, 106, 108, 110, 111, 113, 115, 118, 119, 120, 122, 123, 126, 127, 129, 132, 134, 138, 139, 140, 1, 3, 5, 8, 10, 15, 21, 27, 29, 32, 35, 43, 46, 52, 55, 57, 60, 63, 68, 73, 78, 84, 90, 92, 94, 96, 99, 102, 105, 107, 109, 112, 114, 116, 121, 124, 128, 130, 133, 135, 141, 6, 11, 16, 22, 30, 33, 36, 44, 47, 64, 74, 79, 85, 97, 100, 103, 117, 125, 131, 136, 142, 12, 17, 23, 37, 48, 75, 80, 86, 137, 143, 13, 18, 38, 39, 40, 41, 144,145, 146,147,148,149,150,151,152,153,154,155,156,157,158, 159,160,161,162,163

Or 0, 2, 4, 7, 9, 14, 19, 20, 24, 25, 26, 28, 31, 34, 42, 45, 49, 50, 51, 53, 54, 56, 58, 59, 61, 62, 65, 66, 67, 69, 70, 71, 72, 76, 77, 81, 82, 83, 87, 88, 89, 91, 93, 95, 98, 101, 104, 106, 108, 110, 111, 113, 115, 118, 119, 120, 122, 123, 126, 127, 129, 132, 134, 138, 139, 140, 1, 3, 5, 8, 10, 15, 21, 27, 29, 32, 35, 43, 46, 52, 55, 57, 60, 63, 68, 73, 78, 84, 90, 92, 94, 96, 99, 102, 105, 107, 109, 112, 114, 116, 121, 124, 128, 130, 133, 135, 141, 6, 11, 16, 22, 30, 33, 36, 44, 47, 64, 74, 79, 85, 97, 100, 103, 117, 125, 131, 136, 142, 12, 17, 23, 37, 48, 75, 80, 86, 137, 13, 18, 38, 39, 40, 41, 143, 144, 145, 146, 147,148,149,150,151,152,153,154,155,156,157,158,159, 160,161,162,163.

Interleaver designs and implementations (e.g., additional and/or alternative interleaver designs and implementations) may be provided, e.g., for NR. In examples (e.g., as may be previously presented) information bits and CRC bits may be interleaved jointly. An interleaved bit sequence may be passed to polar encoders, for example, in natural order of the information bits set. An information bits set may indicate bit channels that are not frozen. An information bits set may be used to carry information bits and CRC bits. An information bits set may depend on, for example, information length K, CRC length, and/or a rate matching output sequence length M for a given polar code sequence, e.g., due to a rate matching scheme.

FAR performance of an interleaver may be affected, for example, by polar code sequence and/or polar code rate matching schemes. This may occur, for example, because (e.g., distributed and appended) CRC bits may be allocated to relatively less reliable bit channels within an information bit set. This may result in unreliable decoding of CRC bits, which may affect FAR performance. In examples, an interleaver pattern may achieve good FAR performance for a pair (e.g., one pair) of information bit block size K and a number of coded bits for transmission M and may achieve bad FAR performance for another pair of (K, M). FAR performance may (e.g., therefore) not be stable.

Figure 39:
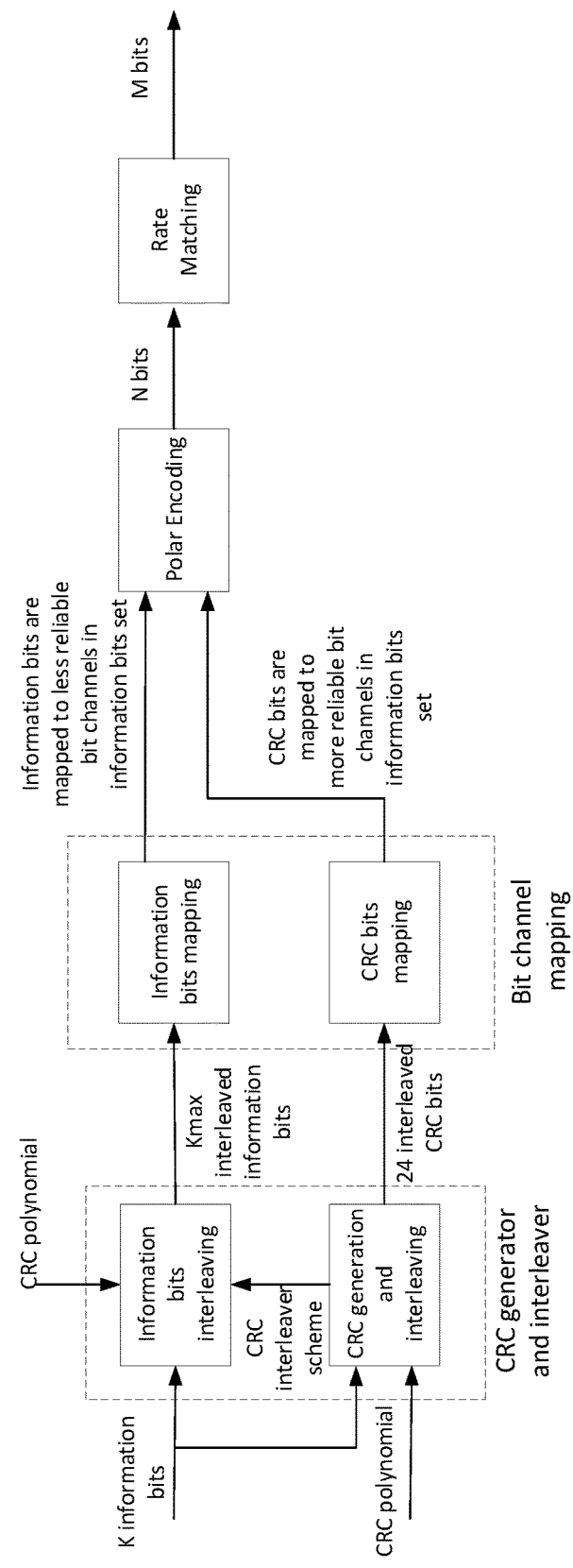
FIG. 39 illustrates an example NR polar code construction flow with distributed CRC and interleaved CRC bits.

FAR performance may be stable, reliable or ensured, for example, using one or more implementations described herein (e.g., as shown by example in FIG. 39).

FIG. 39 illustrates an example of an NR polar code construction flow with distributed CRC and interleaved CRC bits.

In examples (e.g., as shown in FIG. 39), K information bits may be passed through "CRC generation and interleaving." A CRC polynomial may have any length, such as a length of 24. A number of (e.g., 24) CRC bits may be generated (e.g., based on CRC polynomial length). CRC bits may be interleaved, for example, based on one or more rules. CRC length may be, for example, 24 bits or any other number of bits. Schemes (e.g., including examples provided herein) may be applied to other CRC lengths.

Figure 40:
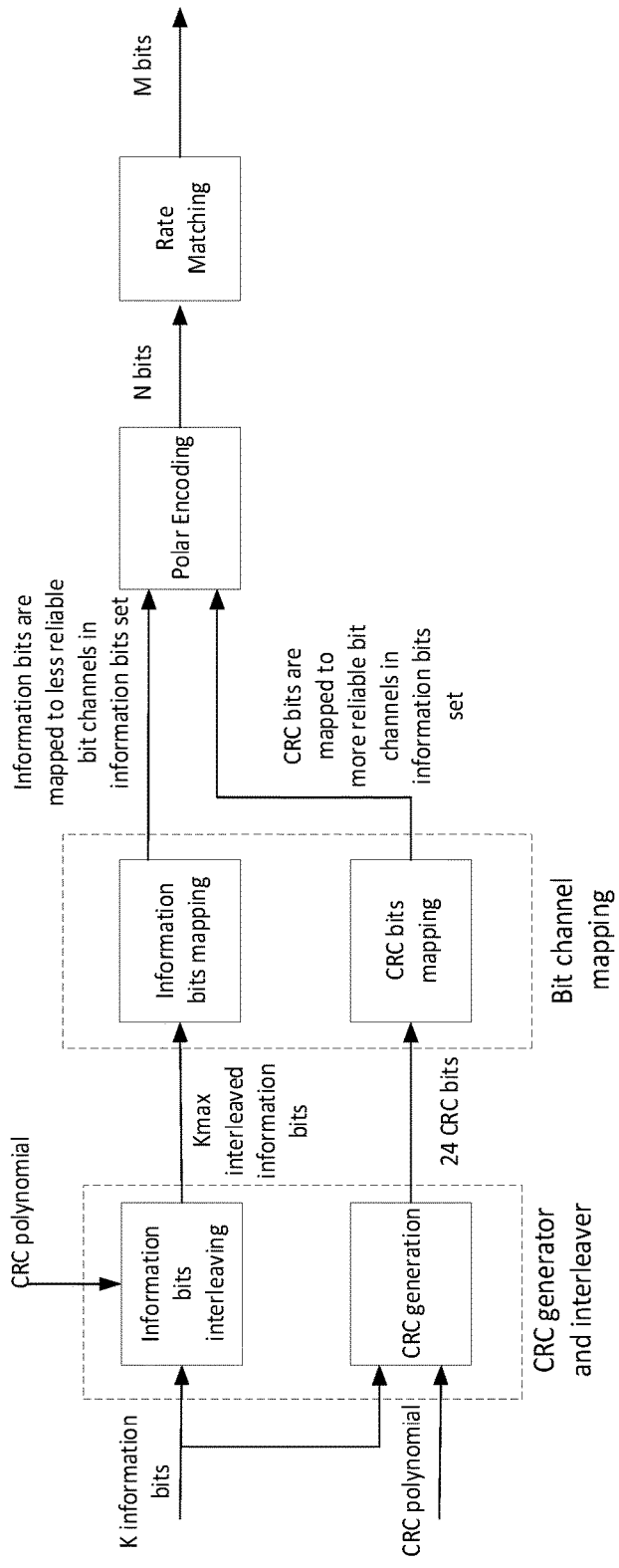
FIG. 40 illustrates an example NR polar code construction flow with distributed CRC without interleaved CRC bits.

CRC bits (e.g., such as the 24 bits) may (e.g., alternatively) be generated and (e.g., directly) used without CRC interleaving (e.g., as shown by example in FIG. 40).

FIG. 40 illustrates an example of an NR polar code construction flow with distributed CRC without interleaved CRC bits.

In examples (e.g., as shown in FIG. 40), K information bits may be passed through "Information bits interleaving," which may have multiple (e.g., two) parts (e.g., nested structure and interleaver pattern). A nested structure may, for example, enlarge the number of K, for example, to match the length of an interleaver pattern $K_{max}$. In examples, K information bits may comprise $x_0, \ldots, x_{K-1}$.

In examples of a nested structure, K bits may be expanded to $K_{max}$ bits, for example, in accordance with Eq. (1):

$$y_i = x_{K-i-1}, i=0, \ldots, K-1$$

$$y_i = \text{NULL}, i=K, \ldots, K_{max}-1 \quad (1)$$

In examples of a nested structure, K bits may be expanded to $K_{max}$ bits, for example, in accordance with Eq. (2):

$$y_i = x_i, i=0, \ldots, K-1$$

$$y_i = \text{NULL}, i=K, \ldots, K_{max}-1 \quad (2)$$

In examples of a nested structure, K bits may be expanded to $K_{max}$ bits, for example, in accordance with Eq. (3):

$$y_i = \text{NULL}, i=0, \ldots, K_{max}-K-1$$

$$y_i = x_{i-(K_{max}-K)}, i=K_{max}-K, \ldots, K_{max}-1 \quad (3)$$

In examples of a nested structure, K bits may be expanded to K_max bits, for example, in accordance with Eq. (4):

$$y_i = \text{NULL}, i=0, \ldots, K_{max}-K-1$$

$$y_i = x_{K_{max}-i-1}, i=K_{max}-K, \ldots, K_{max}-1 \quad (4)$$

An interleaver pattern (e.g., design or implementation) may, for example, depend on a CRC polynomial. An interleaver pattern may depend on an interleaving scheme for CRC bits (e.g., FIG. 39) or may not depend on an interleaving scheme for CRC bits (e.g., FIG. 40). In examples (e.g., for a 24 bit CRC), $C_0, \ldots, C_{23}$ may represent 24 interleaved CRC bits generated by "CRC generation and interleaving" (e.g., in FIG. 39) or 24 CRC bits generated by "CRC generation" (e.g., in FIG. 40).

Information bits corresponding to (e.g., or generating or supporting) $C_0$ may be interleaved to a first part, information bits corresponding to (e.g., or generating or supporting) $C_1$ may be interleaved to a second part (e.g., when they are not in the first part) and so on. In examples of a nested structure where K bits are expanded to $K_{max}=200$ (e.g., in accordance with Eq. (1)), a CRC polynomial may be, for example: gCRC24(D)=[D24+D23+D21+D20+D17+D15+D13+D12+D8+D4+D2+D+1].

CRC bits may be natural ordered (e.g., without interleaved CRC bits). An interleave pattern for information bits may be, for example:

199, 197, 196, 194, 193, 191, 188, 187, 186, 183, 180, 179, 177, 175, 171, 167, 166, 164, 162, 161, 160, 159, 158, 157, 155, 153, 152, 150, 149, 145, 144, 142, 140, 139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 198, 195, 192, 190, 185, 182, 178, 176, 174, 170, 165, 163, 156, 154, 151, 148, 143, 141, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 189, 184, 181, 173, 169, 147, 133, 128, 123, 117, 109, 106, 103, 95, 92, 75, 65, 60, 54, 42, 39, 36, 22, 14, 8, 3, 172, 168, 146, 127, 122, 116, 102, 91, 64, 59, 53, 2, 126, 121, 101, 100, 99, 98.

In examples of a nested structure where K bits are expanded to $K_{max}=200$ (e.g., in accordance with Eq. (3)), a CRC polynomial may be, for example:

$$gCRC24(D)=[D24+D23+D21+D20+D17+D15+D13+D12+D8+D4+D2+D+1].$$

CRC bits may be natural ordered (e.g., without interleaved CRC bits). An interleave pattern for information bits may be, for example:

0, 2, 3, 5, 6, 8, 11, 12, 13, 16, 19, 20, 22, 24, 28, 32, 33, 35, 37, 38, 39, 40, 41, 42, 44, 46, 47, 49, 50, 54, 55, 57, 59, 60, 62, 64, 67, 69, 74, 79, 80, 84, 85, 86, 88, 91, 94, 102, 105, 109, 110, 111, 113, 114, 116, 118, 119, 121, 122, 125, 126, 127, 129, 130, 131, 132, 136, 137, 141, 142, 143, 147, 148, 149, 151, 153, 155, 158, 161, 164, 166, 168, 170, 171, 173, 175, 178, 179, 180, 182, 183, 186, 187, 189, 192, 194, 198, 199, 1, 4, 7, 9, 14, 17, 21, 23, 25, 29, 34, 36, 43, 45, 48, 51, 56, 58, 61, 63, 65, 68, 70, 75, 81, 87, 89, 92, 95, 103, 106, 112, 115, 117, 120, 123, 128, 133, 138, 144, 150, 152, 154, 156, 159, 162, 165, 167, 169, 172, 174, 176, 181, 184, 188, 190, 193, 195, 10, 15, 18, 26, 30, 52, 66, 71, 76, 82, 90, 93, 96, 104, 107, 124, 134, 139, 145, 157, 160, 163, 177, 185, 191, 196, 27, 31, 53, 72, 77, 83, 97, 108, 135, 140, 146, 197, 73, 78, 98, 99, 100, 101.

In examples of a nested structure where K bits are expanded to $K_{max}=140$ (e.g., in accordance with Eq. (1)), a CRC polynomial may be, for example:

$$gCRC24(D)=[D24+D23+D21+D20+D17+D15+D13+D12+D8+D4+D2+D+1].$$

CRC bits may be natural ordered (e.g., without interleaved CRC bits). An interleave pattern for information bits may be, for example:

139, 137, 135, 132, 130, 125, 120, 119, 115, 114, 113, 111, 108, 105, 97, 94, 90, 89, 88, 86, 85, 83, 81, 80, 78, 77, 74, 73, 72, 70, 69, 68, 67, 63, 62, 58, 57, 56, 52, 51, 50, 48, 46, 44, 41, 38, 35, 33, 31, 29, 28, 26, 24, 21, 20, 19, 17, 16, 13, 12, 10, 7, 5, 1, 0, 138, 136, 134, 131, 129, 124, 118, 112, 110, 107, 104, 96, 93, 87, 84, 82, 79, 76, 71, 66, 61, 55, 49, 47, 45, 43, 40, 37, 34, 32, 30, 27, 25, 23, 18, 15, 11, 9, 6, 4, 133, 128, 123, 117, 109, 106, 103, 95, 92, 75, 65, 60, 54, 42, 39, 36, 22, 14, 8, 3, 127, 122, 116, 102, 91, 64, 59, 53, 2, 126, 121, 101, 100, 99, 98.

In examples of a nested structure where K bits may be expanded to $K_{max}=140$ (e.g., in accordance with Eq. (3)), a CRC polynomial may be, for example:

$$gCRC24(D)=[D24+D23+D21+D20+D17+D15+D13+D12+D8+D4+D2+D+1].$$

CRC bits may be natural ordered (e.g., without interleaved CRC bits). An interleave pattern for information bits may be, for example:
0, 2, 4, 7, 9, 14, 19, 20, 24, 25, 26, 28, 31, 34, 42, 45, 49, 50, 51, 53, 54, 56, 58, 59, 61, 62, 65, 66, 67, 69, 70, 71, 72, 76, 77, 81, 82, 83, 87, 88, 89, 91, 93, 95, 98, 101, 104, 106, 108, 110, 111, 113, 115, 118, 119, 120, 122, 123, 126, 127, 129, 132, 134, 138, 139, 1, 3, 5, 8, 10, 15, 21, 27, 29, 32, 35, 43, 46, 52, 55, 57, 60, 63, 68, 73, 78, 84, 90, 92, 94, 96, 99, 102, 105, 107, 109, 112, 114, 116, 121, 124, 128, 130, 133, 135, 6, 11, 16, 22, 30, 33, 36, 44, 47, 64, 74, 79, 85, 97, 100, 103, 117, 125, 131, 136, 12, 17, 23, 37, 48, 75, 80, 86, 137, 13, 18, 38, 39, 40, 41.

"CRC bit mapping" may map (e.g., 24) CRC bits (e.g., whether interleaved as in FIG. 39 or not interleaved as in FIG. 40) to the (e.g., 24) most reliable bit channels of an information bits set, e.g., in a natural order. In examples, the 24 most reliable bit channels may be selected and sorted in natural order. CRC bits may be mapped (e.g., one-to-one) to the bit channels in natural order. In examples (e.g., for a polar code with length 256 bits), the 24 most reliable bit channels resulting from a polar sequence and rate matching schemes may be (e.g., in reliability order from low to high), for example:
[121 179 174 122 63 181 124 182 185 95 186 111 188 159 119 175 123 183 125 187 126 189 190 127 191].
Natural ordered bit channels may be, for example:
[63 95 111 119 121 122 123 124 125 126 127 159 174 175 179 181 182 183 185 186 187 188 189 190 191].

In examples, $C_0, \ldots, C_{23}$ may be 24 interleaved CRC bits, e.g., generated by "CRC generation and interleaving." For example, $C_0$ may be assigned to bit channel 63, $C_1$ may be assigned to bit channel 95, $C_2$ may be assigned to bit channel 111, etc.

"Information bits mapping" may, for example, map $K_{max}$ interleaved information bits to $K_{max}$ least reliable bit channels in the information bits set in a natural order. For example, the remaining information bits set may be sorted in natural order. Interleaved information bits may be mapped (e.g., one-to-one) to bit channels, e.g., in natural order. In examples (e.g., for a polar code with length 256 bits), $K_{max}=26$ least reliable bit channels resulting from a polar sequence and rate matching schemes may be (e.g., in reliability order from low to high), for example:
[61 177 91 172 120 62 143 103 178 93 107 180 151 94 155 109 184 115 167 157 110 117 171 158 118 173].
Natural ordered bit channels may be, for example:
[61 62 91 93 94 103 107 109 110 115 117 118 120 143 151 155 157 158 167 171 172 173 177 178 180 184].

In examples, $S_0, \ldots, S_{K_{max}-1}$ may be interleaved $K_{max}$ information bits, e.g., generated by "Information bits interleaving." $S_0$ may be assigned to bit channel 61, $S_1$ may be assigned to bit channel 62, $S_2$ may be assigned to bit channel 91, etc.

CRC bits (e.g., all CRC bits) may be mapped to the most reliable bit channels. The number of distributed CRC bits may be, for example, as large as CRC length. CRC bits may be (e.g., alternatively) partially distributed while keeping remaining CRC bits appended (e.g., as usual). In examples, a maximum of X CRC bits may be distributed while remaining Y CRC bits may be appended. For example, Y appended CRC bits may (e.g., first) be allocated to bit channels with the largest indices in an information bits set. The X most reliable bit channels may be determined from the remaining information bits set. X distributed CRC bits may be allocated to the X most reliable bit channels.

In examples, a maximum of X=5 CRC bits may be distributed while remaining Y=19 CRC bits may be appended. An information bits set may be composed of the following 50 bit channels (e.g., in reliability order from low to high), for example:
[61 177 91 172 120 62 143 103 178 93 107 180 151 94 155 109 184 115 167 157 110 117 171 158 118 173 121 179 174 122 63 181 124 182 185 95 186 111 188 159 119 175 123 183 125 187 126 189 190 127 191],
or, in natural order, for example:
[61 62 63 91 93 94 95 103 107 109 110 111 115 117 118 119 120 121 122 123 124 125 126 127 143 151 155 157 158 159 167 171 172 173 174 175 177 178 179 180 181 182 183 184 185 186 187 188 189 190 191].

The 17 appended CRC bits may, for example, occupy the following bit channels:
[174 175 177 178 179 180 181 182 183 184 185 186 187 188 189 190 191], The 5 distributed CRC bits may, for example, occupy the 5 most reliable bit channels from the remaining information bits set:
[119 123 125 126 127].

CRC bits may (e.g., in another scheme) occupy reliable bit channels uniformly. In examples, an interval between two CRC bits in reliability order of unfrozen bits may be, for example, 50/24=2 (e.g., or other values, such as 1 and 3). A portion of CRC bits may be appended while remaining CRC bits may occupy remaining unfrozen bits uniformly. In examples, an interval may be 26/5=5 (e.g., or other values, such as 4 and 6). An offset may be less than an interval, for example, in uniform occupation.

FAR performance may be improved, for example, by allocating (e.g., one or more or all) CRC bits to the most reliable bit channels. Early termination gain may be achieved, for example, by distributing information bits that may be associated with CRC bits distribution. An early termination check (e.g., on the decoder side) may be implemented at a time when a distributed CRC bit is decoded, for example, when (e.g., all) supporting information bits have already been decoded. An early termination check may be delayed (e.g., to a time when the last supporting information bit is decoded), for example, when some supporting information bits for a distributed CRC bit are not available or may not be decoded when the distributed CRC bit is decoded. Decoding of an (e.g., one) information bit may trigger multiple early termination checks from multiple distributed CRC bits. Early termination gain may be achieved by appended CRC bits, for example, when they may not be the last appended CRC bit.

"Information bits interleaving" and "CRC generation and interleaving" (e.g., in FIGS. 39 and 40) may be referred to as "CRC generation and interleaver." "Information bits mapping" and "CRC bits mapping" may be referred to as "Bit channel mapping."

"Bit channel mapping" may be implemented. CRC bits may be mapped to more reliable bit channels of an information bits set.

Figure 41:
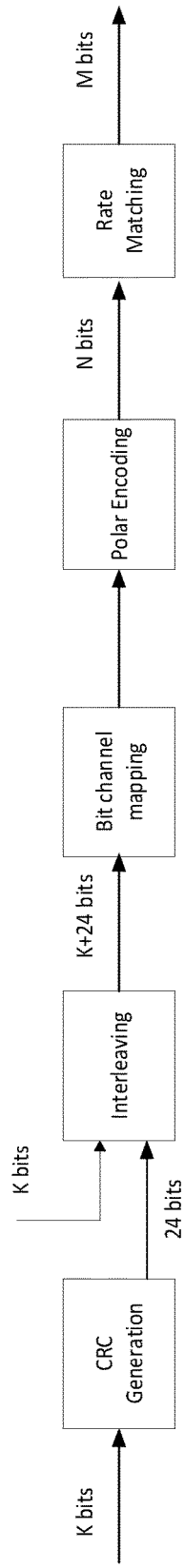
FIG. 41 illustrates an example of an NR polar code construction diagram with distributed CRC.

FIG. 41 illustrates an example of an NR polar code construction diagram with distributed CRC. "Bit channel mapping" may be introduced, for example, between interleaving and polar encoding (e.g., compare examples shown in FIG. 38 and FIG. 41).

The distributed CRC schemes herein (e.g., including interleaver pattern and/or nested structure) may be applied to URLLC data channel.

For UL control channel, the number of CRC bits may be (nFAR+3) bits. One or more (e.g., all) bits may be appended to the end of information bits. The early termination gain may not be the consideration of the CRC bits. If the nFAR=8, one or more 11-bit CRC polynomials may be provided (e.g., based on their good error detection capabilities).

$D^{11}+D^{10}+D^9+D^8+D^5+D^3+1$ (or 0xF29);
$D^{11}+D^9+D^8+D^7+D^5+D^4+D^2+D+1$ (0xBB7);
$D^{11}+D^{10}+D^7+D^4+D^3+D+1$ (0xC9B);
$D^{11}+D^{10}+D^6+D^4+D^2+D+1$ (0xC57);
$D^{11}+D^7+D^6+D^5+D^2+D+1$ (0x8E7);
$D^{11}+D^9+D^8+D^7+D^5+D^3+D^2+D+1$ (0xBAF);
$D^{11}+D^2+1$ (0x805);
$D^{11}+D^{10}+D^9+D^8+D^7+D^5+D^4+D^3+D^2+D+1$ (0xFBF);
$D^{11}+D^9+D^8+D^2+D+1$ (0xB07);
$D^{11}+D^9+D^8+D^7+D^6+D^4+D^3+D^2+D+1$ (0xBDF);
$D^{11}+D^8+D^7+D^6+D^5+D^3+D+1$ (0x9EB);
$D^{11}+D^3+D+1$ (0x80B);
$D^{11}+D^{10}+D^8+D^6+D^5+D^4+D^2+D+1$ (0xD77);
$D^{11}+D^9+D^6+D^5+D^2+1$ (0xA65);
$D^{11}+D^{10}+D^8+D^7+D^6+D^5+D^4+D^3+D+1$ (0xDFB);
$D^{11}+D^9+D^8+D^7+D^2+1$ (0xB85); or
$D^{11}+D^9+D^7+D^6+D^5+D+1$ (0xAE3).

If the nFAR=4, one or more 7-bit CRC polynomials may be provided (e.g., based on their good error detection capabilities).

$D^7+D^6+D^3+D+1$ (or 0xCB);
$D^7+D^6+D^5+D^3+D^2+1$ (or 0xEF);
$D^7+D^6+D^5+D^2+1$ (or 0xE5);
$D^7+D+1$ (or 0x83);
$D^7+D^3+1$ (or 0x89);
$D^7+D^5+D^4+D^2+1$ (or 0xB7);
$D^7+D^6+D^2+1$ (or 0xC5);
$D^7+D^4+D^2+1$ (or 0x95);
$D^7+D^4+D^3+D+1$ (or 0x9B);
$D^7+D^6+D^4+1$ (or 0xD1); or
$D^7+D^6+D^3+D^2+1$ (or 0xCF);

If the nFAR=5, one or more 8-bit CRC polynomials may be provided (e.g., based on their good error detection capabilities).

$D^8+D^7+D^6+D^3+D^2+D+1$ (or 0x1CF);
$D^8+D^6+D^3+D^2+1$ (or 0x14D);
$D^8+D^4+D^3+D^2+1$ (or 0x11D);
$D^8+D^6+D^5+D+1$ (or 0x163);
$D^8+D^6+D^5+D^4+D^3+D^2+D+1$ (or 0x17F);
$D^8+D^3+D^2+1$ (or 0x107);
$D^8+D^5+D^3+D^2+D+1$ (or 0x12F);
$D^8+D^5+D^4+1$ (or 0x131);
$D^8+D^7+D^4+D^3+D+1$ (or 0x19B);
$D^8+D^5+D^4+D^2+D+1$ (or 0x137);
$D^8+D^7+D^6+D^4+D^2+1$ (or 0x1D5);
$D^8+D^4+D^3+D+1$ (or 0x11B);
$D^8+D^5+D^4+D^3+1$ (or 0x139);
$D^8+D^7+D^6+D^4+D^2+D+1$ (or 0x1D7);
$D^8+1$ (or 0x101);

If the nFAR=24, one or more 27-bit CRC polynomials may be provided (e.g., based on their good error detection capabilities).

0xBC08C6B, 0x879B5DB, 0xD443C9F, 0xC71D12F, 0x8852D0D;
0xD5D08DB, 0x9E5D3CD, 0xE8C884F, 0x8000027, 0x9975E83;
0x8E5A839, 0x9EE17B3, 0x8CAD3F7, 0xD30C627, 0xE8BD17F;
0x8000023, 0xD4C237F, 0xA35FF35, 0xCB7AA27, 0xB0D2BC7;
0xD87FE1B, 0x996CB1F, 0xA43EC97, 0x84B181F, 0x8E9FA8F

If the nFAR=29, one or more 32-bit CRC polynomials may be provided (e.g., based on their good error detection capabilities).

0x1000000AF, 0x104C11DB7, 0x127673637, 0x10B72AC3B, 0x150D7C9B7,
0x1000001ED, 0x12A1D7F5D, 0x11EDC6F41, 0x10000571B, 0x1814141AB,
0x12E75F6A3, 0x1D120C3B7, 0x104811DB7, 0x1F6ACFB13, 0x1741B8CD7,
0x132583499, 0x120044009, 0x1A833982B, 0x100210801, 0x1572D7285,
0x1F4ACFB13, 0x1F1922815, 0x16938392D, 0x13AFF2FAD, 0x141295F6B,
0x100000001.

If the nFAR=0, one or more 3-bit CRC polynomials may be provided (e.g., based on their good error detection capabilities).

$D^3+D+1$ (0xB); or
$D^3+1$ (0x9).

The CRC length for FAR performance and/or the like (e.g., corresponding to $n_{FAR}$) for control channel may depend on the payload size or may be a function of the payload size. For example, when the payload size is large, the WTRU may select the CRC length L1; when the payload size is medium, the WTRU may select the CRC length L2; and/or when the payload size is small, the WTRU may select the CRC length L3. For example, L1 may be larger than L2, and L2 may be large than L3. One or more thresholds may be used to determine the payload sizes and the associated CRC lengths. For example, the CRC length corresponding to FAR performance (e.g., $n_{FAR}$) may be selected from one of the following: 0, 4, 8, 16, 24, 32, etc. Other values may be selected.

The CRC length used for assisting decoding (e.g., list decoding for polar codes) for control channel (e.g., UL and/or DL control channel) may depend on the payload size or may be a function of the payload size. For example, when the payload size is large, the WTRU may select the CRC length M1; when the payload size is medium, the may select the CRC length M2; and/or when the payload size is small, the WTRU may select the CRC length M3. For example, M1 may be larger than M2, and M2 may be large than M3. One or more thresholds may be used to determine the payload sizes and/or the associated CRC lengths. For example, the CRC length for assisting decoding (e.g., list coding for polar codes) may be selected from one of the following: 0, 2, 3, 4, 5 and 6, etc. Other values may be selected.

The total CRC length may depend on the payload size or may be a function of the payload size. The total CRC used for multiple CRC severing for different purposes and/or functions, such as FAR and/or assisting decoding for control channel (e.g., UL and/or DL channel), may depend on the payload size or may be a function of the payload size. For example, when the payload size is large, the WTRU may select the total CRC length N1; when the payload size is medium, the WTRU may select the total CRC length N2; and/or when the payload size is small, the WTRU may select the total CRC length N3. For example, N1 may be larger than N2, and N2 may be larger than N3. One or more thresholds may be used to determine the payload sizes and/or the associated total CRC lengths. The total CRC length may be the sum of multiple CRC lengths. For example, the total CRC length may be the sum of the CRC length selected for FAR and/or the CRC length for assisting decoding. For example, the total CRC length corresponding to FAR performance (e.g., $n_{FAR}$) and assisting decoding (e.g., list size for polar decoding may be selected as 8, corresponding to the CRC length for assisting polar decoding is 3 bits) may be selected from one of the following: 3, 7, 11, 19, 24, 27, 32, 35. Other values may be possible.

In examples, UL CRC length selection based on payload size (or information block size) may be configured:

For 8<=K<=18, $n_{FAR}$=4; This may provide: 12<=K+$n_{FAR}$<=22

For 19<=K<=248, $n_{FAR}$=8; This may provide: 27<=K+$n_{FAR}$<=256

For 249<=K<=496, $n_{FAR}$=16; This may provide: 265<=K+$n_{FAR}$<=512

For K>496, $n_{FAR}$=24; This may provide: K+$n_{FAR}$>520

In examples, UL CRC length selection based on payload size (or information block size) may be configured:

For 12<=K<=22, $n_{FAR}$=0; This may provide: 12<=K+$n_{FAR}$<=22

For 23<=K<=248, $n_{FAR}$=8; This may provide: 31<=K+$n_{FAR}$<=256

For 249<=K<=496, $n_{FAR}$=16; This may provide: 265<=K+$n_{FAR}$<=512

For K>496, $n_{FAR}$=24; This may provide: K+$n_{FAR}$>520

The single total CRC length may be selected for simplicity and/or case for the largest payload size. For example, DL control channel may select the total CRC length as 24 bits, e.g., accounting for 21 CRC bits for FAR performance and 3 bits for list decoding for polar code. A subset of determining the UL CRC length based on payload size (e.g., as described herein) with larger resolution may be implemented.

For example, UL CRC length selection based on payload size (or information block size) may be configured as follows:

For 12<=K<=22, $n_{FAR}$=0; This may provide: 12<=K+$n_{FAR}$<=22

For 23<=K<=248, $n_{FAR}$=8; This may provide: 31<=K+$n_{FAR}$<=256

For 249<=K, $n_{FAR}$=16; This may provide: 265<=K+$n_{FAR}$

For example, UL CRC length selection based on payload size (or information block size) may be configured as follows:

For 12<=K<=14, $n_{FAR}$=0; This may provide: 12<=K+$n_{FAR}$<=14

For 15<=K<=248, $n_{FAR}$=8; This may provide: 23<=K+$n_{FAR}$<=256

For 249<=K, $n_{FAR}$=16; This may provide: 265<=K+$n_{FAR}$

The nFAR value herein (e.g., for a given range of information block size) may vary depending on the payload contents. For example, for 15<=K<=248, nFAR may be equal to 8 if the payload contents include relatively more important control information (e.g., PMI, RI and/or CBG related information). nFAR may be equal to 5 if the payload contents include relatively less important control information.

The solution for selecting CRC length and an associated polynomial may apply to the following channels (e.g., which may not be limited to UL and/or DL WTRU specific control channel and/or common control channel and/or data channel).

CRC selection for NR-PUCCH and/or NR-PUSCH may be provided.

NR-PUCCH and NR-PUSCH may have different FAR performance requirements. A same or different $n_{FAR}$ value may be proposed to apply to UCI on PUCCH and/or PUSCH. Type I CSI feedback including one or more of a periodic CSI, a semi-periodic CSI, an aperiodic CSI or a subband CSI may be transmitted on PUCCH or PUSCH. Type II CSI feedback may be (e.g., mainly) transmitted on PUSCH.

In examples, a same $n_{FAR}$ value may be proposed to apply to UCI on PUCCH and PUSCH. The value of nFAR may depend (e.g., only depend) on the payload size and/or the UCI contents. Encoding may be simplified.

In examples, different $n_{FAR}$ values may be proposed to apply to UCI on PUCCH and PUSCH. One or more of the following approaches may be used.

In examples, PUSCH may have more resources than PUCCH to carry UCI. nFAR value and/or CRC length may be larger if the UCI is carried on PUSCH. For example, given the same payload size, more CRC bits may be added to UCI if the UCI is to be transmitted on PUSCH.

In examples, PUCCH may have high requirement(s) on the nFAR. It may be desirable to have a larger nFAR value and/or CRC length if the UCI is carried on PUCCH. For example, given the same payload size, more CRC bits may be added to UCI if the UCI is to be transmitted on PUCCH.

In examples, one or more CRC lengths may be attached to a combined control and data channel. If NR-PUCCH is multiplexed with NR-PUSCH that are carried on NR-PUSCH, a single CRC with longer length may be attached to a combined control and data channel. Multiple (e.g., two) CRC lengths, which may be the same or different, may be attached to NR-PUCCH and NR-PUSCH separately. The length of a single CRC may be larger than the lengths of the multiple CRC (e.g., shorter CRC) that may be separately attached to NR-PUCCH and NR-PUSCH.

A CRC length may be calculated based on one or more of: a payload size, UCI contents, or a carrier physical channel.

A single CRC for two or more channel types (e.g., PUCCH or PUSCH) may be applied. CRC generation may be based on combined contents or payloads that are to be transmitted on multiple channels.

In examples, PUCCH and PUSCH may be transmitted simultaneously, and/or PUCCH UCI may piggyback on PUSCH. In examples, PUCCH and PUSCH may be transmitted at different time.

The single CRC may be transmitted on PUCCH, for example, with the payload. The single CRC may be transmitted on PUSCH, for example, with the payload. When the single CRC is transmitted on PUCCH and/or PUSCH with the payload, a slot-based structure may be used where a slot may contain PUSCH and PUCCH in the same slot. When the single CRC is transmitted on PUCCH and/or PUSCH with the payload, a non-slot based structure may be used where one non-slot (e.g., mini-slot) may contain PUSCH while the other non-slot may contain PUCCH. A single CRC may be applied to a single slot with both PUSCH and PUCCH. A single CRC may be applied to multiple non-slots, part of the non-slots with PUSCH and part of the non-slots with PUCCH.

The approaches and examples described herein (e.g., the approaches and examples based on channels) may be combined, for example, based on payload contents and/or payload length and/or payload transmission channels, with CRC generation.

Figure 42:
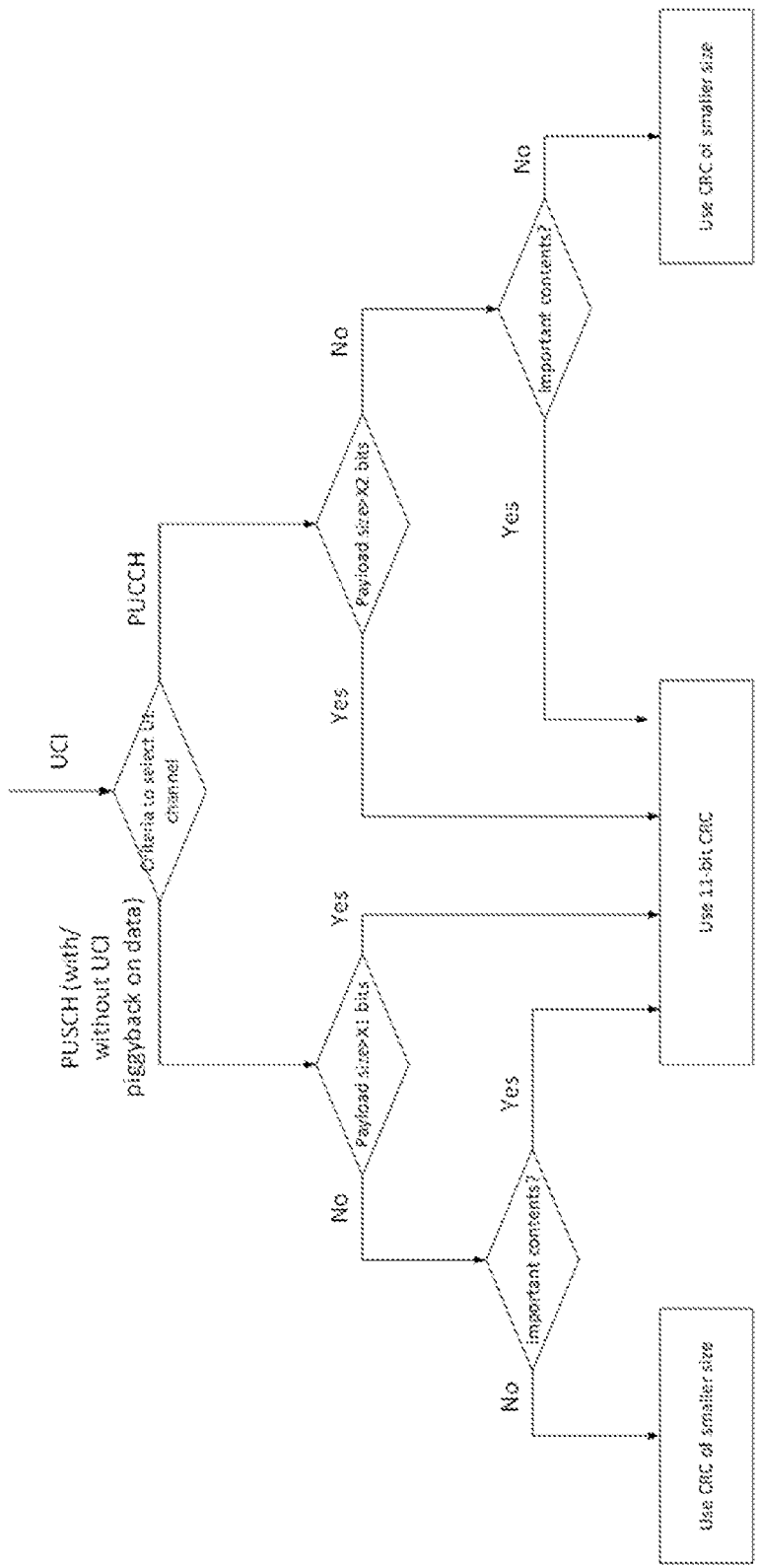
FIG. 42 illustrates an example of a process of selecting CRC length/polynomial.

FIG. 42 may show an example of a process of selecting CRC length/polynomial for a given UCI. The process may depend on one or more of the physical channel on which the given UCI is carried, the payload size, or the payload contents. The criterion used to select UL channel may include one or more of a payload size, payload contents, or UCI periodicity etc. If a selected channel is PUSCH, the UCI may or may not piggyback on data. If a selected channel is PUSCH, the payload size threshold for larger CRC length (e.g., X1 in FIG. 42) may be generally larger than the payload size threshold for PUCCH (e.g., X2 in FIG. 42).

If the UCI piggybacks with data on PUSCH, resource mapping of polar encoded UCI bits may be assigned near the UL DMRS(s) (e.g., including the front-loaded DMRS) and/or possibly additional configured DMRS(s). For example, the UCI mapping may be mapped to resource elements or OFDM symbols adjacent to front-loaded or predefined DMRS(s) with the highest priority and/or may be mapped to resource elements or OFDM symbols adjacent to additional configured DMRS with the second highest priority. The remaining UCI (e.g., if any) may be mapped to resource elements or OFDM symbols adjacent to the UCI bits that were previously allocated near the DMRS(s). The mapping rule may be in an order (e.g., in an order of frequency first and time second).

Segmentation for UL control channel may be provided.

A distributed CRC scheme may be applied to achieve an early termination gain (e.g., as described herein). In some environments, the distributed CRC scheme may not be applied, e.g., for UL control channel. Segmentation may be used in the environments. Although UL control channel is described as an example, a same scheme may be applied to any other channels where a distributed CRC scheme is not used.

Figure 43:
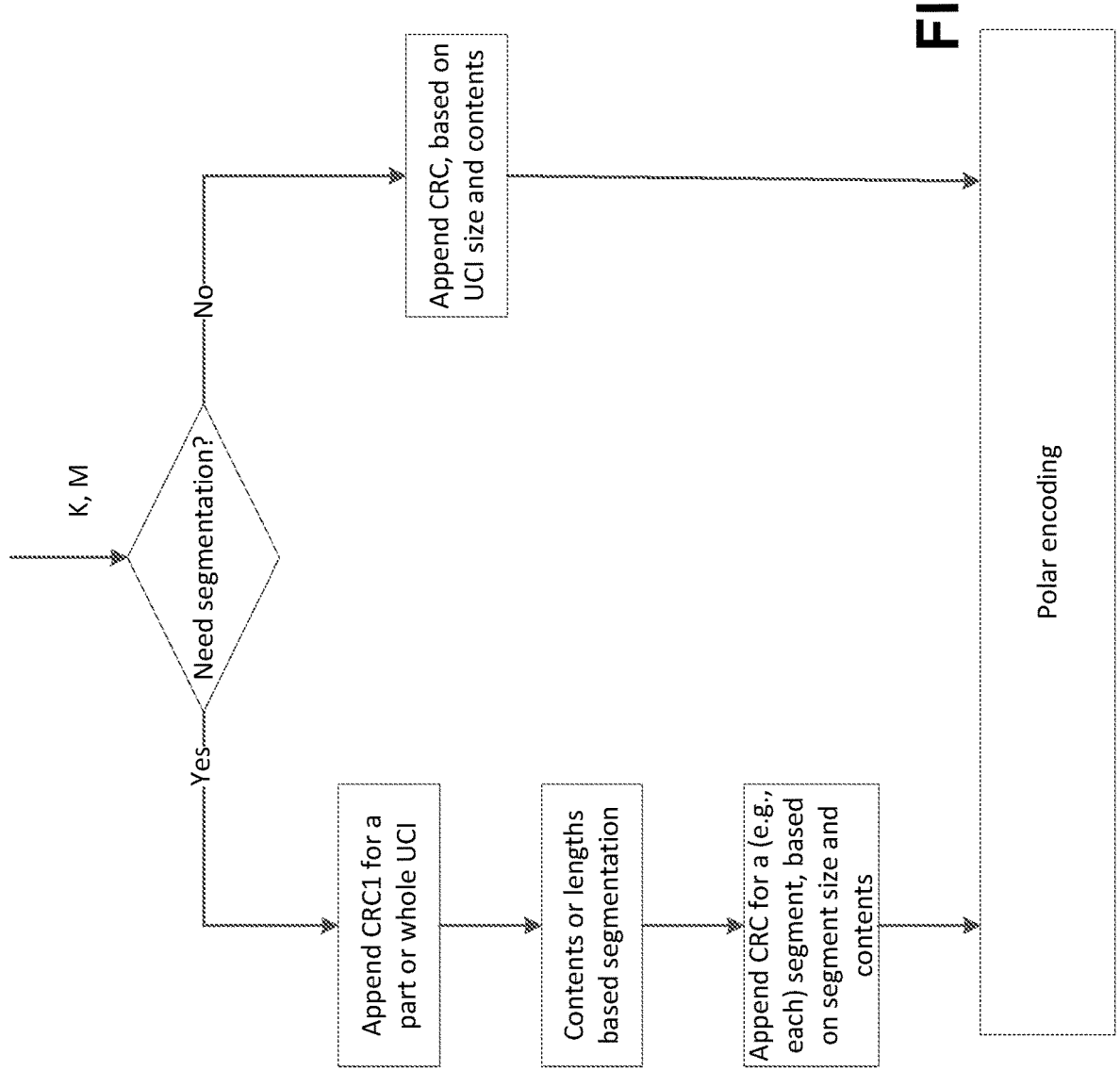
FIG. 43 is an example of an implementation of UCI segmentation and/or CRC attachment.

FIG. 43 illustrates an example implementation of UCI segmentation and/or CRC attachment. Given the UCI size K and/or the number of coded bits for transmission M, a WTRU may decide (e.g., firstly decide) whether or not segmentation is used (e.g., needed). UCI segmentation may be used for large K and M (e.g., needed only for large K and M). For example, a maximum mother code length for UL control channel may not be more than 1024 bits. Repetition may not achieve a good BLER performance for M larger than 1024 bits. For small K and M, the segmentation may not be used (e.g., needed). Similar or equivalent to (K, M), two parameters (K, R) may be used in deciding whether segmentation is needed, where R is code rate. In examples, the segmentation may be used if $K > K_{thr}$ and $R < R_{thr}$. The thresholds $K_{thr}$ and $R_{thr}$ may depend on a modulation order used. For example, the thresholds $K_{thr}$ and $R_{thr}$ for QPSK may be different from the thresholds $K_{thr}$ and $R_{thr}$ for 16QAM.

If no segmentation is used (e.g., needed), CRC bits may be appended to an UCI payload. The CRC length may depend on UCI contents and/or UCI payload sizes and/or the physical channels to carry UCI.

If segmentation is used (e.g., needed), a first level or CRC bits may be appended (e.g., may be appended first). A CRC (e.g., CRC1 in FIG. 43) may be used for error detection, for example, when combining the segments at the receiver side. The CRC may be of length 0.

Segmentation may be applied (e.g., on the UCI payload with the appended first level CRC bits). The segmentation may be based on different criterion, e.g., equal length segmentation and/or or UCI contents based segmentation. Segmentation may be performed in various ways.

In examples, the segmentation may make sure each segment is of the same or similar length without considering the subsequent CRC bits appended to each segment.

In examples, the segmentation may make sure each segment is of the same or similar length by considering the subsequent CRC bits appended to each segment.

In examples, the segmentation may not (e.g., may not need to) ensure each of the segment is of the same or similar length. The segmentation may ensure each segment can contain certain UCIs. In this example, the segmentation may ensure each segment can contain certain UCIs through various approaches. In an approach, important UCI information (e.g., ACK/NACK, RI, PMI) may be assigned to a segment(s). Less important UCI information may be assigned to another segment(s). In an approach, important UCI information may be evenly assigned to multiple (e.g., both) segments. Less important UCI information may be evenly assigned to multiple (e.g., both) segments.

A (e.g., each) segment may have its own length and/or contents. Based on the UCI contents and lengths, some (e.g., proper) CRC bits may be added to a (e.g., each) segment. The CRC lengths applied to each segment may be same or different. This may imply that different CRC polynomials may be used for each segment. One or both or some of the CRCs may be of length 0.

If segmentation is applied, each segment may correspond to a different code rate. For example, if a segment contains more important UCI contents, it may be encoded with a lower code rate. If a segment contains less important UCI contents, it may be encoded with a higher code rate.

Figure 44:
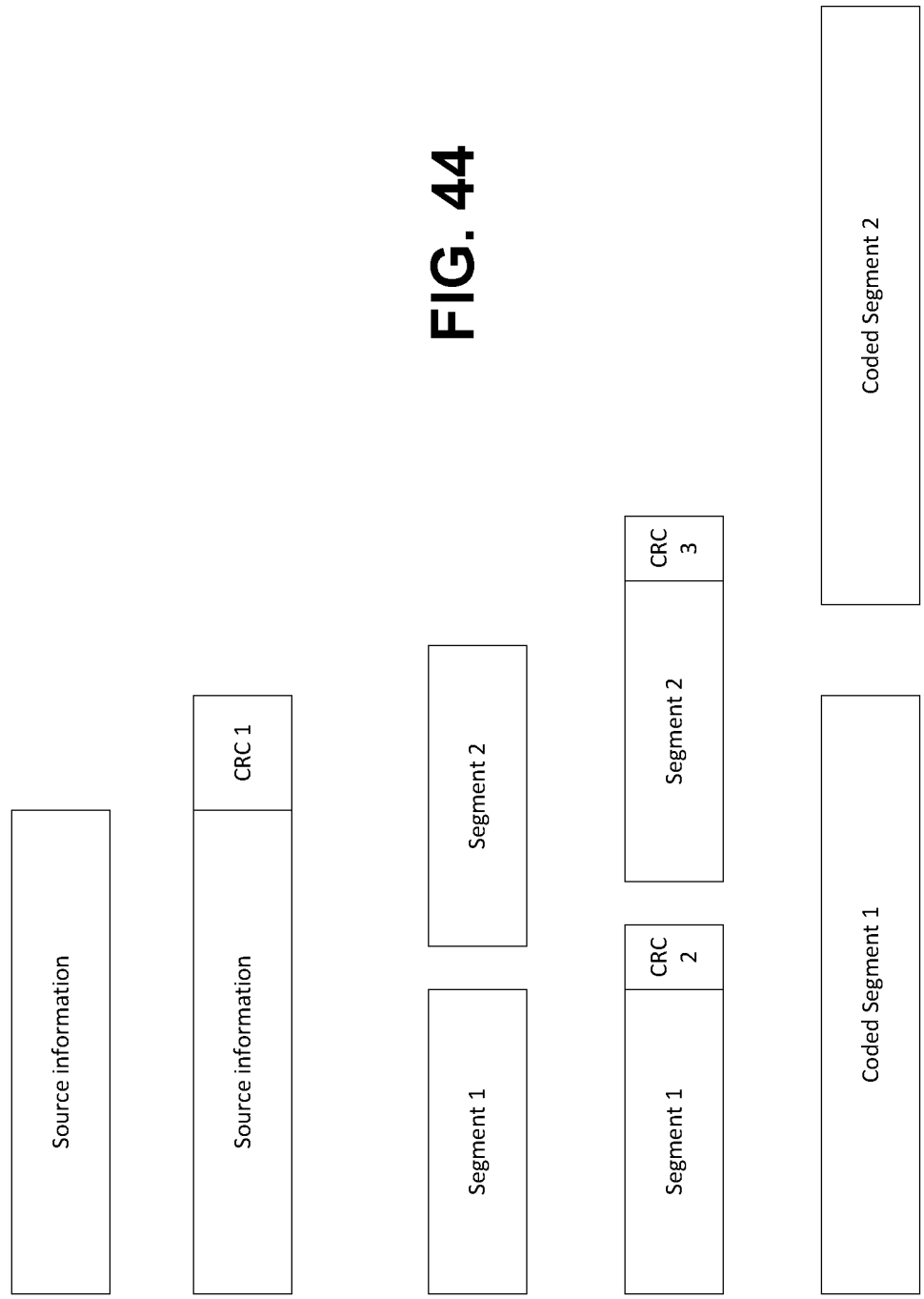
FIG. 44 is an example of segmentation of a large UCI.

FIG. 44 shows an example of contents of segmenting a large UCI. The source information may be the large UCI and/or a multiplex of UCIs. CRC1 may be attached (e.g., first attached) at the end of the large UCI. This CRC1 may be used for error detection. The large UCI with CRC1 may be segmented. The assumptions may include that two segments are applied: Segment 1 and Segment 2. The segmentation may be based on equal length and/or based on UCI contents. For example, segment 1 may contain more important information, for example, including one or more of CBG level ACK/NACK, RI, or PMI. Segment 2 may contain less important information, e.g., CQI.

Multiple (e.g., two separate) CRCs (e.g., CRC 2 and CRC 3) may be appended to a (e.g., each) segment. The CRC length/CRC polynomial may be different for different UCI contents and/or payload sizes.

The segments with appended CRC may be encoded. Different coding rates may be applied to segments (e.g., a different coding rate for each segment), for example, depending on the contents of each segment.

A SCI Polar encoding process may be provided or used herein.

Sidelink may be used for device-to-device (D2D) communication and/or vehicle-to-everything (V2X) communication, for example, in LTE. A channel coding process for a sidelink control channel(s) may be used, for example, to generate data for PSCCH channel.

Figure 45:
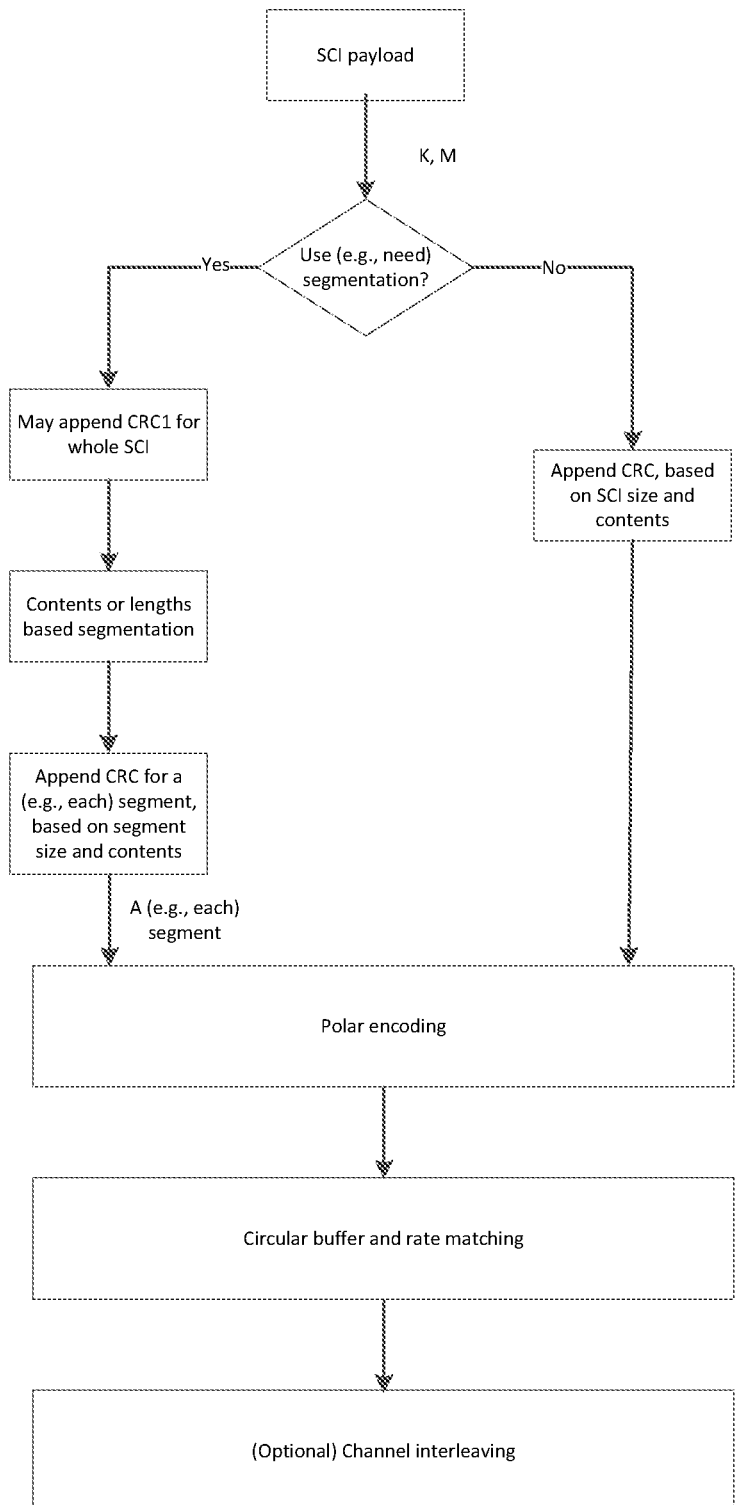
FIG. 45 is an example of a channel encoding process for SCI.

FIG. 45 illustrates an example of a process of SCI segmentation and/or channel encoding. Given the SCI size K and the number of coded bits for transmission M (e.g., or, equivalently or similarly, the coding rate R), the WTRU may first decide whether or not the segmentation is to be used (e.g., needed). For example, the SCI segmentation may be used (e.g., needed only) for large K and M. The reason for SCI segmentation generally being used for (e.g., only for) large K and M may include that the maximum mother code length for a UL control channel may not be more than 1024 bits, and repetition may not achieve sufficient BLER performance for M larger than 1024 bits. For a small K and/or small M (e.g., for large R), the segmentation may not be needed. In examples, the segmentation may be used if $K > K_{thr}$ and $R < R_{thr}$. The thresholds $K_{thr}$ and $R_{thr}$ may depend on a modulation order used. For example, the thresholds $K_{thr}$ and $R_{thr}$ for QPSK may be different from the thresholds $K_{thr}$ and $R_{thr}$ for 16QAM.

If no segmentation is used (e.g., needed), CRC bits may be appended to the SCI payload. The CRC length may depend on SCI contents and/or SCI payload sizes.

If segmentation is used (e.g., needed), a first level of CRC bits may be appended (e.g., may be appended first). The first level CRC (e.g., CRC1 in FIG. 45) may be used for error detection, for example, when combining the segments at a receiver side. The first level CRC may be of length 0.

The segmentation may be applied. The segmentation may be based on different criterion, for example, equal length segmentation or SCI contents based segmentation. The segmentation may be applied for example, in one or more of the following waysed, the segmentation may provide (e.g., ensure that each of the) segments that are the same or similar length, or the segmentation may provide segments that (e.g., ensure that each of the segments) contain certain pieces of SCIs.

The segmentation may provide (e.g., ensure that each of the) segments that are the same or similar length, for example, with or without considering the subsequent CRC bits appended to each segment. Error padding may be applied (e.g., if needed).

The segmentation may not need to ensure each of the segments are of the same or similar length. In examples, the segmentation may provide segments that (e.g., ensure that each of the segments) contain certain pieces of SCIs. For example, important SCI information (e.g., ACK/NACK, RI, PMI) may be assigned to a segment, and/or less important SCI information may be assigned to another segment. For example, some SCI information (e.g., important SCI information) may be assigned (e.g., may be evenly assigned) to multiple (e.g., both segments), and other SCI information (e.g., less important SCI information) may be assigned (e.g., may be evenly assigned) to multiple (e.g., both segments).

A segment (e.g., each segment) may have its own length and/or contents. For example, proper CRC bits may be added to each segment, for example, based on the SCI contents and lengths. The CRC lengths applied to each segment may be same or different. It may be implied that different CRC polynomials may be used for each segment. One, both, or more of the CRCs may be of length 0. Sidelink may use a different CRC polynomial from uplink or downlink. The CRC length for a (e.g., each) segment may depend on one or more of SCI payload contents, payload size, or the carrying channel (e.g., PSCCH or PSDCH).

If the segmentation is applied, each segment may correspond to a different code rate. For example, if a segment contains more important SCI contents, the segment may be encoded with a lower code rate. If a segment contains less important SCI contents, the segment may be encoded with a higher code rate.

A segment (e.g., each segment) may be polar encoded. The mother code length of a polar encoder may depend on a payload size with CRC length, and/or the number of coded bits for transmission M (e.g., similarly or equivalently, code rate R). The coded bits may be saved in a circular buffer for rate matching. Sub-block interleaving may be applied before coded bits are saved to the circular buffer. The number of sub-blocks may be 8, 16, 32 or other numbers.

A rate matching scheme may be selected among one or more of puncturing, repetition, or shortening, for example, depending on payload size with CRC and/or the number of coded bits for transmission. For puncturing, bits for transmissions may be selected sequentially, for example, starting from the middle of the circular buffer and ending at the end of the circular buffer. For shortening, bits for transmissions may be selected sequentially, for example, starting from the beginning of the circular buffer and ending in the middle of the circular buffer. For repetition, bits for transmissions may be selected sequentially, starting from the beginning of the circular buffer. For puncturing, some frozen bit extension corresponding to punctured bits may be applied.

Rate-matched bits may be picked from the circular buffer. The rate-matched bits may or may not pass a channel interleaver. For example, a triangular channel interleaver may be applied to the rate-matched bits.

New Radio WTRU specific scrambling may be described herein.

With the increase of CRC bits for DL control channel from 16 bits to 24 bits, the WTRU specific scrambling described herein may be adjusted accordingly.

New radio polar code construction with WTRU specific scrambling may be described herein. The WTRU specific scrambling may enhance the error detection performance. For example, the non-intended data may not be decoded, e.g., due to a difference in the WTRU ID. This may reduce the false alarm rate. The decoding may be stopped earlier, e.g., due to the CRC bits mismatch. This may enable early termination (e.g., by a WTRU).

Figure 46:
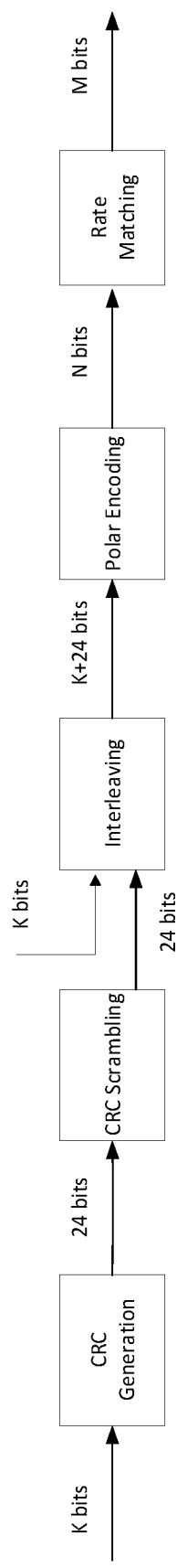
FIG. 46 illustrates an example NR polar code construction flow with distributed CRC and WTRU-specific scrambling for DL control channel.

FIG. 46 illustrates an example polar code construction flow with distributed CRC and WTRU-specific scrambling for DL control channel. As seen in FIG. 46, a CRC Scrambling block may be inserted, for example, between the CRC Generation block and the Interleaving block (e.g., compared with FIG. 38). One input to the CRC Scrambling block may be the WTRU-ID or C-RNTI. Other RNTIs may be considered as the input: Temporary C-RNTI, semi-persistent scheduling (SPS)C-RNTI, paging-RNTI (P-RNTI), radio network RNTI (RA-RNTI), transmit power control (TPC) physical uplink shared channel (PUSCH)-RNTI, TPC-physical uplink control channel (PUCCH)-RNTI, and/or the like.

In examples, a scrambling operation may be as follows: The WTRU-ID may pass (e.g., first pass) the pseudo-random sequences generation, e.g., as the initial sequence. The pseudo-random sequences generation may be based on a Gold sequence or other sequences. The first (e.g., or after a specific offset) 24 generated pseudo-random sequence bits may be used to have the XOR operations with the 24 CRC bits.

In examples, a scrambling operation may directly XOR WTRU-ID with part or all of the CRC bits. If the WTRU-ID is 16 bits (e.g., only 16 bits), the XOR operation may be performed towards the first or the last 16 CRC bits. The WTRU-ID may be cycled from 16 bits to 24 bits and may XOR with the 24 CRC bits.

Figure 47:
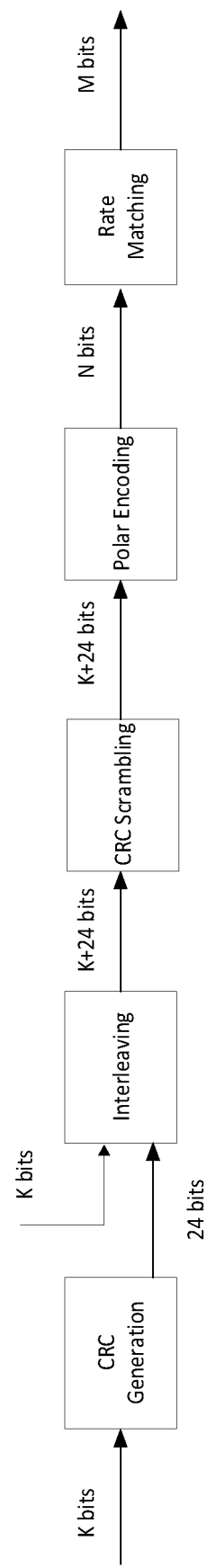
FIG. 47 illustrates an example NR polar code construction flow with distributed CRC and WTRU-specific scrambling for DL control channel.

In the case that 16-bit WTRU-ID XOR with part of the CRC bits, the part of CRC bits XOR-ed may include (e.g., prefer to include) those distributed CRC bits, e.g., to improve the FAR performance. The appended CRC bits (e.g., only the appended CRC bits) may be XOR-ed with the WTRU-ID. If the 16-bit WTRU-ID XOR with part of the CRC bits as described herein, the CRC scrambling operation may be added after the Interleaving block, as shown in FIG. 47. The K information bits may bypass the CRC Scrambling block.

Scrambling may be done for one or more (e.g., all) bits including frozen, parity bits, and unfrozen bits before polar encoding. The WTRU-ID may pass (e.g., first pass) the pseudo-random sequences generation, e.g., as the initial sequence. The pseudo-random sequences generation may be based on a Gold sequence or other sequences. The first (e.g., or after a specific offset) N generated pseudo-random sequence bits may be used to have the XOR operations with the N bits before polar encoding. In one or more (e.g., all) the N bits, shortened bits may be excluded or included.

In examples, scrambling may be done for one or more (e.g., all) bits including frozen, parity bits, and unfrozen bits, for example, before polar encoding. This approach may differ from other approaches (e.g., examples described herein). The other approaches may focus on scrambling WTRU-ID (e.g., only on the CRC bits). This approach may focus on scrambling WTRU-ID on frozen bits, parity bits, and/or information bits. In examples, (e.g., examples described herein), a (e.g., only one) decoding effort is used (e.g., needed), where the WTRU-ID descrambling may be added on decoded (e.g., only decoded) CRC bits. In this approach, multiple decoding trials may be used (e.g., needed), for example, one for each candidate WTRU-ID, e.g., TPC-RNTI, SPS-RNTI, P-RNTI, RA-RNTI, etc.

A proper WTRU-ID(s) may be applied when scrambling the proper WTRU-ID(s) on the frozen bits, parity bits and unfrozen bits, for example, to avoid multiple hypothesis decoding based on multiple WTRU-ID. FIG. 48 illustrates an implementation of determining a WTRU-ID (e.g., a proper WTRU-ID). For example, it may be determined whether a DCI message is to be put in a WTRU-specific search space (e.g., only). If a DCI message is to be put (e.g., is only to be put) in a WTRU-specific search space, C-RNTI may be used for scrambling. If only the C-RNTI is used by WTRU for descrambling, no hypothesis decoding may be needed. If a DCI message is not to be put in a WTRU-specific search space only, it may be determined whether a DCI message is to be put in a group-common search space. For example, if the DCI message is to be put in a common search space, the WTRU may further check whether this is a group common DCI, and the WTRU may put the DCI in a group common search space (e.g., only). If this is a group common DCI, the group common RNTI may be used for scrambling operation. If this is not a group common DCI, gNB may combine some (e.g., all) of possible RNTIs. The combination may XOR some (e.g., all) of the possible RNTIs and/or multiplexing some (e.g., all) of the possible RNTI. The combined RNTI may be used for the scrambling operation. The WTRU-ID (e.g., C-RNTI, group-common-RNTI, or combination of other RNTIs) may be used, for example, as an initial stage for generating a pseudo-random sequence(s). The scrambling of the proper WTRU-ID(s) may also be applied to the coded bits.

Systems, methods and instrumentalities have been disclosed for polar coding for new radio. Assistance Bit Aided (ABA) Polar Code Construction (PCC) may be used, for example, for NR channels with different design purposes (e.g., error detection (ED), error correction (EC), early termination (ET), and list pruning). Polar coding for a control channel (e.g., NR-PDCCH) may comprise, for example, Early Termination (ET) based polar coding. Polar coding may be provided for NR-PBCH, which may include combining over SS blocks and/or combining over SFN. Polar coding construction for early termination may comprise, for example, interleaver design and CRC polynomials, list pruning design and configuration, WTRU specific scrambling, segmentation for early termination, NR interleaver design and CRC polynomials, and/or NR WTRU specific scrambling. PCC may, for example, distribute CRC with or without interleaving CRC bits. False Alarm Rate (FAR) performance may be improved, for example, by allocating CRC bits to the most reliable bit channels. Early termination gain may be achieved, for example, by distributing information bits associated with CRC bits distribution.

Features, elements and actions (e.g., processes and instrumentalities) are described by way of non-limiting examples. While examples may be directed to LTE, LTE-A, New Radio (NR) or 5G protocols, subject matter herein is applicable to other wireless communications, systems, services and protocols. Each feature, element, action or other aspect of the described subject matter, whether presented in figures or description, may be implemented alone or in any combination, including with other subject matter, whether previously obtained or not, in any order, regardless of examples presented herein.

A WTRU may refer to an identity of the physical device, or to the user's identity such as subscription related identities, e.g., MSISDN, SIP URI, etc. WTRU may refer to application-based identities, e.g., user names that may be used per application.

A gNB may receive a MIB, which may be transmitted to a WTRU. The MIB may include one or more bits, which may correspond to a time index and a payload. The time index may include SS block indices and a half frame indicator bit. The gNB may reorder the MIB bits to achieve a natural order and/or a reliability order (e.g., achieve a natural order and/or a reliability order while considering an applied interleaver function). The gNB may generate a CRC for the reordered MIB. The CRC may comprise twenty-four bits. The last sixteen bits of the CRC may be scrambled with a WTRU based identifier (e.g., a C-RNTI, Temporary C-RNTI, P-RNTI, RA-RNTI, TPC-PUSCH-RNTI, TPC-PUCCH-RNTI, etc.). the gNB may perform an interleaving operation on the reordered MIB and the scrambled CRC. The gNB may apply polar encoding to the interleaved bits.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:
1. A wireless transmit/receive unit (WTRU) comprising:
a memory; and
a processor configured to at least:
receive a physical downlink control channel (PDCCH) transmission;
descramble the PDCCH transmission using a first scrambling sequence to generate polar encoded bits;
decode the polar encoded bits to generate polar decoded bits, wherein being configured to decode the polar encoded bits comprises being configured to determine a position of at least one assistance bit within the polar decoded bits;
descramble a portion of the polar decoded bits using a second scrambling sequence, wherein the portion of the polar decoded bits is a last sixteen (16) bits of a twenty four (24) bit cyclic redundancy check (CRC); and on a condition that the descrambling of the portion of the polar decoded bits is successful, obtain downlink control information (DCI) bits from the polar decoded bits.

2. The WTRU of claim 1, wherein the first scrambling sequence is generated using a Gold sequence that is initialized using an identifier associated with the WTRU.

3. The WTRU of claim 2, wherein the identifier associated with the WTRU is a cell radio network temporary identifier (C-RNTI).

4. The WTRU of claim 1, wherein the (24) CRC bits comprise the at least one assistance bit and are interleaved with the DCI bits.

5. The WTRU of claim 1, wherein the second scrambling sequence is based on an identifier associated with the WTRU.

6. A base station comprising:
 a memory; and
 a processor, configured to:
  attach twenty four (24) cyclic redundancy check (CRC) bits to downlink control information (DCI) bits, wherein a last sixteen (16) bits of the (24) CRC bits are scrambled using a second scrambling sequence;
  interleave the (24) CRC bits and the DCI bits to generate interleaved CRC and DCI bits, wherein being configured to interleave the (24) CRC bits comprises being configured to distribute a portion of the (24) CRC bits, wherein the portion of the (24) CRC bits are assistance bits associated with the DCI;
  perform polar coding of the interleaved (24) CRC bits and the DCI bits to generate polar coded bits;
  scramble the polar coded bits with a first scrambling sequence; and
  send a physical control channel (PDCCH) transmission comprising the scrambled polar coded bits.

7. The base station of claim 6, wherein the processor is configured to generate the first scrambling sequence using a Gold sequence that is initialized using an identifier associated with a wireless transmit/receive unit (WTRU), wherein the identifier associated with the WTRU is a cell radio network temporary identifier (C-RNTI).

8. The base station of claim 6, wherein the base station is a gNB.

9. The base station of claim 6, wherein the second scrambling sequence is based on an identifier associated with a wireless transmit receive unit WTRU.

10. A method implemented by a wireless transmit/receive unit (WTRU), the method comprising:
 receiving a physical downlink control channel (PDCCH) transmission;
 descrambling the PDCCH transmission using a first scrambling sequence to generate polar encoded bits;
 decoding the polar encoded bits to generate polar decoded bits, wherein decoding the polar encoded bits comprises determining a position of at least one assistance bit within the polar decoded bits;
 descrambling a portion of the polar decoded bits using a second scrambling sequence, wherein the portion of the polar decoded bits is a last sixteen (16) bits of a twenty four (24) bit cyclic redundancy check (CRC); and
 on a condition that the descrambling of the portion of the polar decoded bits is successful, obtaining downlink control information (DCI) bits from the polar decoded bits.

11. The method of claim 10, wherein the first scrambling sequence is generated using a Gold sequence that is initialized using a cell radio network temporary identifier (C-RNTI).

12. The method of claim 10, and the second scrambling sequence is based on an identifier associated with the WTRU.

13. The method of claim 10, wherein the (24) CRC bits comprise the at least one assistance bit and are interleaved with the DCI bits.

14. A method comprising:
 attaching twenty four (24) cyclic redundancy check (CRC) bits to downlink control information (DCI) bits, wherein a last sixteen (16) bits of the (24) CRC bits are scrambled using a second scrambling sequence;
 interleaving the (24) CRC bits and the DCI bits to generate interleaved CRC and DCI bits, wherein interleaving the (24) CRC bits comprises distributing a portion of the (24) CRC bits, wherein the portion of the (24) CRC bits are assistance bits associated with the DCI;
 performing polar coding of the interleaved (24) CRC bits and the DCI bits to generate polar coded bits;
 scrambling the polar coded bits with a first scrambling sequence; and
 transmitting the scrambled polar coded bits via a physical control channel (PDCCH).

15. The method of claim 14, wherein the first scrambling sequence is generated using a Gold sequence that is initialized using an identifier associated with a wireless transmit/receive unit (WTRU), and the identifier associated with the WTRU is a cell radio network temporary identifier (C-RNTI).

16. The method of claim 14, wherein the second scrambling sequence is based on an identifier associated with a wireless transmit receive unit WTRU.

* * * * *